(12) United States Patent
Diblasio et al.

(10) Patent No.: US 12,326,721 B2
(45) Date of Patent: Jun. 10, 2025

(54) EXTENSIBLE PROFILES FOR INDUSTRIAL CONTROLLER DEVICES

(71) Applicant: Rockwell Automation Technologies, Inc., Mayfield Heights, OH (US)

(72) Inventors: Anthony J Diblasio, Independence, OH (US); Scott A Pierce, Concord Township, OH (US); Fabio Malaspina, Twinsburg, OH (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 371 days.

(21) Appl. No.: 17/811,987

(22) Filed: Jul. 12, 2022

(65) Prior Publication Data

US 2024/0019851 A1  Jan. 18, 2024

(51) Int. Cl.
G05B 19/418 (2006.01)
(52) U.S. Cl.
CPC ... *G05B 19/4185* (2013.01); *G05B 19/41865* (2013.01); *G05B 19/4188* (2013.01)
(58) Field of Classification Search
None
See application file for complete search history.

(56) References Cited

U.S. PATENT DOCUMENTS

| | | | |
|---|---|---|---|
| 5,301,336 A | 4/1994 | Kodosky et al. | |
| 7,080,088 B1 | 7/2006 | Lau | |
| 7,343,585 B1 | 3/2008 | Lau et al. | |
| 7,571,092 B1 | 8/2009 | Nieh | |
| 7,636,656 B1 | 12/2009 | Nieh | |
| 7,703,027 B2 | 4/2010 | Hsu et al. | |
| 8,151,244 B2 | 4/2012 | Hsu et al. | |
| 8,825,692 B1 | 9/2014 | Telnow | |
| 9,235,395 B2 | 1/2016 | Kodosky et al. | |
| 9,471,304 B1 | 10/2016 | Fuchs | |
| 9,557,968 B1 | 1/2017 | Smith et al. | |
| 10,067,755 B2 | 9/2018 | Kaminski et al. | |
| 10,990,364 B2 | 4/2021 | Bach et al. | |

(Continued)

FOREIGN PATENT DOCUMENTS

EP  2 487 582 A1  8/2012

OTHER PUBLICATIONS

"SCADA Expert ClearSCADA", 2013, Schneider Electric, pp. 1-26 (Year: 2013).*

(Continued)

*Primary Examiner* — David Earl Ogg
(74) *Attorney, Agent, or Firm* — Amin, Turocy & Watson, LLP

(57) ABSTRACT

An industrial integrated development environment (IDE) allows add-on bus profiles and add-on controller profiles to be defined using an industrial domain-specific language (DSL) script. These add-on profiles can then be added to the IDE's device profile library for use in industrial control projects. This mitigates the need to write new source code to create these profiles and to release an updated version of the IDE software to make these profiles available for use. Industrial DSL scripting can also be used to define a physical and logical topology of an industrial control system within the IDE system as part of the control system project that will be deployed to the control system.

20 Claims, 39 Drawing Sheets

(56) References Cited

U.S. PATENT DOCUMENTS

| | | |
|---|---|---|
| 11,294,665 B1 | 4/2022 | Foster et al. |
| 11,354,102 B1 | 6/2022 | Nordgvist et al. |
| 2004/0034696 A1 | 2/2004 | Joffrain et al. |
| 2006/0168183 A1 | 7/2006 | Fuller, III et al. |
| 2006/0190105 A1 | 8/2006 | Hsu et al. |
| 2007/0283321 A1 | 12/2007 | Hedge et al. |
| 2010/0306747 A1 | 12/2010 | Pawlowsky |
| 2013/0104099 A1 | 4/2013 | Gores et al. |
| 2017/0206451 A1 | 7/2017 | Mahler |
| 2018/0077030 A1* | 3/2018 | Lauer ............... H04L 43/16 |
| 2018/0107764 A1 | 4/2018 | Bowman et al. |
| 2019/0306016 A1* | 10/2019 | Flynn ............... G05B 19/0426 |
| 2021/0089276 A1* | 3/2021 | Dunn ............... G05B 19/41845 |
| 2021/0096523 A1 | 4/2021 | Stump et al. |
| 2021/0096704 A1 | 4/2021 | Ericcsson et al. |
| 2021/0096824 A1* | 4/2021 | Stump ............... G06Q 10/0631 |
| 2021/0096827 A1* | 4/2021 | Stump ............... G05B 19/4188 |
| 2021/0096978 A1* | 4/2021 | Stump ............... G06F 11/3688 |
| 2021/0141614 A1* | 5/2021 | Dunn ............... G05B 19/056 |
| 2021/0165855 A1 | 6/2021 | Stuehler et al. |
| 2022/0164672 A1 | 5/2022 | Bird et al. |
| 2022/0365775 A1 | 11/2022 | Wei et al. |
| 2023/0236811 A1 | 7/2023 | Sundaresan et al. |
| 2023/0281005 A1 | 9/2023 | Groenewegen et al. |

OTHER PUBLICATIONS

Notice of Allowance received for U.S. Appl. No. 17/554,488 dated Oct. 5, 2023, 36 pages.
Extended European Search Report received for European Patent Application Serial No. EP23176733.6 dated Nov. 15, 7 pages.
Notice of Allowance received for U.S. Appl. No. 17/554,488 dated Jan. 31, 2024, 22 pages.
Non-Final Office Action received for U.S. Appl. No. 17/934,683, dated Jun. 7, 2024, 67 pages.
Non-Final Office Action received for U.S. Appl. No. 17/554,488, dated Apr. 27, 2023, 37 pages.
Extended European Search Report received for European Patent Application Serial No. 22210513.2 dated May 8, 2023, 8 pages.
Engel et al., "Using a Model Merging Language for Reconciling Model Versions", Lecture Notes in Computer Science, vol. 4066, 2006, 2 pages.
Aschauer et al., "Could an Agile Requirements Analysis Be Automated?—Lessons Learned from the Successful Overhauling of an Industrial Automation System", Lecture Notes in Computer Science, vol. 5320, 2008, pp. 25-42.
Communication pursuant to Rule 69 EPC received for European Patent Application Serial No. 22210513.2 dated Jun. 26, 2023, 2 pages.
Notice of Allowance received for U.S. Appl. No. 17/934,683, dated Sep. 11, 2024.

* cited by examiner

INDUSTRIAL ASSET

```
controllerType [controllerTypeName] {

// Class level properties are contained here
    catalogNumber := [string];
    vendorId := [value];
    productType := [value];
    productCode := [value];

// Capabilities for each major revision
    capability {
        majorRevision := [value];

memory := [value];
        process := [true/false];
        redundancy := [true/false];
        maxEthernetDevices := [value];
        enforceMaxEthernetDevices := [true/false];
        maxModuleEventTasks := [value];
        maxTasks := [value];
        maxIoConnections := [value];
    }
}
```

```
ControllerDevice C1 {
    catalogNumber := "1756-L85E";
    vendorId := 1;
    productType := 14;
    productCode := 168;
    majorRev := 33;
    minorRev := 1;
    moduleEkey.keyingState := "DISABLED";

port RA1756 port1 {
        cipPortId := "1";
        address := "0";
        enabled := false;
    } port Ethernet port2 {
        cipPortId := "2";
        address := "1.1.1.1";
        enabled := false;
    }
}
```

Controller Properties

| General | Nonvolatile Memory | Capacity | Internet Protocol | Security | Alarm Log |
| Major Faults | Minor Faults | Date/Time | Advanced | Port Configuration | Project | Redundancy |
| SFC Execution |

Vendor: Rockwell Automation

Type: 1756-L85E Controllogix 5580 Controller     Change Controller...

Revision: 34.001

Name: test

Description:

Chassis Type: 1756-A17    17-Slot ControlLogix Chassis

Slot: 0

OK    Cancel    Apply    Help

EXTENSIBLE PROFILES FOR INDUSTRIAL CONTROLLER DEVICES

TECHNICAL FIELD

The subject matter disclosed herein relates generally to industrial automation systems, and, for example, to industrial programming development platforms.

BACKGROUND ART

The various control, monitoring, and analytical devices that make up an industrial environment must be programmed or configured using respective configuration applications specific to each device. For example, industrial controllers are typically configured and programmed using a control programming development application such as a ladder logic editor. Using such development platforms, a designer can write control programming (e.g., ladder logic, structured text, function block diagrams, etc.) for carrying out a desired industrial sequence or process and download the resulting program files to the controller. Some industrial devices—such as motor drives, telemetry devices, safety input devices, etc.—may also require configuration using separate device configuration tools that are specific to the device being configured. Such device configuration tools may be used to set device parameters or operating modes (e.g., high/low limits, output signal formats, scale factors, energy consumption modes, etc.).

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, a system for developing industrial control projects is provided, comprising a user interface component configured to render integrated development environment (IDE) interfaces and to receive, via interaction with the IDE interfaces, industrial design input that defines aspects of an industrial automation control project, wherein the industrial design input comprises at least a selection of an industrial controller profile from a library of device profiles for inclusion in the industrial automation control project; a project generation component configured to generate system project data based on the industrial design input, the system project data comprising at least one of an executable industrial control program or device configuration data; and a domain-specific language (DSL) editor configured to receive, via interaction with a DSL editing interface, controller DSL script that defines properties of an industrial controller type, compile the controller DSL script to yield an add-on controller profile, and add the add-on controller profile to the library.

Also, one or more embodiments provide a method, comprising rendering, by an integrated development environment (IDE) system comprising a processor, a domain-specific language (DSL) editing interface; receiving, by the IDE system via interaction with the DSL editing interface, controller DSL script that defines properties of an industrial controller type; compiling, by the IDE system, the controller DSL script to yield an add-on controller profile; and registering, by the IDE system, the add-on controller profile in a library of device profiles, wherein the device profiles, including the add-on controller profile, are selectable for inclusion in an industrial automation control project developed using the IDE system.

Also, according to one or more embodiments, a non-transitory computer-readable medium is provided having stored thereon instructions that, in response to execution, cause an integrated development environment (IDE) system to perform operations, the operations comprising rendering a domain-specific language (DSL) editing interface; receiving, via interaction with the DSL editing interface, controller DSL script that defines properties of an industrial controller type; compiling the controller DSL script to yield an add-on controller profile; and registering the add-on controller profile in a library of device profiles, wherein the device profiles, including the add-on controller profile, are selectable for inclusion in an industrial automation control project developed using the IDE system.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 16 is a snippet of an example controller configuration file for defining capabilities of a new controller type to be added to an IDE system's device profile library.

FIG. 17 is a snippet of an example controller configuration file for defining properties of an industrial controller.

FIG. 18 is an example controller properties window that can be rendered when a user selects a controller node corresponding to an add-on controller profile.

DETAILED DESCRIPTION

Figure 1:
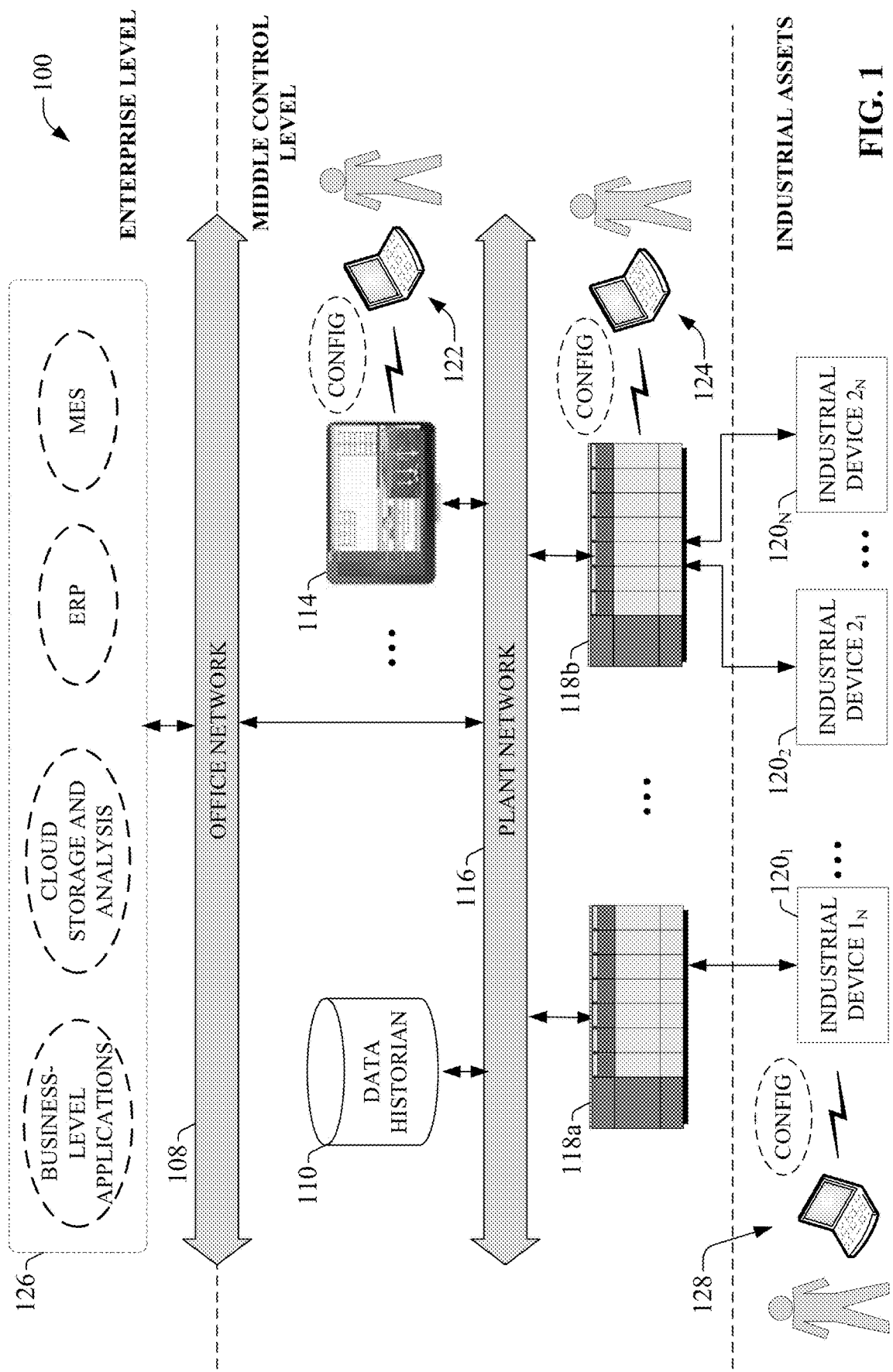
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise substantially any type of code capable of processing input signals read from the industrial devices 120 and controlling output signals generated by the industrial controllers 118, including but not limited to ladder logic, sequential function charts, function block diagrams, or structured text. Industrial devices 120 may include both input devices that provide data relating to the controlled industrial systems to the industrial controllers 118, and output devices that respond to control signals generated by the industrial controllers 118 to control aspects of the industrial systems.

Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, pumps, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by their associated control programs and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, a data historian 110 that aggregates and stores production information collected from the industrial controllers 118 or other data sources, device documentation stores containing electronic documentation for the various industrial devices making up the controlled industrial systems, inventory tracking systems, work order management systems, repositories for machine or process drawings and documentation, vendor product documentation storage, vendor knowledgebases, internal knowledgebases, work scheduling applications, or other such systems, some or all of which may reside on an office network 108 of the industrial environment.

Higher-level systems 126 may carry out functions that are less directly related to control of the industrial automation systems on the plant floor, and instead are directed to long term planning, high-level supervisory control, analytics, reporting, or other such high-level functions. These systems 126 may reside on the office network 108 at an external location relative to the plant facility, or on a cloud platform with access to the office and/or plant networks. Higher-level systems 126 may include, but are not limited to, cloud storage and analysis systems, big data analysis systems, manufacturing execution systems, data lakes, reporting systems, etc. In some scenarios, applications running at these higher levels of the enterprise may be configured to analyze control system operational data, and the results of this analysis may be fed back to an operator at the control system or directly to a controller 118 or device 120 in the control system.

The various control, monitoring, and analytical devices that make up an industrial environment must be programmed or configured using respective configuration applications specific to each device. For example, industrial controllers 118 are typically configured and programmed using a control programming development application such as a ladder logic editor (e.g., executing on a client device 124). Using such development platforms, a designer can write control programming (e.g., ladder logic, structured text, function block diagrams, etc.) for carrying out a desired industrial sequence or process and download the resulting program files to the controller 118. Separately, developers design visualization screens and associated navigation structures for HMIs 114 using an HMI development platform (e.g., executing on client device 122) and download the resulting visualization files to the HMI 114. Some industrial devices 120—such as motor drives, telemetry devices, safety input devices, etc.—may also require configuration using separate device configuration tools (e.g., executing on client device 128) that are specific to the device being configured. Such device configuration tools may be used to set device parameters or operating modes (e.g., high/low limits, output signal formats, scale factors, energy consumption modes, etc.).

The necessity of using separate configuration tools to program and configure disparate aspects of an industrial automation system results in a piecemeal design approach whereby different but related or overlapping aspects of an automation system are designed, configured, and programmed separately on different development environments. For example, a motion control system may require an industrial controller to be programmed and a control loop to be tuned using a control logic programming platform, a motor drive to be configured using another configuration platform, and an associated HMI to be programmed using a visualization development platform. Related peripheral systems—such as vision systems, safety systems, etc.—may also require configuration using separate programming or development applications.

This segregated development approach can also necessitate considerable testing and debugging efforts to ensure proper integration of the separately configured system aspects. In this regard, intended data interfacing or coordinated actions between the different system aspects may require significant debugging due to a failure to properly coordinate disparate programming efforts.

To address at least some of these or other issues, one or more embodiments described herein provide an integrated development environment (IDE) for designing, programming, and configuring multiple aspects of an industrial automation system using a common design environment and data model. Embodiments of the industrial IDE can be used to configure and manage automation system devices in a common way, facilitating integrated, multi-discipline programming of control, visualization, and other aspects of the control system.

In general, the industrial IDE supports features that span the full automation lifecycle, including design (e.g., device selection and sizing, controller programming, visualization development, device configuration, testing, etc.); installation, configuration and commissioning; operation, improvement, and administration; and troubleshooting, expanding, and upgrading.

Embodiments of the industrial IDE can include a library of modular code and visualizations that are specific to industry verticals and common industrial applications within those verticals. These code and visualization modules can simplify development and shorten the development cycle, while also supporting consistency and reuse across an industrial enterprise.

To support enhanced development capabilities, projects creating using embodiments of the IDE system can be built on an object-based model rather than, or in addition to, a tag-based architecture. To this end, the IDE system can support the use of automation objects that serve as building blocks for this object-based development structure. To ensure consistency within and between projects, as well as to ensure that a given industrial project is dynamically updated to reflect changes to an industrial asset's attributes (e.g., control code, visualization definitions, testing scripts, analytic code, etc.), embodiments of the IDE system can use automation object inheritance features to propagate changes made to an automation object definition to all instances of the automation object used throughout a control project.

Additionally, some embodiments of the industrial IDE system can include device profile creation tools that extend the IDE system's capabilities by allowing users to create device profiles using an IDE-type development interface. These tools allow device vendors or end users to easily create device profiles that can be stored in a device profile library and added to automation projects as needed. Device profiles created in this manner can be used to set device configurations or parameter values for corresponding devices—e.g., controller modules, motor drives, smart devices, etc.—within the system project.

Figure 2:
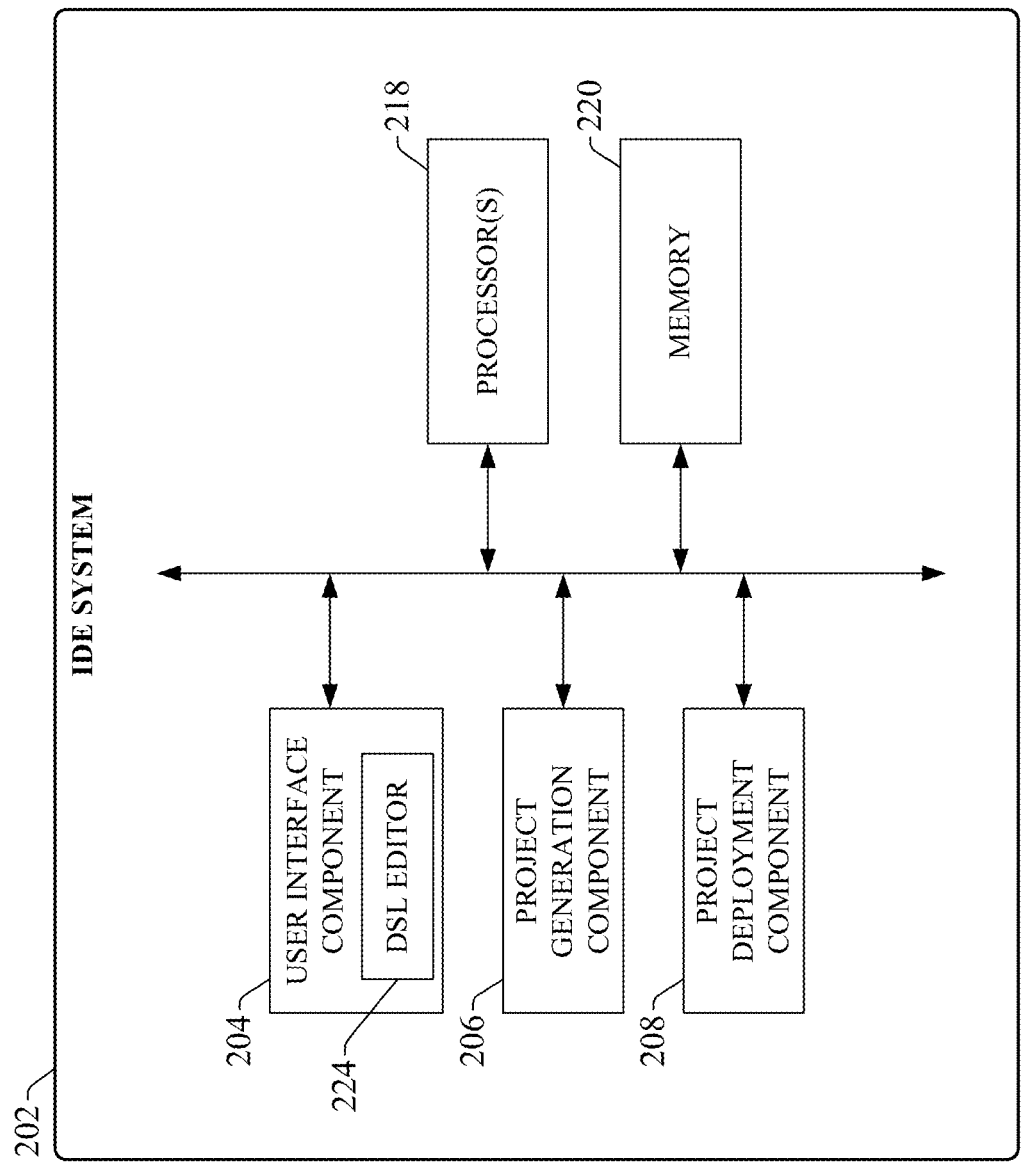
FIG. 2 is a block diagram of an example integrated development environment (IDE) system.

FIG. 2 is a block diagram of an example integrated development environment (IDE) system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

IDE system 202 can include a user interface component 204 including a DSL editor 224, a project generation component 206, a project deployment component 208, one or more processors 218, and memory 220. In various embodiments, one or more of the user interface component 204, project generation component 206, project deployment component 208, the one or more processors 218, and memory 220 can be electrically and/or communicatively coupled to one another to perform one or more of the functions of the IDE system 202. In some embodiments, components 204, 206, and 208, can comprise software instructions stored on memory 220 and executed by processor(s) 218. IDE system 202 may also interact with other hardware and/or software components not depicted in FIG. 2. For example, processor(s) 218 may interact with one or more external user interface devices, such as a keyboard, a mouse, a display monitor, a touchscreen, or other such interface devices.

User interface component 204 can be configured to receive user input and to render output to the user in any suitable format (e.g., visual, audio, tactile, etc.). In some embodiments, user interface component 204 can be configured to communicatively interface with an IDE client that executes on a client device (e.g., a laptop computer, tablet computer, smart phone, etc.) that is communicatively connected to the IDE system 202 (e.g., via a hardwired or wireless connection). The user interface component 204 can then receive user input data and render output data via the IDE client. In other embodiments, user interface component 204 can be configured to generate and serve suitable interface screens to a client device (e.g., program development screens), and exchange data via these interface screens. Input data that can be received via various embodiments of user interface component 204 can include, but is not limited to, programming code, industrial design specifications or goals, engineering drawings, AR/VR input, DSL definitions, video or image data, device configuration data, device profile definition data, or other such input. Output data rendered by various embodiments of user interface component 204 can include program code, programming feedback (e.g., error and highlighting, coding suggestions, etc.), programming and visualization development screens, project testing results, etc.

Project generation component 206 can be configured to create a system project comprising one or more project files based on design input received via the user interface component 204, as well as industrial knowledge, predefined code modules and visualizations, and automation objects 222 maintained by the IDE system 202. Project deployment component 208 can be configured to commission the system project created by the project generation component 206 to appropriate industrial devices (e.g., controllers, HMI terminals, motor drives, AR/VR systems, etc.) for execution. To this end, project deployment component 208 can identify the appropriate target devices to which respective portions of the system project should be sent for execution, translate these respective portions to formats understandable by the target devices, and deploy the translated project components to their corresponding devices.

The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

Figure 3:
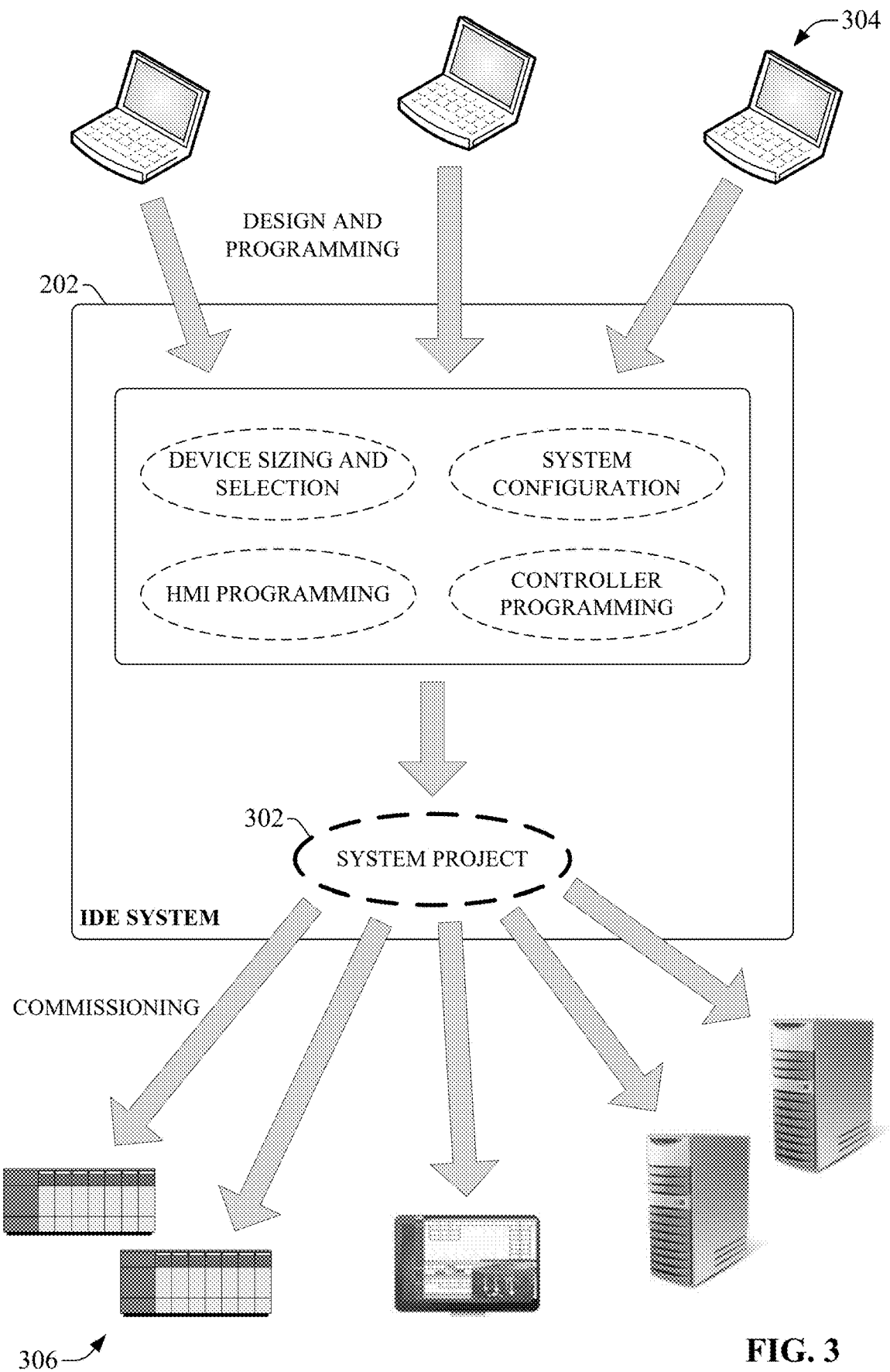
FIG. 3 is a diagram illustrating a generalized architecture of an industrial IDE system.

FIG. 3 is a diagram illustrating a generalized architecture of the industrial IDE system 202 according to one or more embodiments. Industrial IDE system 202 can implement a common set of services and workflows spanning not only design, but also commissioning, operation, and maintenance. In terms of design, the IDE system 202 can support not only industrial controller programming and HMI development, but also sizing and selection of system components, device/system configuration, AR/VR visualizations, and other features. The IDE system 202 can also include tools that simplify and automate commissioning of the resulting project and assist with subsequent administration of the deployed system during runtime.

Embodiments of the IDE system 202 that are implemented on a cloud platform also facilitate collaborative project development whereby multiple developers 304 contribute design and programming input to a common automation system project 302. Collaborative tools supported by the IDE system can manage design contributions from the multiple contributors and perform version control of the aggregate system project 302 to ensure project consistency.

Based on design and programming input from one or more developers 304, IDE system 202 generates a system project 302 comprising one or more project files. The system project 302 encodes one or more of control programming; HMI, AR, and/or VR visualizations; device or sub-system configuration data (e.g., drive parameters, vision system configurations, telemetry device parameters, safety zone definitions, etc.); or other such aspects of an industrial automation system being designed. IDE system 202 can identify the appropriate target devices 306 on which respective aspects of the system project 302 should be executed (e.g., industrial controllers, HMI terminals, variable frequency drives, safety devices, etc.), translate the system project 302 to executable files that can be executed on the respective target devices, and deploy the executable files to their corresponding target devices 306 for execution, thereby commissioning the system project 302 to the plant floor for implementation of the automation project.

Figure 4:
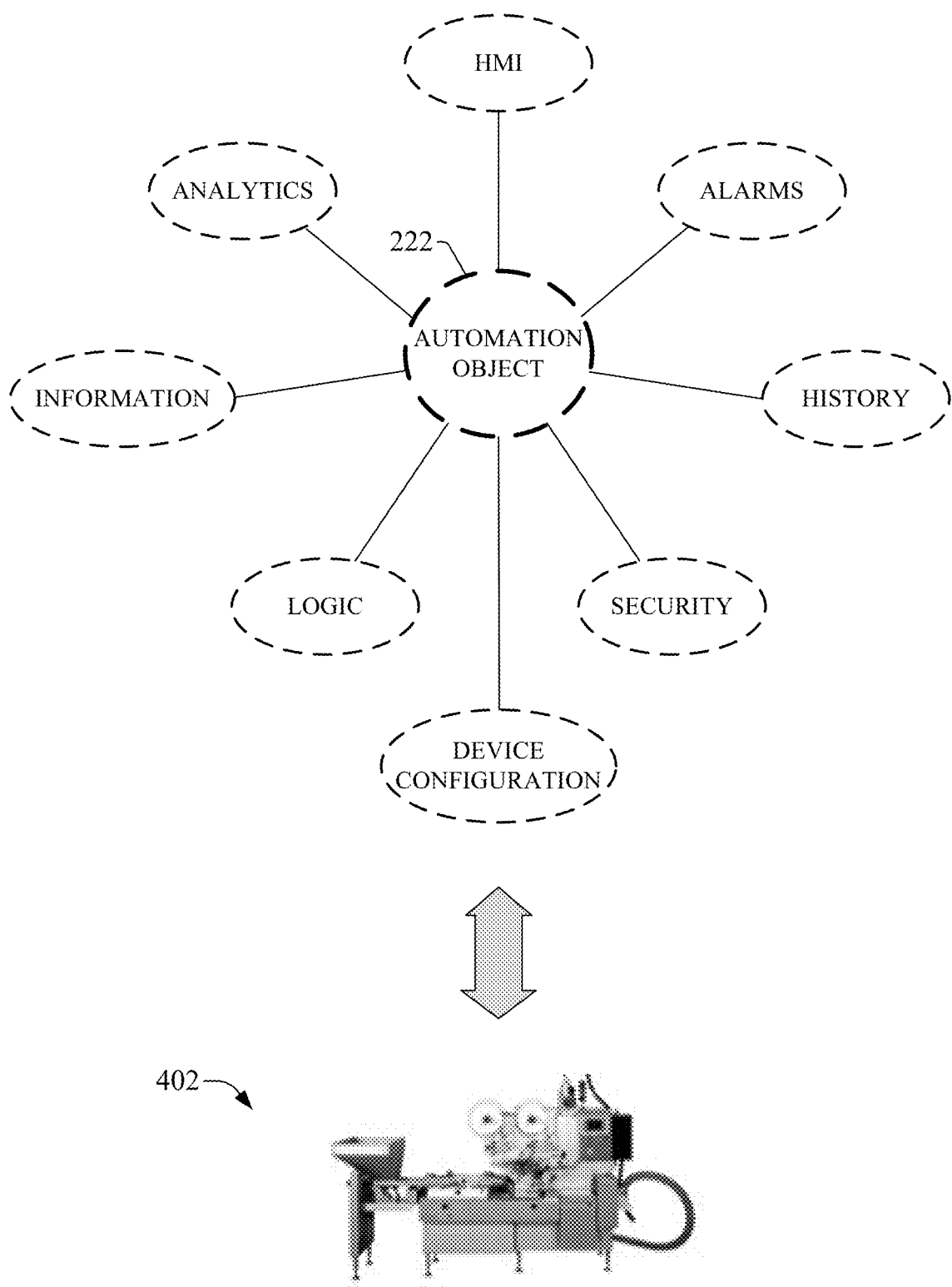
FIG. 4 is a diagram illustrating several example automation object properties that can be leveraged by an industrial IDE system in connection with building, deploying, and executing a system project.

To support enhanced development capabilities, some embodiments of IDE system 202 can be built on an object-based data model rather than, or in addition to, a tag-based architecture. Automation objects 222 serve as the building block for this object-based development architecture. FIG. 4 is a diagram illustrating several example automation object properties that can be leveraged by the IDE system 202 in connection with building, deploying, and executing a system project 302. Automation objects 222 can be created and augmented during design, integrated into larger data models, and consumed during runtime. These automation objects 222 provide a common data structure across the IDE system 202 and can be stored in an object library (e.g., part of memory 220) for reuse. The object library can store predefined automation objects 222 representing various classifications of real-world industrial assets 402, including but not limited to pumps, tanks, values, motors, motor drives (e.g., variable frequency drives), industrial robots, actuators (e.g., pneumatic or hydraulic actuators), or other such assets. Automation objects 222 can represent elements at substantially any level of an industrial enterprise, including individual devices, machines made up of many industrial devices and components (some of which may be associated with their own automation objects 222), and entire production lines or process control systems.

An automation object 222 for a given type of industrial asset can encode such aspects as 2D or 3D visualizations, alarms, control coding (e.g., logic or other type of control programming), analytics, startup procedures, testing protocols and scripts, validation reports, simulations, schematics, security protocols, and other such properties associated with the industrial asset 402 represented by the object 222. As will be described in more detail herein, an automation object 222 can also store device configuration settings for an industrial device as a sequence of mouse and keystroke interactions with a device profile configuration interface, such that these interactions can be played back to facilitate reproducing the device configuration for another device. Automation objects 222 can also be geotagged with location information identifying the location of the associated asset. During runtime of the system project 302, the automation object 222 corresponding to a given real-world asset 402 can also record status or operational history data for the asset. In general, automation objects 222 serve as programmatic representations of their corresponding industrial assets 402, and can be incorporated into a system project 302 as elements of control code, a 2D or 3D visualization, a knowledgebase or maintenance guidance system for the industrial assets, or other such aspects.

Figure 5:
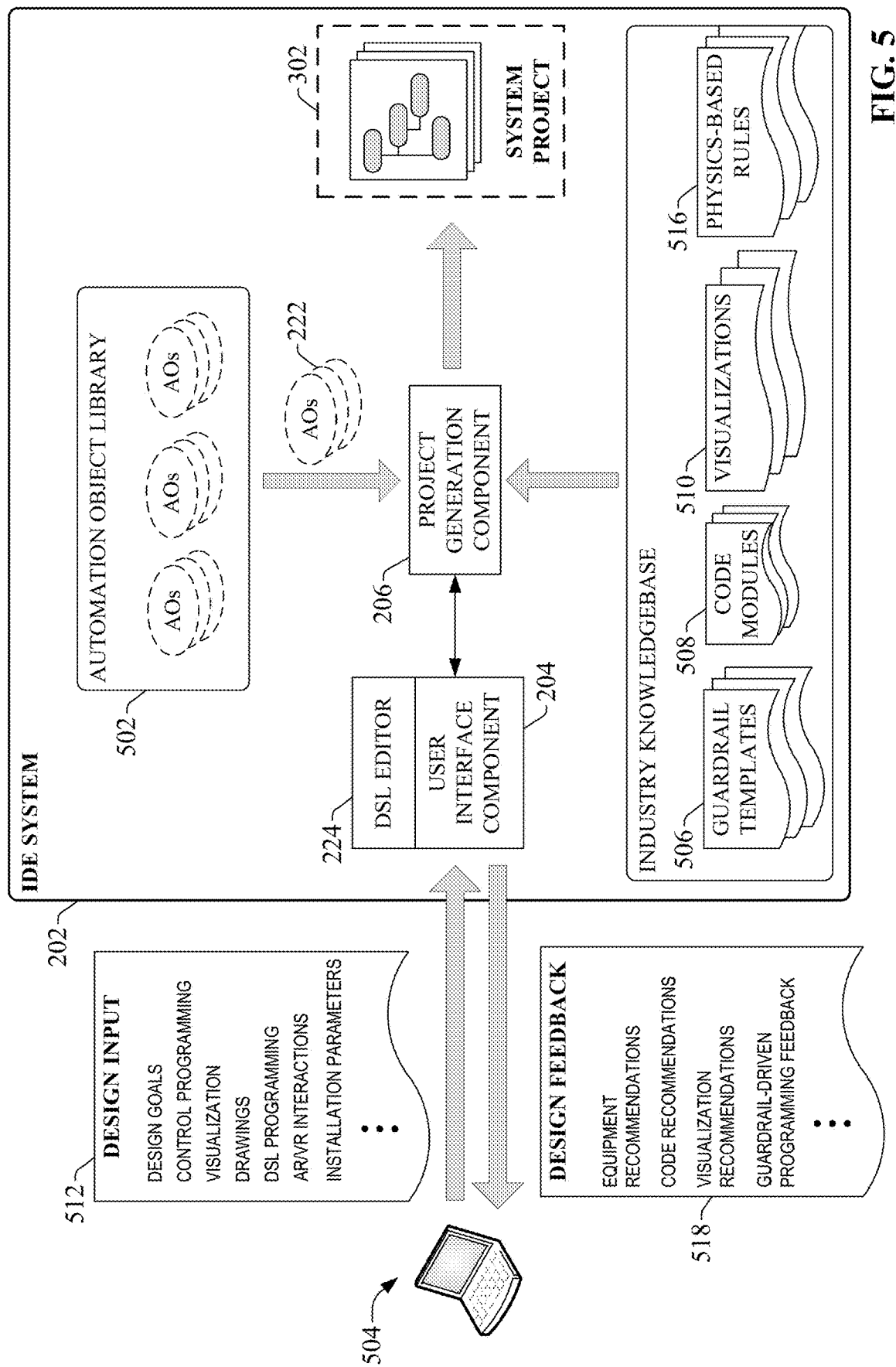
FIG. 5 is a diagram illustrating example data flows associated with creation of a system project for an automation system being designed using and industrial IDE system.

FIG. 5 is a diagram illustrating example data flows associated with creation of a system project 302 for an automation system being designed using IDE system 202 according to one or more embodiments. A client device 504 (e.g., a laptop computer, tablet computer, desktop computer, mobile device, wearable AR/VR appliance, etc.) having suitable access privileges can access the IDE system's project development tools and leverage these tools to create a comprehensive system project 302 for an automation system being developed. Through interaction with the system's user interface component 204, developers can submit design input 512 to the IDE system 202 in various supported formats, including industry-specific control programming (e.g., control logic, structured text, sequential function charts, etc.) and HMI screen configuration input. Based on this design input 512 and information stored in an industry knowledgebase (predefined code modules 508 and visualizations 510, guardrail templates 506, physics-based rules 516, etc.), user interface component 204 renders design feedback 518 designed to assist the developer in connection with developing a system project 302 for configuration, control, and visualization of an industrial automation system.

In addition to control programming and visualization definitions, some embodiments of IDE system 202 can be configured to receive digital engineering drawings (e.g., computer-aided design (CAD) files) as design input 512. In such embodiments, project generation component 206 can generate portions of the system project 302—e.g., by automatically generating control and/or visualization code—based on analysis of existing design drawings. Drawings that can be submitted as design input 512 can include, but are not limited to, P & ID drawings, mechanical drawings, flow diagrams, or other such documents. For example, a P & ID drawing can be imported into the IDE system 202, and project generation component 206 can identify elements (e.g., tanks, pumps, etc.) and relationships therebetween conveyed by the drawings. Project generation component 206 can associate or map elements identified in the drawings with appropriate automation objects 222 corresponding to these elements (e.g., tanks, pumps, etc.) and add these automation objects 222 to the system project 302. The device-specific and asset-specific automation objects 222 include suitable code and visualizations to be associated with the elements identified in the drawings. In general, the IDE system 202 can examine one or more different types of drawings (mechanical, electrical, piping, etc.) to determine relationships between devices, machines, and/or assets (including identifying common elements across different drawings) and intelligently associate these elements with appropriate automation objects 222, code modules 508, and/or visualizations 510. The IDE system 202 can leverage physics-based rules 516 as well as pre-defined code modules 508 and visualizations 510 as necessary in connection with generating code or project data for system project 302.

Also, or in addition, some embodiments of IDE system 202 can support goal-based automated programming. For example, the user interface component 204 can allow the user to specify production goals for an automation system being designed (e.g., specifying that a bottling plant being designed must be capable of producing at least 5000 bottles per second during normal operation) and any other relevant design constraints applied to the design project (e.g., budget limitations, available floor space, available control cabinet space, etc.). Based on this information, the project generation component 206 will generate portions of the system project 302 to satisfy the specified design goals and constraints. Portions of the system project 302 that can be generated in this manner can include, but are not limited to, device and equipment selections (e.g., definitions of how many pumps, controllers, stations, conveyors, drives, or other assets will be needed to satisfy the specified goal), associated device configurations (e.g., tuning parameters, network settings, drive parameters, etc.), control coding, or HMI screens suitable for visualizing the automation system being designed.

Some embodiments of the project generation component 206 can also generate at least some of the project code for system project 302 based on knowledge of parts that have been ordered for the project being developed. This can involve accessing the customer's account information maintained by an equipment vendor to identify devices that have been purchased for the project. Based on this information the project generation component 206 can add appropriate automation objects 222 and associated code modules 508 corresponding to the purchased assets, thereby providing a starting point for project development.

In some embodiments, IDE system 202 can also store and implement guardrail templates 506 that define design guardrails intended to ensure the project's compliance with internal or external design standards. Based on design parameters defined by one or more selected guardrail templates 506, user interface component 204 can provide, as a subset of design feedback 518, dynamic recommendations or other types of feedback designed to guide the developer in a manner that ensures compliance of the system project 302 with internal or external requirements or standards (e.g., certifications such as TUV certification, in-house design standards, industry-specific or vertical-specific design standards, etc.). This feedback 518 can take the form of text-based recommendations (e.g., recommendations to rewrite an indicated portion of control code to comply with a defined programming standard), syntax highlighting, error highlighting, auto-completion of code snippets, or other such formats. In this way, IDE system 202 can customize design feedback 518—including programming recommendations, recommendations of predefined code modules 508 or visualizations 510, error and syntax highlighting, etc.—in accordance with the type of industrial system being developed and any applicable in-house design standards.

Guardrail templates 506 can also be designed to maintain compliance with global best practices applicable to control programming or other aspects of project development. For example, user interface component 204 may generate and render an alert if a developer's control programming is deemed to be too complex as defined by criteria specified by one or more guardrail templates 506. Since different verticals (e.g., automotive, pharmaceutical, oil and gas, food and drug, marine, etc.) must adhere to different standards and certifications, the IDE system 202 can maintain a library of guardrail templates 506 for different internal and external standards and certifications, including customized user-specific guardrail templates 506. These guardrail templates 506 can be classified according to industrial vertical, type of industrial application, plant facility (in the case of custom in-house guardrail templates 506) or other such categories. During development, project generation component 206 can select and apply a subset of guardrail templates 506 determined to be relevant to the project currently being developed, based on a determination of such aspects as the industrial vertical to which the project relates, the type of industrial application being programmed (e.g., flow control, web tension control, a certain batch process, etc.), or other such aspects. Project generation component 206 can leverage guardrail templates 506 to implement rules-based programming, whereby programming feedback (a subset of design feedback 518) such as dynamic intelligent autocorrection, type-aheads, or coding suggestions are rendered based on encoded industry expertise and best practices (e.g., identifying inefficiencies in code being developed and recommending appropriate corrections).

Users can also run their own internal guardrail templates 506 against code provided by outside vendors (e.g., OEMs) to ensure that this code complies with in-house programming standards. In such scenarios, vendor-provided code can be submitted to the IDE system 202, and project generation component 206 can analyze this code in view of in-house coding standards specified by one or more custom guardrail templates 506. Based on results of this analysis, user interface component 204 can indicate portions of the vendor-provided code (e.g., using highlights, overlaid text, etc.) that do not conform to the programming standards set forth by the guardrail templates 506, and display suggestions for modifying the code in order to bring the code into compliance. As an alternative or in addition to recommending these modifications, some embodiments of project generation component 206 can be configured to automatically modify the code in accordance with the recommendations to bring the code into conformance.

In making coding suggestions as part of design feedback 518, project generation component 206 can invoke selected code modules 508 stored in a code module database or selected automation objects 222 stored in an automation object library 502 (e.g., on memory 220). Code modules 508 comprise standardized coding segments for controlling common industrial tasks or applications (e.g., palletizing, flow control, web tension control, pick-and-place applications, conveyor control, etc.). Similarly, automation objects 222 representing respective industrial assets may have associated therewith standardize control code for monitoring and controlling their respective assets. In some embodiments, code modules 508 and/or automation objects 222 can be categorized according to one or more of an industrial vertical (e.g., automotive, food and drug, oil and gas, textiles, marine, pharmaceutical, etc.), an industrial application, or a type of machine or device to which the code module 508 or automation object 222 is applicable.

In some embodiments, project generation component 206 can infer a programmer's current programming task or design goal based on programmatic input being provided by the programmer (as a subset of design input 512), and determine, based on this task or goal, whether one of the pre-defined code modules 508 or automation objects 222 may be appropriately added to the control program being developed to achieve the inferred task or goal. For example, project generation component 206 may infer, based on analysis of design input 512, that the programmer is currently developing control code for transferring material from a first tank to another tank, and in response, recommend inclusion of a predefined code module 508 comprising standardized or frequently utilized code for controlling the valves, pumps, or other assets necessary to achieve the material transfer. Similarly, the project generation component 206 may recommend inclusion of an automation object 222 representing one of the tanks, or one of the other industrial assets involved in transferring the material (e.g., a valve, a pump, etc.), where the recommended automation object 222 includes associated control code for controlling its associated asset as well as a visualization object that can be used to visualize the asset on an HMI application or another visualization application.

Customized guardrail templates 506 can also be defined to capture nuances of a customer site that should be taken into consideration in the project design. For example, a guardrail template 506 could record the fact that the automation system being designed will be installed in a region where power outages are common, and will factor this consideration when generating design feedback 518; e.g., by recommending implementation of backup uninterruptable power supplies and suggesting how these should be incorporated, as well as recommending associated programming or control strategies that take these outages into account.

IDE system 202 can also use guardrail templates 506 to guide user selection of equipment or devices for a given design goal; e.g., based on the industrial vertical, type of control application (e.g., sheet metal stamping, die casting, palletization, conveyor control, web tension control, batch processing, etc.), budgetary constraints for the project, physical constraints at the installation site (e.g., available floor, wall or cabinet space; dimensions of the installation space; etc.), equipment already existing at the site, etc. Some or all of these parameters and constraints can be provided as design input 512, and user interface component 204 can render the equipment recommendations as a subset of design feedback 518. In conjunction with this equipment recommendation, the project generation component 206 can also recommend inclusion of corresponding automation objects 222 representing the recommended equipment for inclusion in the system project 302.

Figure 6:
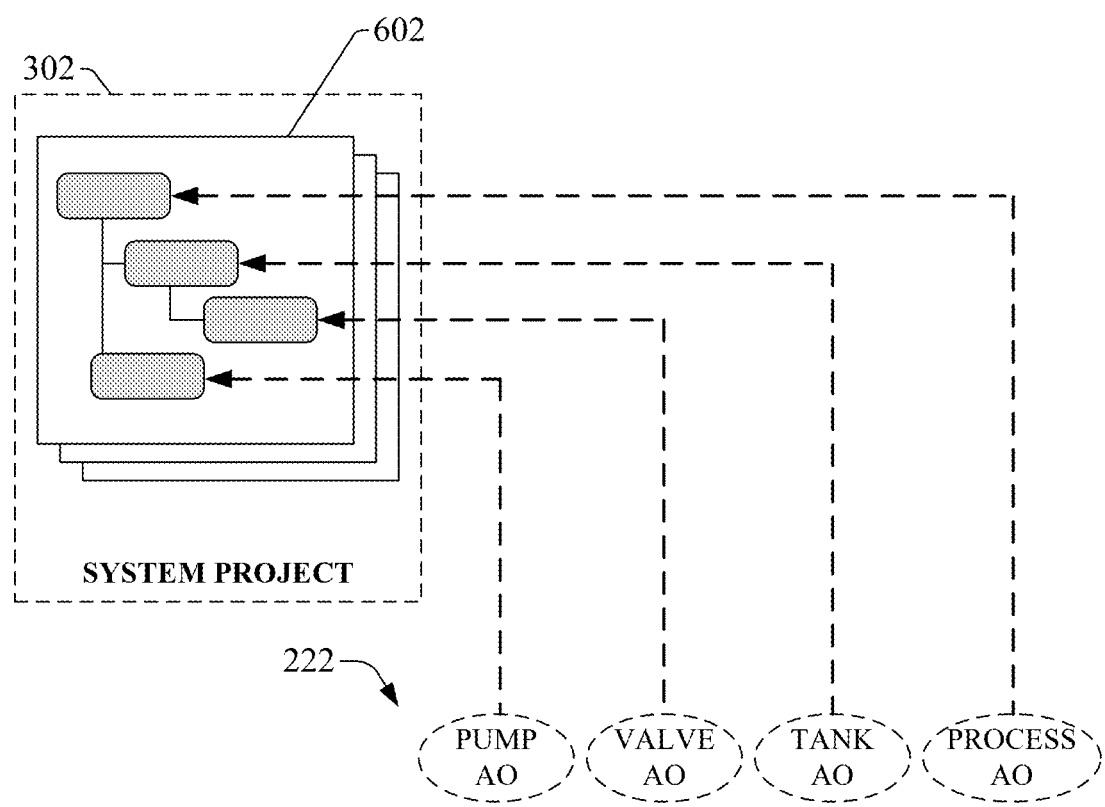
FIG. 6 is a diagram illustrating an example system project that incorporates automation objects into a project model.

As noted above, the system project 302 generated by IDE system 202 for a given automaton system being designed can be built upon an object-based architecture that uses automation objects 222 as building blocks. FIG. 6 is a diagram illustrating an example system project 302 that incorporates automation objects 222 into the project model. In this example, various automation objects 222 representing analogous industrial devices, systems, or assets of an automation system (e.g., a process, tanks, valves, pumps, etc.) have been incorporated into system project 302 as elements of a larger project data model 602. The project data model 602 also defines hierarchical relationships between these automation objects 222. According to an example relationship, a process automation object representing a batch process may be defined as a parent object to a number of child objects representing devices and equipment that carry out the process, such as tanks, pumps, and valves. Each automation object 222 has associated therewith object properties or attributes specific to its corresponding industrial asset (e.g., those discussed above in connection with FIG. 4), including executable control programming for controlling the asset (or for coordinating the actions of the asset with other industrial assets) and visualizations that can be used to render relevant information about the asset during runtime.

At least some of the attributes of each automation object 222 are default properties defined by the IDE system 202 based on encoded industry expertise pertaining to the asset represented by the objects. These default properties can include, for example, industry-standard or recommended control code for monitoring and controlling the asset represented by the automation object 222, a 2D or 3D graphical object that can be used to visualize operational or statistical data for the asset, alarm conditions associated with the asset, analytic or reporting scripts designed to yield actionable insights into the asset's behavior, or other such properties. Other properties can be modified or added by the developer as needed (via design input 512) to customize the automation object 222 for the particular asset and/or industrial application for which the system projects 302 is being developed. This can include, for example, associating customized control code, HMI screens, AR presentations, or help files associated with selected automation objects 222. In this way, automation objects 222 can be created and augmented as needed during design for consumption or execution by target control devices during runtime.

Figure 7:
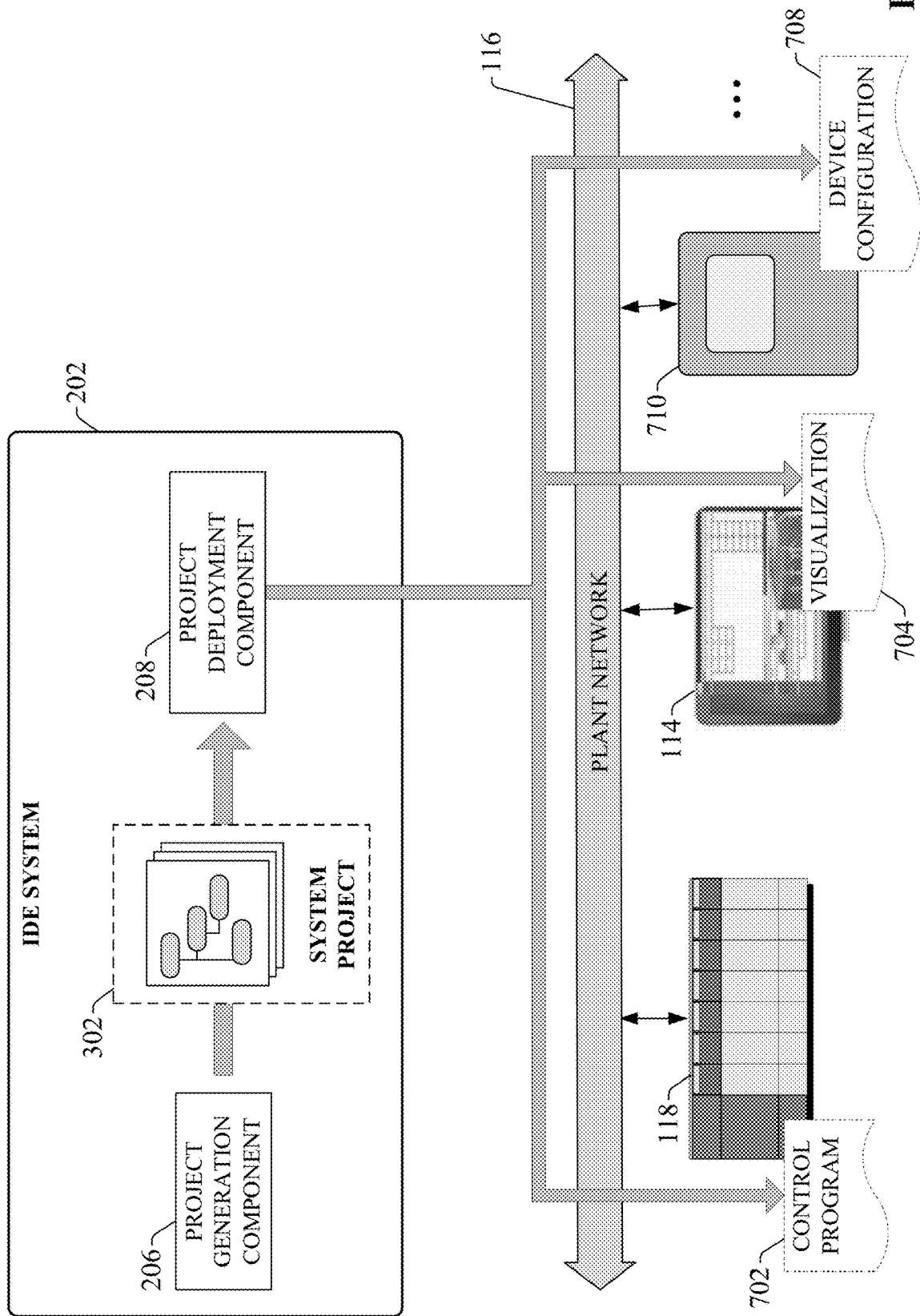
FIG. 7 is a diagram illustrating commissioning of a system project.

Once development and testing on a system project 302 has been completed, commissioning tools supported by the IDE system 202 can simplify the process of commissioning the project in the field. When the system project 302 for a given automation system has been completed, the system project 302 can be deployed to one or more target control devices for execution. FIG. 7 is a diagram illustrating commissioning of a system project 302. Project deployment component 208 can compile or otherwise translate a completed system project 302 into one or more executable files or configuration files that can be stored and executed on respective target industrial devices of the automation system (e.g., industrial controllers 118, HMI terminals 114 or other types of visualization systems, motor drives 710, telemetry devices, vision systems, safety relays, etc.).

Conventional control program development platforms require the developer to specify the type of industrial controller (e.g., the controller's model number) on which the control program will run prior to development, thereby binding the control programming to a specified controller. Controller-specific guardrails are then enforced during program development which limit how the program is developed given the capabilities of the selected controller. By contrast, some embodiments of the IDE system 202 can abstract project development from the specific controller type, allowing the designer to develop the system project 302 as a logical representation of the automation system in a manner that is agnostic to where and how the various control aspects of system project 302 will run. Once project development is complete and system project 302 is ready for commissioning, the user can specify (via user interface component 204) target devices on which respective aspects of the system project 302 are to be executed. In response, an allocation engine of the project deployment component 208 will translate aspects of the system project 302 to respective executable files formatted for storage and execution on their respective target devices.

For example, system project 302 may include—among other project aspects—control code, visualization screen definitions, and motor drive parameter definitions. Upon completion of project development, a user can identify which target devices—including an industrial controller 118, an HMI terminal 114, and a motor drive 710—are to execute or receive these respective aspects of the system project 302. Project deployment component 208 can then translate the controller code defined by the system project 302 to a control program file 702 formatted for execution on the specified industrial controller 118 and send this control program file 702 to the controller 118 (e.g., via plant network 116). Similarly, project deployment component 208 can translate the visualization definitions and motor drive parameter definitions to a visualization application 704 and a device configuration file 708, respectively, and deploy these files to their respective target devices for execution and/or device configuration.

In general, project deployment component 208 performs any conversions necessary to allow aspects of system project 302 to execute on the specified devices. Any inherent relationships, handshakes, or data sharing defined in the system project 302 are maintained regardless of how the various elements of the system project 302 are distributed. In this way, embodiments of the IDE system 202 can decouple the project from how and where the project is to be run. This also allows the same system project 302 to be commissioned at different plant facilities having different sets of control equipment. That is, some embodiments of the IDE system 202 can allocate project code to different target devices as a function of the particular devices found on-site. IDE system 202 can also allow some portions of the project file to be commissioned as an emulator or on a cloud-based controller.

As an alternative to having the user specify the target control devices to which the system project 302 is to be deployed, some embodiments of IDE system 202 can actively connect to the plant network 116 and discover available devices, ascertain the control hardware architecture present on the plant floor, infer appropriate target devices for respective executable aspects of system project 302, and deploy the system project 302 to these selected target devices. As part of this commissioning process, IDE system 202 can also connect to remote knowledgebases (e.g., web-based or cloud-based knowledgebases) to determine which discovered devices are out of date or require firmware upgrade to properly execute the system project 302. In this way, the IDE system 202 can serve as a link between device vendors and a customer's plant ecosystem via a trusted connection in the cloud.

Copies of system project 302 can be propagated to multiple plant facilities having varying equipment configurations using smart propagation, whereby the project deployment component 208 intelligently associates project components with the correct industrial asset or control device even if the equipment on-site does not perfectly match the defined target (e.g., if different pump types are found at different sites). For target devices that do not perfectly match the expected asset, project deployment component 208 can calculate the estimated impact of running the system project 302 on non-optimal target equipment and generate warnings or recommendations for mitigating expected deviations from optimal project execution.

Figure 8:
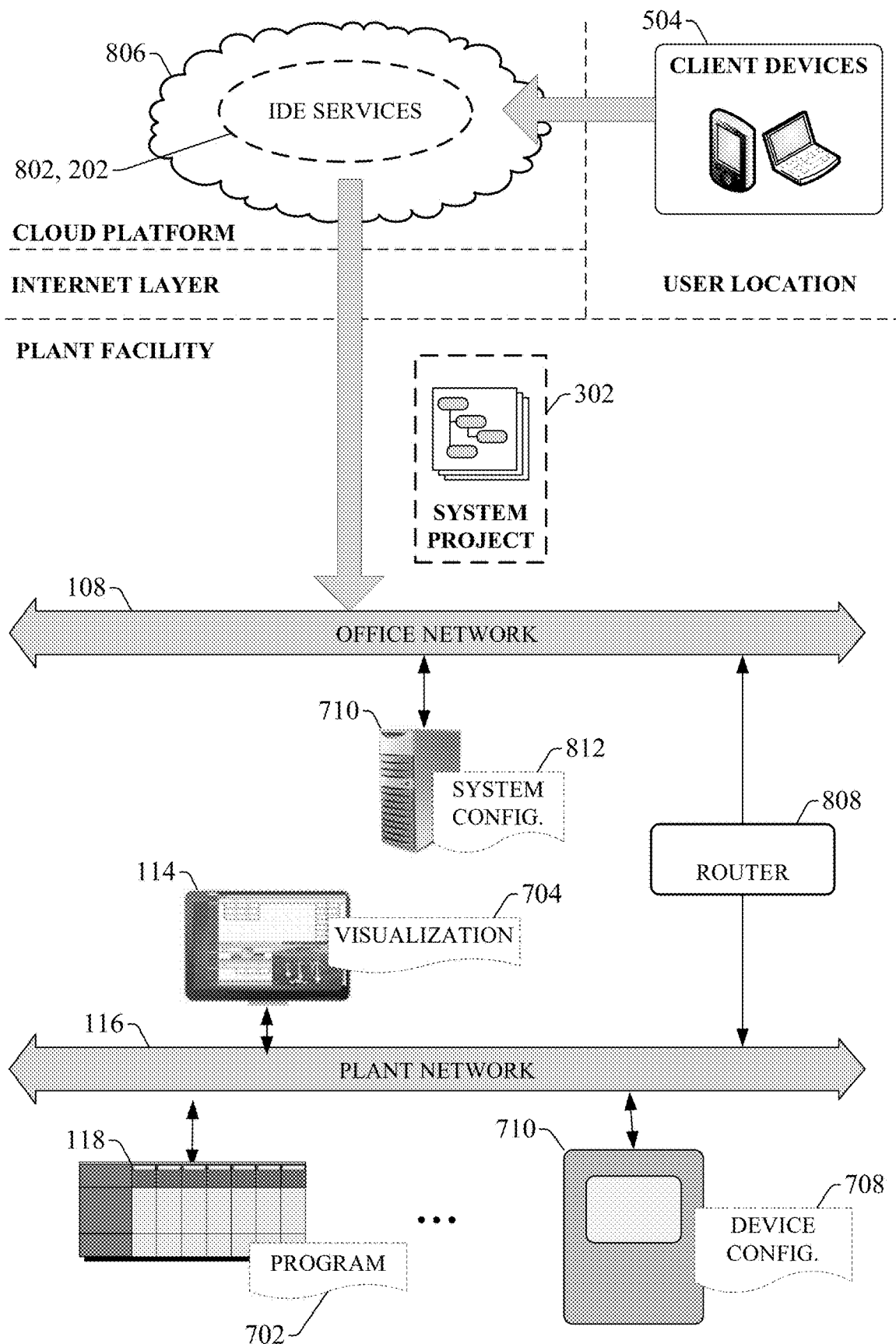
FIG. 8 is a diagram illustrating an example architecture in which cloud-based IDE services are used to develop and deploy industrial applications to a plant environment.

As noted above, some embodiments of IDE system 202 can be embodied on a cloud platform. FIG. 8 is a diagram illustrating an example architecture in which cloud-based IDE services 802 are used to develop and deploy industrial applications to a plant environment. In this example, the industrial environment includes one or more industrial controllers 118, HMI terminals 114, motor drives 710, servers 801 running higher level applications (e.g., ERP, MES, etc.), and other such industrial assets. These industrial assets are connected to a plant network 116 (e.g., a common industrial protocol network, an Ethernet/IP network, etc.) that facilitates data exchange between industrial devices on the plant floor. Plant network 116 may be a wired or a wireless network. In the illustrated example, the high-level servers 810 reside on a separate office network 108 that is connected to the plant network 116 (e.g., through a router 808 or other network infrastructure device).

In this example, IDE system 202 resides on a cloud platform 806 and executes as a set of cloud-based IDE service 802 that are accessible to authorized remote client devices 504. Cloud platform 806 can be any infrastructure that allows shared computing services (such as IDE services 802) to be accessed and utilized by cloud-capable devices. Cloud platform 806 can be a public cloud accessible via the Internet by devices 504 having Internet connectivity and appropriate authorizations to utilize the IDE services 802. In some scenarios, cloud platform 806 can be provided by a cloud provider as a platform-as-a-service (PaaS), and the IDE services 802 can reside and execute on the cloud platform 806 as a cloud-based service. In some such configurations, access to the cloud platform 806 and associated IDE services 802 can be provided to customers as a subscription service by an owner of the IDE services 802. Alternatively, cloud platform 806 can be a private cloud operated internally by the industrial enterprise (the owner of the plant facility). An example private cloud platform can comprise a set of servers hosting the IDE services 802 and residing on a corporate network protected by a firewall.

Cloud-based implementations of IDE system 202 can facilitate collaborative development by multiple remote developers who are authorized to access the IDE services 802. When a system project 302 is ready for deployment, the project 302 can be commissioned to the plant facility via a secure connection between the office network 108 or the plant network 116 and the cloud platform 806. As discussed above, the industrial IDE services 802 can translate system project 302 to one or more appropriate executable files—control program files 702, visualization applications 704, device configuration files 708, system configuration files 812—and deploy these files to the appropriate devices in the plant facility to facilitate implementation of the automation project.

Figure 9:
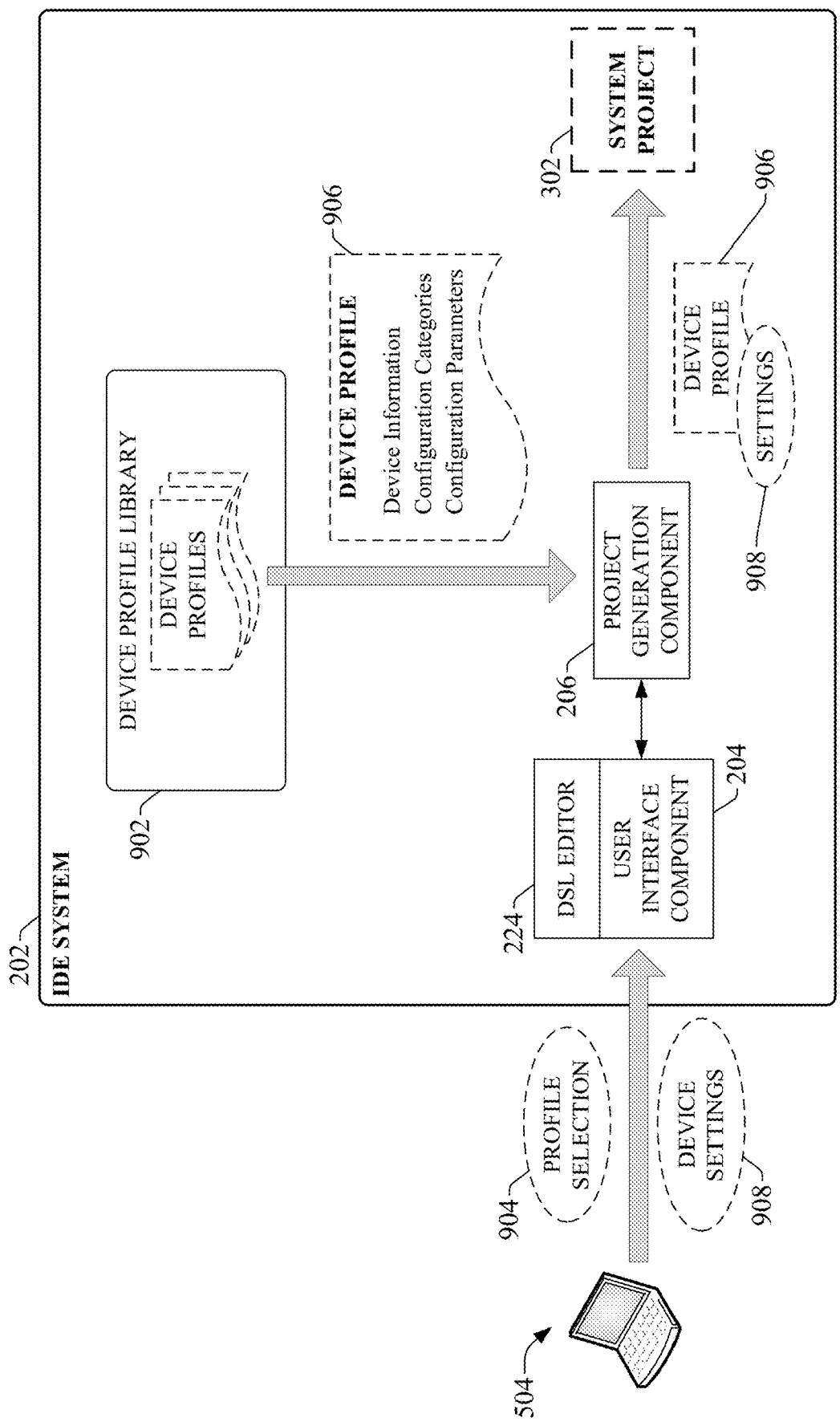
FIG. 9 is a diagram illustrating selection of device profiles from a profile library for inclusion in a system project.

Some embodiments of the industrial IDE system 202 can support the use of device profiles to facilitate setting values of configurable device parameters for devices that are to be included in the automation project. FIG. 9 is a diagram illustrating configuration of device parameters using device profiles 906. In general, each device profile 906 corresponds to a device type, and is a re-usable object or file that defines a set of configurable device parameters—e.g., network or communication settings, scale factors, input or output signal types, operating mode settings, tuning parameter values, maximum or minimum values, refresh rates, channel configurations, etc.—for its corresponding device type. Each device profile 906 can organize these device configuration parameters into categories to assist the user in locating a desired parameter. The device profile 906 can also record general information about the device, some of which can be modified by the user to customize a generic device type to reflect a specific device (an instance of the device type).

The IDE system 202 can store device profiles 906 for multiple types of devices in a device profile library 902 for selective inclusion in system projects 302. Device profiles 906 can be defined for a variety of different industrial devices or systems, including but not limited to industrial controller modules (e.g., analog or digital input and output modules, networking or scanner modules, special function modules, etc.), variable frequency drives, telemetry devices, safety relays, vision systems, or other such devices.

As illustrated in FIG. 9, during development of a system project 302, a user can interact with the IDE system's development interface to select a device profile 906 to be added to the project 302. The selected profile 906 typically corresponds to a type of device that will be included in the automation system for which the project 302 is being developed. Once a selected device profile 906 has been added to the system project 302 (via submission of profile selection input 904), the user can invoke device configuration interfaces defined by the device profile 906 and interact with these configuration interfaces to set values of device parameters or settings 908 for the device represented by the profile 906. When the system project 302 is subsequently deployed to the industrial controller 118 or other devices that make up the automation system (as illustrated in FIGS. 7 and 8), the device configuration settings 908 that had been submitted by the user are written to corresponding registers of the relevant field devices (e.g., the industrial controller 118 in the case of I/O modules or smart devices connected to the controller 118, or other target devices that are subject to the device settings).

Figure 10:
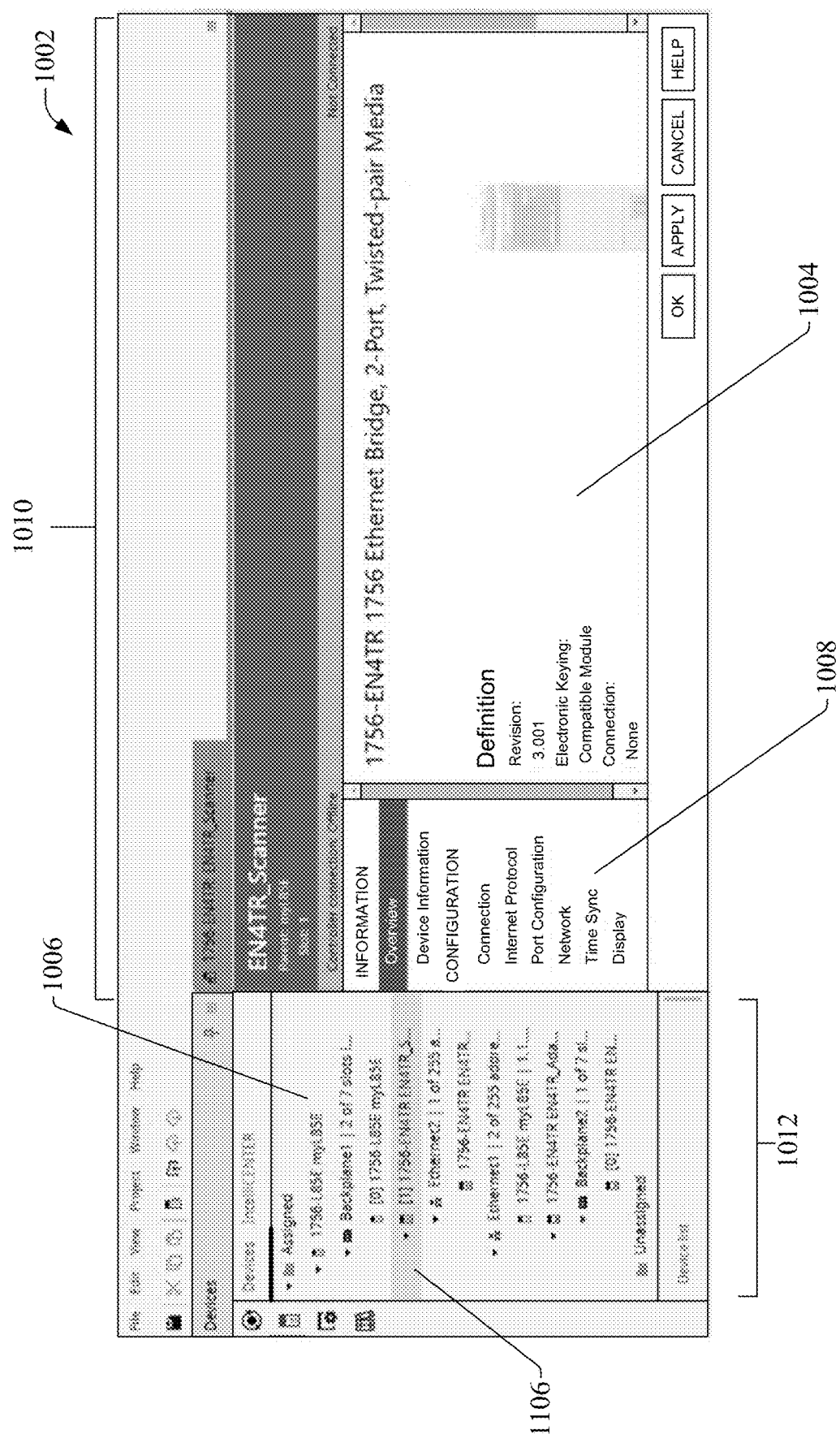
FIG. 10 is an example device profile interface that can be rendered on a client device by an industrial IDE.

FIG. 10 is an example development interface 1002 that can be rendered on a client device by the industrial IDE system's user interface component 204. Development interface 1002 is organized into panels and workspaces for navigating and editing the system project 302. The example interface 1002 depicted in FIG. 10 comprises a main workspace area 1010 that serves as the IDE system's primary work area and an explorer panel 1012 located adjacent to the main workspace area 1010. The explorer panel 1012 displays a project tree 1006 comprising a hierarchical arrangement of selectable nodes representing elements of the system project 302 being developed. In general, selection of a project element from the project tree 1006 causes the main workspace area 1010 to render project content corresponding to the selected element, such as ladder logic or other types of control code, program routines, controller tag definitions, device configuration information, or other aspects of the project 302. The user can interact with these project elements within the main workspace area 1010 to perform such development functions as writing or editing controller code (e.g., ladder logic, function block diagrams, structured text, etc.), configuring device parameter settings, defining controller tags, or other such project development functions.

Figure 11:
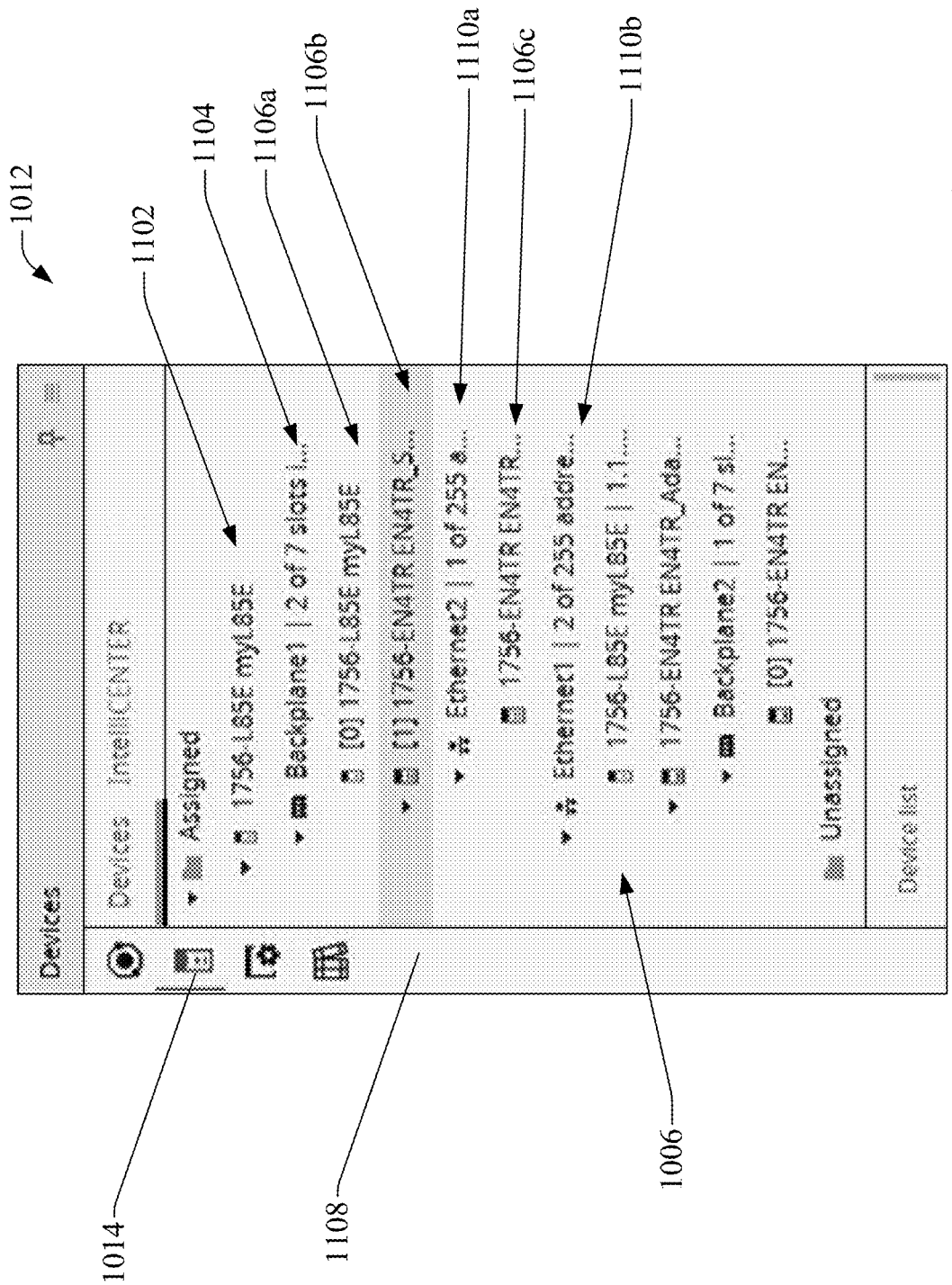
FIG. 11 is a view of a device profile interface explorer panel and its associated navigation tree.

FIG. 11 is a view of the explorer panel 1012 and its associated project tree 1006 in isolation. As noted above, explorer panel 1012 serves as a means for navigating and viewing content of a system project 302 and supports various ways for performing this navigation. Selectable viewing categories are rendered as selectable explorer icons in a control bar 1108 pinned to the left-side edge of the explorer panel 1012. Selection of an explorer icon from the control bar 1108 sets the type of project content to be browsed via the Explorer panel 1012. In the scenario depicted in FIG. 11, a Devices view icon 1014 has been selected in the control bar 1108, causing the explorer panel 1012 to display, as the project tree 1006, a hierarchical arrangement of device nodes 1106 representing the devices defined for the system project 302.

For an example system project 302, the project tree 1006 can include a controller node 1102 representing an industrial controller 118 to be programmed as part of the system project 302. A backplane node 1104 is defined as a child node of the controller node 1102 and represents the backplane of the industrial controller 118 on which one or more devices or modules will be installed. Any modules or devices to be connected to the controller's backplane are represented as device nodes 1106 below the backplane node 1104. Example devices that can be associated with the controller can include, but are not limited to, digital or analog input modules, digital or analog output modules, networking or scanning modules, analytic modules, special function modules, smart industrial devices, motor drives such as variable frequency drives, or other such devices. Per the workflow illustrated in FIG. 9, a user can add a new device to the project by adding a new device node 1106—representing a device profile 906 for the type of the device—to the project tree 1006. Any suitable interaction can be used to add a new device to the project tree 1006. For example, the user may select the backplane node 1104 and invoke a device profile selection window (e.g., by right-clicking on the backplane node 1104) that displays a list of available types of devices that can be added to the project 302. Each device type has a corresponding device profile 906 stored in the system's device profile library 902. The device profile 906 defines information about the corresponding device type, as well as any device parameters associated with the device type whose values can be set by the user.

The explorer icons rendered on the control bar 1108 can also include an Application icon that causes the explorer panel 1012 to display a list of applications—e.g., industrial control programs such as ladder logic routines—that make up the system project 302. This viewing mode allows the user to develop, view, and edit control programs within the main workspace area 1010. These control programs will be installed and executed on the industrial controller 118.

Returning to FIG. 10, selecting a device node 1106 in the project tree 1006 causes the main workspace area 1010 to display an interactive device configuration interface for viewing and editing configuration parameters for the selected device. Device information and configurable device parameters displayed on this device configuration interface are defined by the device profile 906 for the selected device. In the example depicted in FIG. 10, the device configuration interface comprises a main configuration area 1004 and a category window 1008 that lists various informational and configuration categories for the device. Selecting a category from this window 1008 causes the main device configuration area 1004 to render information or configurable device parameters relating to the selected category.

Informational categories listed in the category window 1008 can include an Overview category and a more detailed Device Information category. Selection of the Overview category can cause summary information about the device—e.g., model number and revision number of the device, device type, a type of electronic keying, or other such information—to be rendered in the main workspace area 1010. In the example depicted in FIG. 10, the user has selected a device node 1106 representing an ethernet bridge module that will be installed on the controller's backplane, and has selected the Overview category within the category window 1008 so that general overview information for the module can be viewed.

Figure 12:
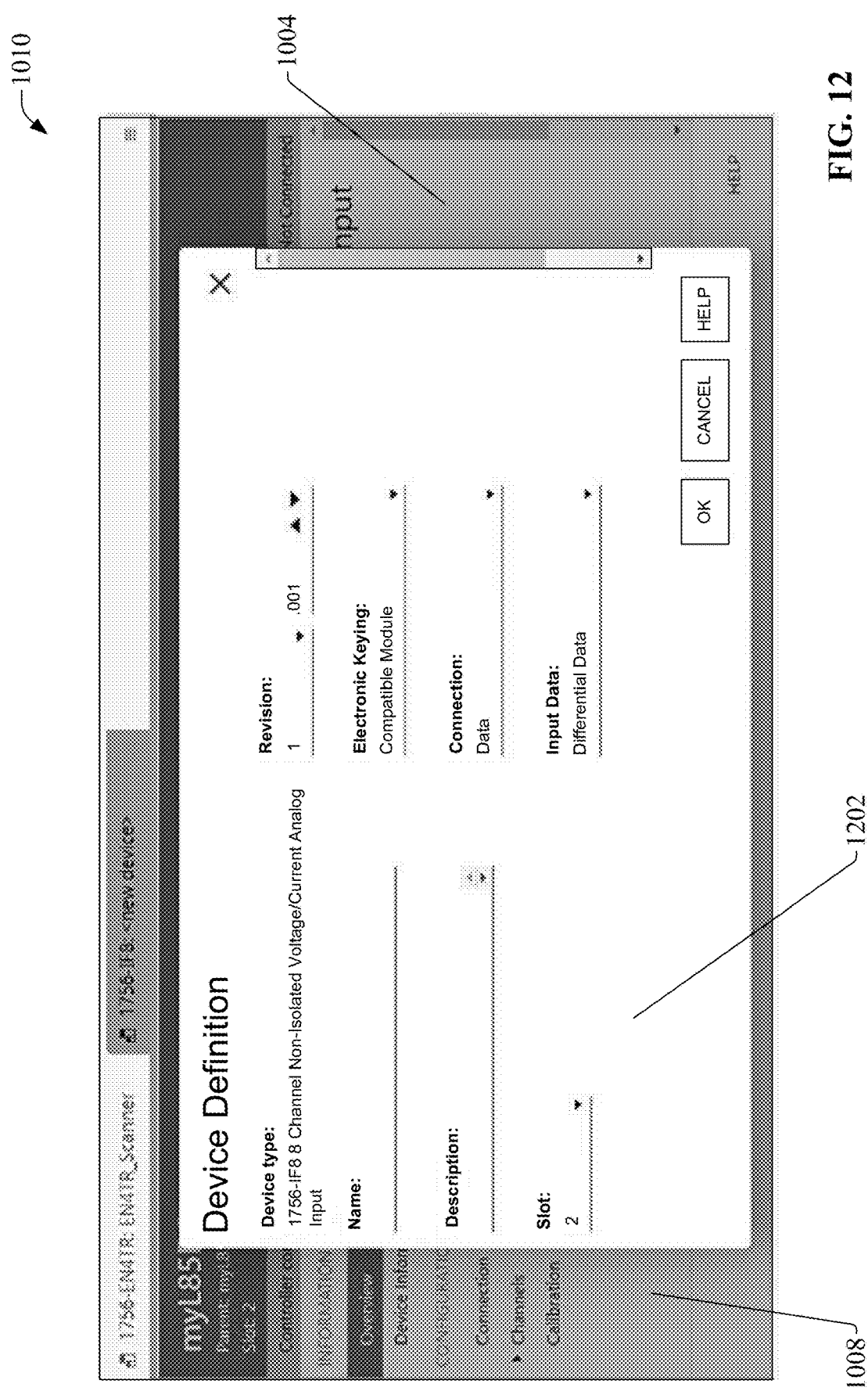
FIG. 12 is a view of the main workspace area of a device profile interface in which a Device Information editing window has been invoked for the selected device.

Depending on the type of device, some of the device information accessible via the Overview or Device Information categories can be edited by the user. FIG. 12 is a view of the main workspace area 1010 in which a Device Information editing window 1202 has been invoked for the selected device. This window 1202 includes data fields that allow the user to enter or edit various items of information about the device, including but not limited to a name of the device, a description of the device, a controller slot number in which the device is to be installed (if the device is a module to be installed on a controller backplane), revision information, a type of electronic keying, a type of connection, a type of input data, or other such information.

Figure 13A:
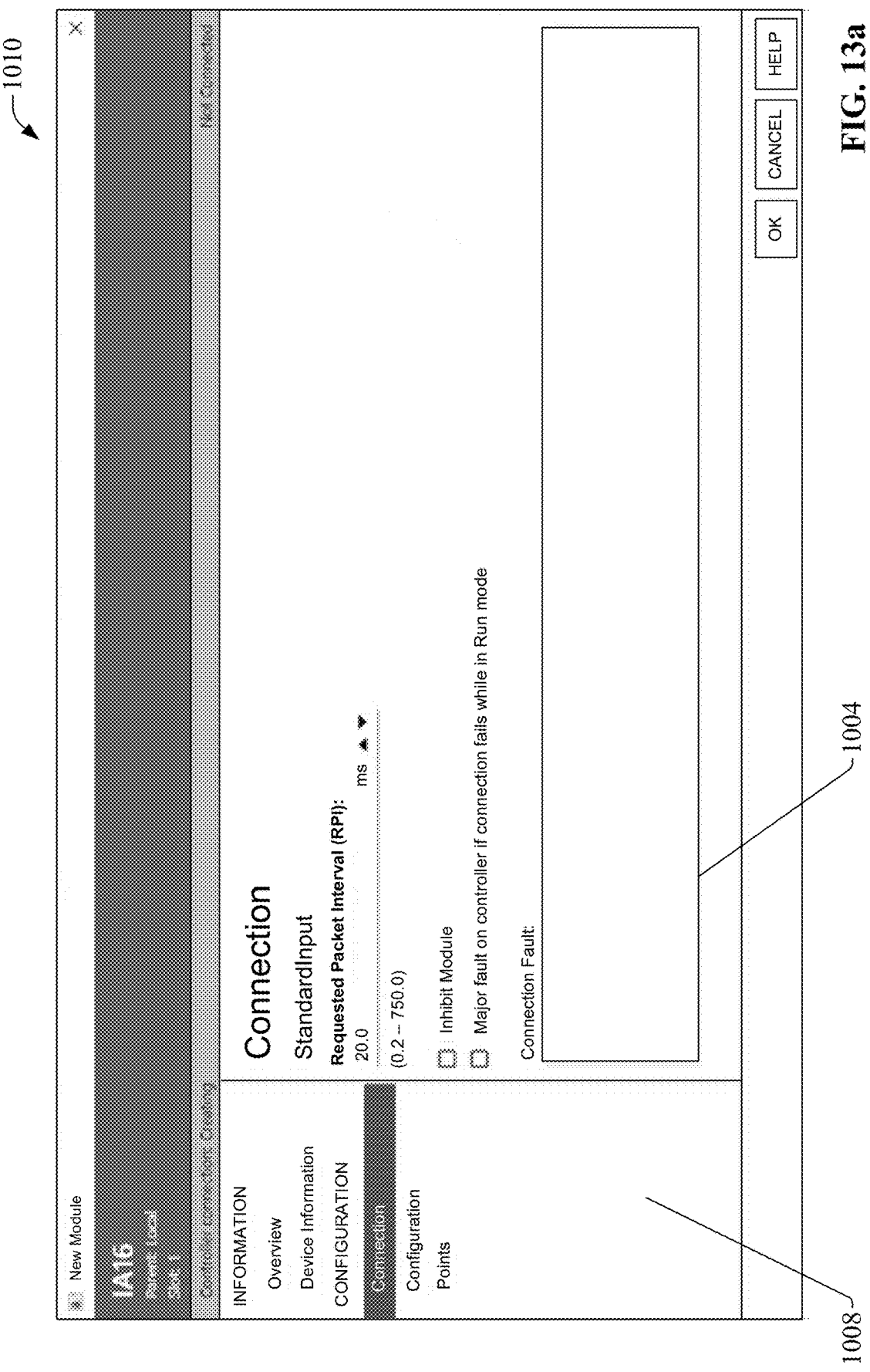
FIG. 13a is a view of a main workspace area of a device profile interface in which the user has selected a 16-point digital input module.

Returning again to FIG. 10, configuration categories listed in the category window 1008 can include, for example, a Connection category, an Internet Protocol category, a Port Configuration category, a Network category, a Time Sync category, a Display category, a Channels category, a Calibration category, an I/O points category, or other such configuration categories. The available configuration categories, as well as the specific parameters that are accessible under each category, can depend on the type of device being viewed. For example, FIG. 13a is a view of the main workspace area 1010 in which the user has selected a 16-point digital input module. Available configuration categories listed in the Category window 1008 for this type of device include a Connection category, a Configuration category, and a Points category. The Connection category has been selected in FIG. 13, causing the configuration area 1004 to display configurable connection parameters for the module. These parameters include a packet interval timing, an indication as to whether the module is to be inhibited, and an indication as to whether a connection failure is to trigger a major fault on the controller 118. The configuration area renders interactive graphical controls—e.g., data entry boxes, drop down selection windows, binary check boxes, etc.—for each configurable parameter to allow the user to enter values of these parameters.

Figure 13B:
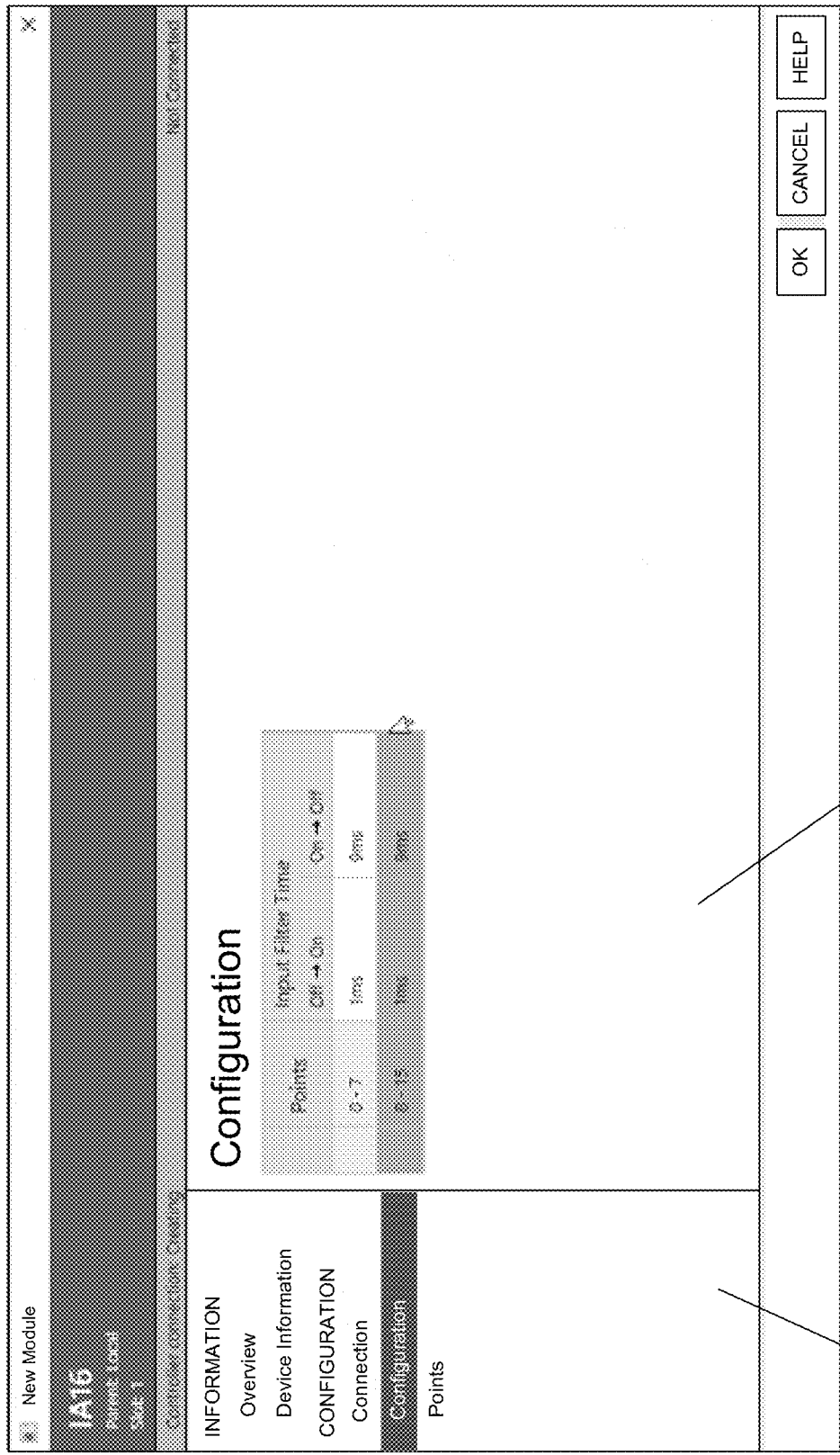
FIG. 13b is a view of the main workspace area of a device profile interface in which the Configuration category has been selected in the Category window.
Figure 13C:
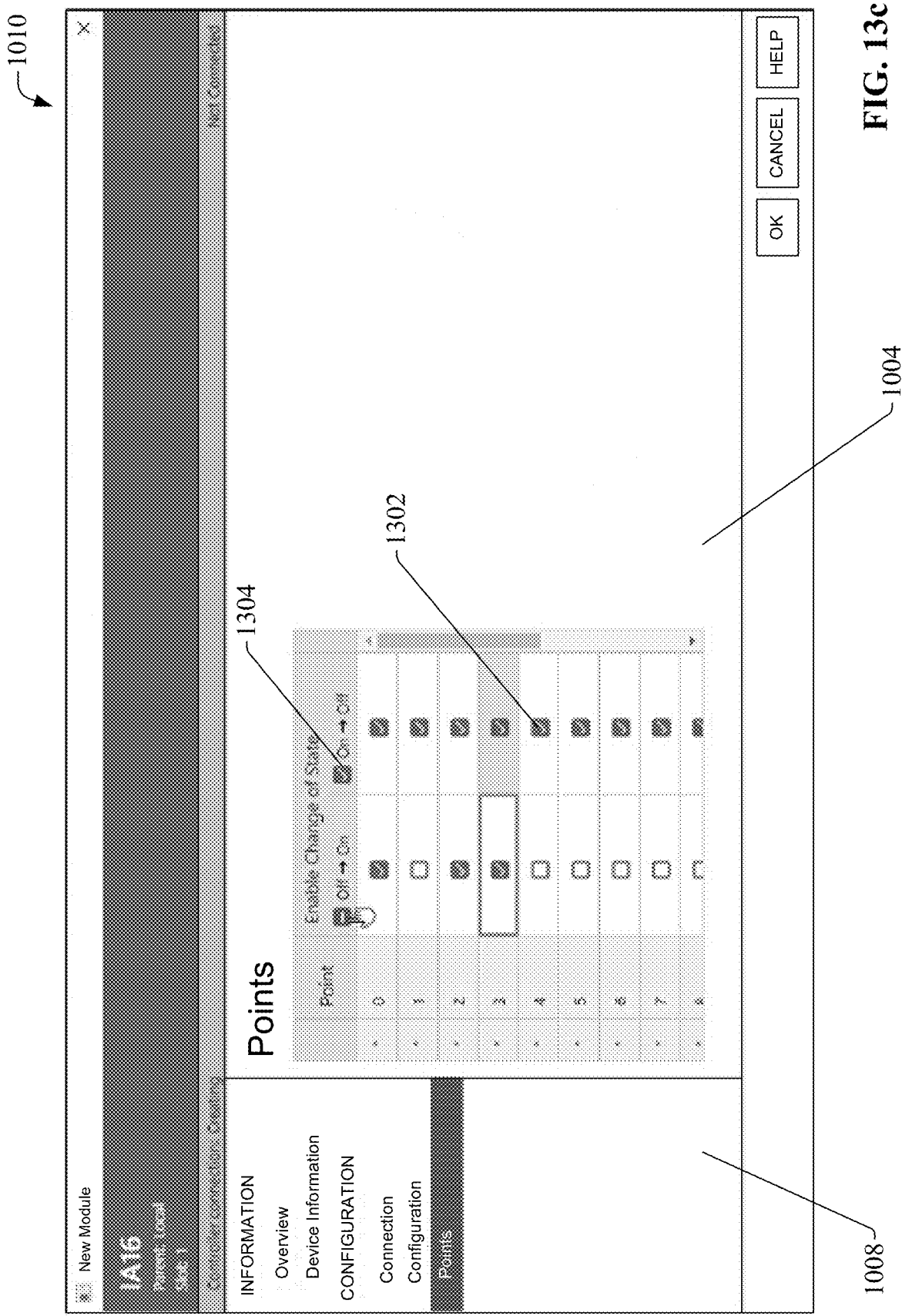
FIG. 13c is a view of the main workspace area of a device profile interface in which the Points category has been selected in the Category window.

FIG. 13b is a view of the main workspace area 1010 in which the Configuration category has been selected in the Category window 1008. For the selected analog input module, selecting this category causes the configuration area 1004 to display an interactive table that allows the user to set input filter times for groups of input points. FIG. 13c is a view of the main workspace area 1010 in which the Points category has been selected in the Category window 1008. This invokes another interactive table in the configuration area 1004 that allows the user to selectively enable or disable changes of state—both on-to-off and off-to-on transitions—for each input point of the module. In contrast to generic table-based interfaces, this graphical configuration interface comprises both individual checkbox controls 1302 that allow the user to enable or disable state changes for individual input points, as well as global checkbox controls 1304 that allow the user to enable or disable state changes for all of the module's input points with a single selection input.

Figure 14A:
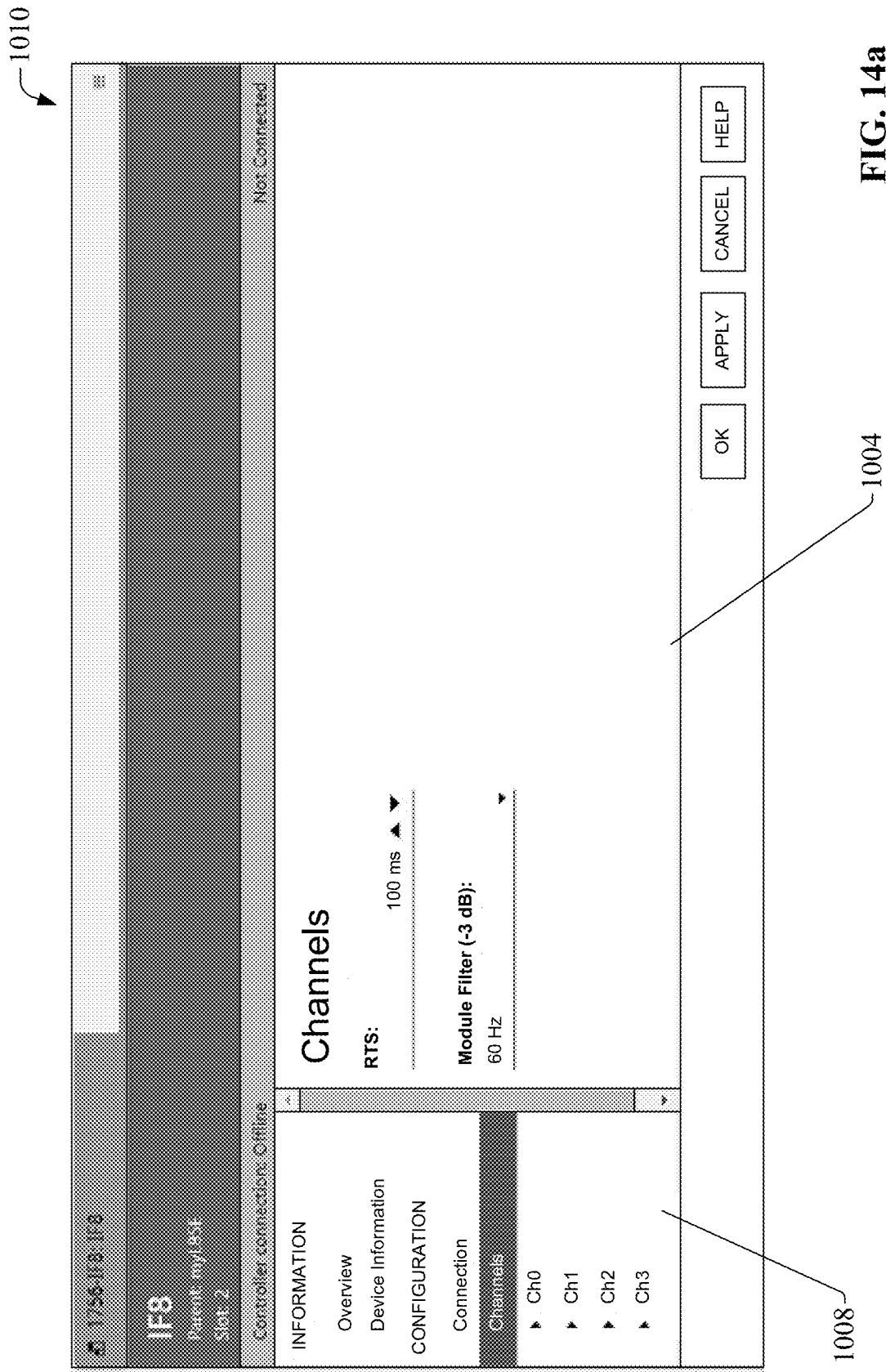
FIG. 14a is a view of the main workspace area of a device profile interface in which an 8-channel analog input module has been selected.
Figure 14B:
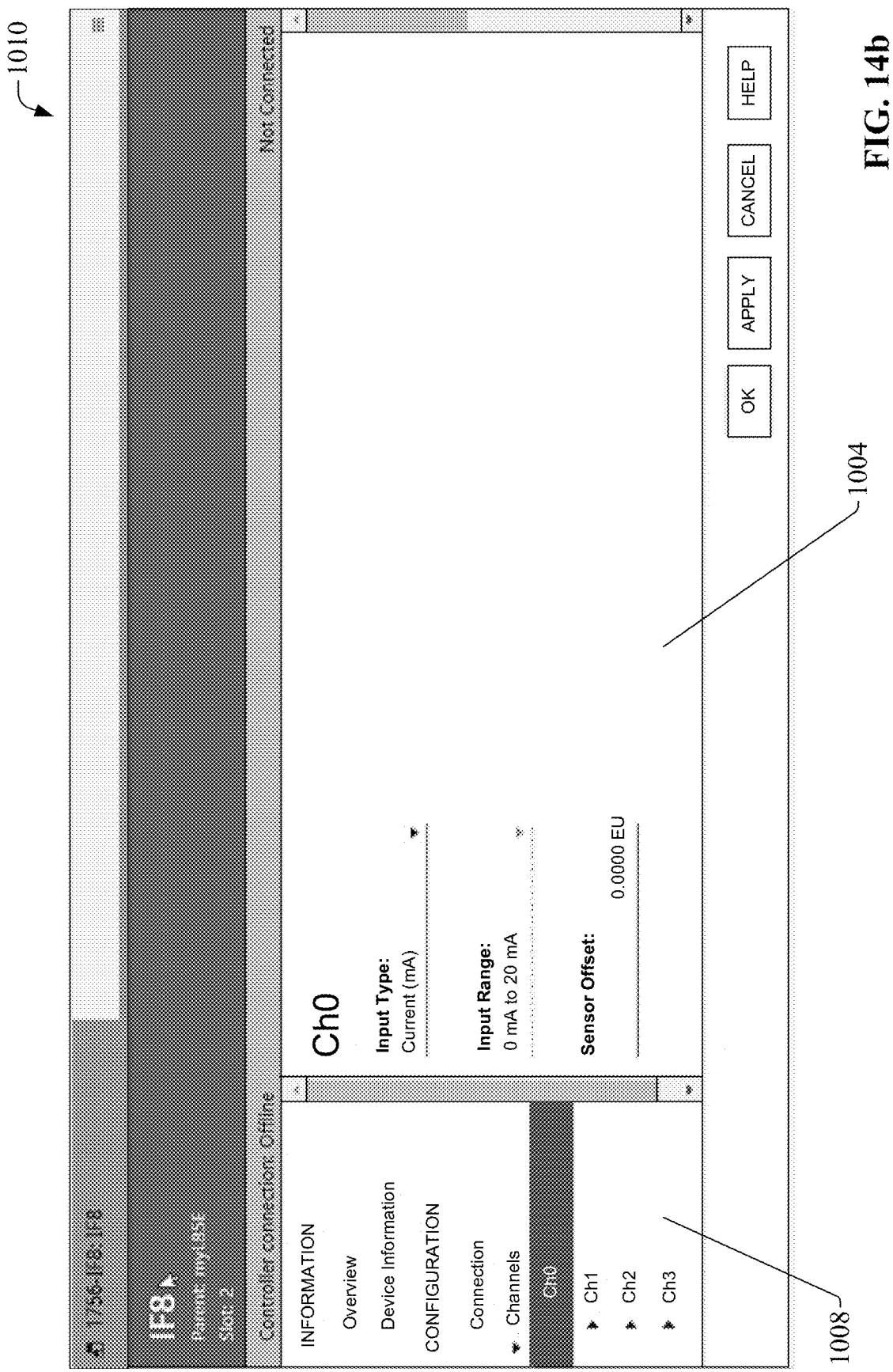
FIG. 14b is a view of the main workspace area of a device profile interface in which a user has selected to set configuration parameters for individual channels of an input module.
Figure 14C:
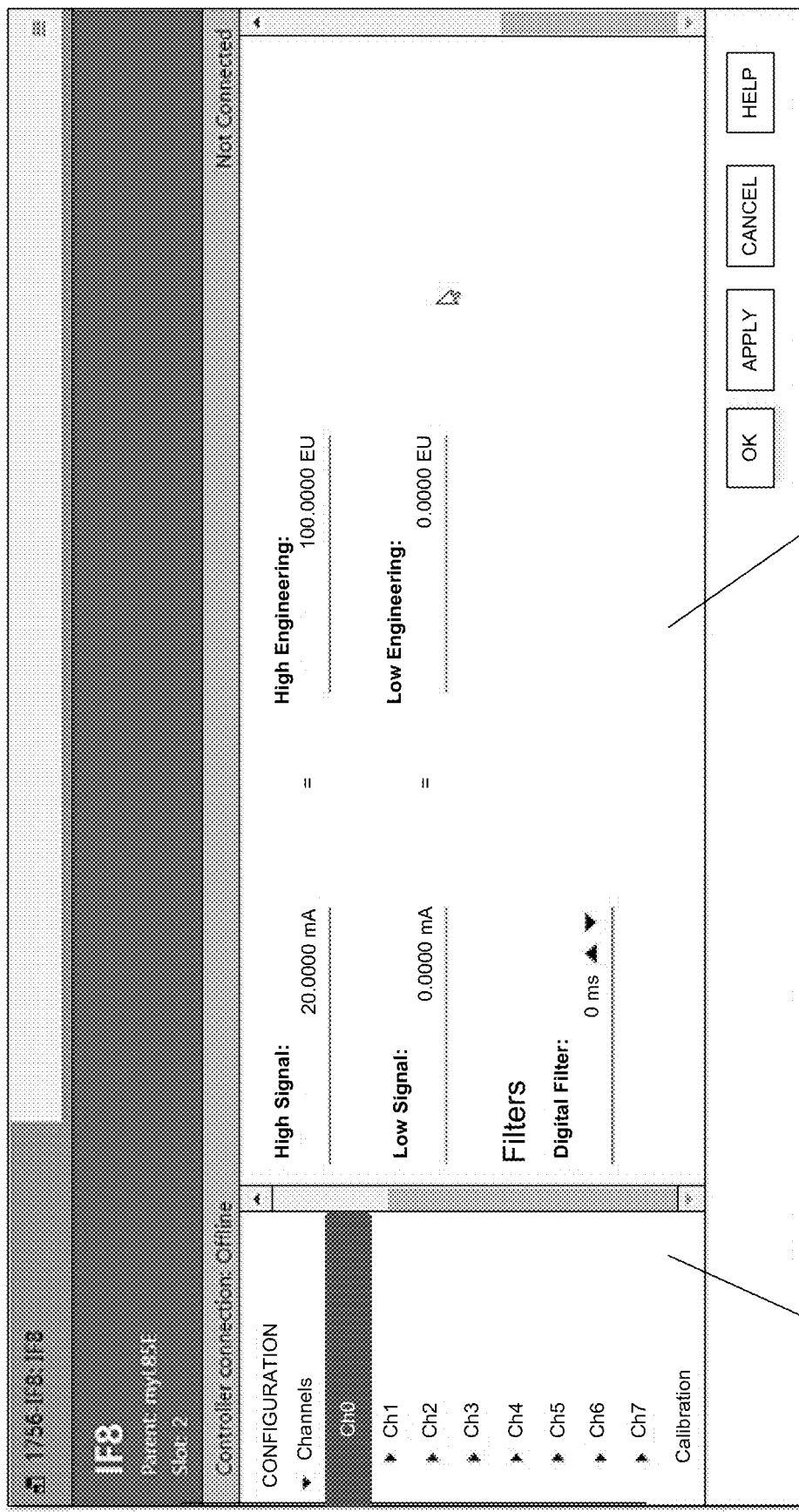
FIG. 14c is another view of the main workspace area of a device profile interface in which a user has selected to set configuration parameters for individual channels of an input module.

As noted above, the device profile 906 for the device being configured defines the configuration parameters that will be presented for viewing and editing in the main workspace area. FIG. 14a is a view of the main workspace area 1010 in which another type of device—an 8-channel analog input module—has been selected. In this scenario, the configuration categories listed in the Category window 1008 include a Channels category for configuring the analog input channels of the module. General channel parameters that are applicable to all channels—including the real time sampling (RTS) period and the module filter frequency—are rendered in the configuration area 1004 and can be edited by the user. In addition, configuration parameters for each individual channel can be set within the configuration area 1004, as shown in FIGS. 14b and 14c. These channel-specific parameters can include, but are not limited to, a type of input signal provided to the channel (e.g., current or voltage), a range of the input signal (e.g., 4-20 milliamp, 0-10 volts, etc.), an offset value for the channel, high and low input signal limits, digital filter value, or other such configuration settings.

In some embodiments, the IDS system 202 can be configured to generate dynamic feedback in response to determining that the user has submitted a device configuration parameter value that is not within a valid range for the edited parameter. In this regard, some device profiles 906 can define ranges of valid values for respective device parameters. As the user submits device configuration parameter values, the project generation component 206 can verify that each parameter value submitted by the user is within the valid ranges. If the user enters a parameter value that is outside that parameter's valid range, the user interface component 204 can render a notification on the development interface 1002 indicating that the value entered by the user is invalid. The project generation component 206 can reject any submitted parameter values that are outside their valid ranges.

The device configuration interfaces illustrated in FIGS. 10-14c and described above provide an intuitive interface for configuring industrial devices used in the system project 302. The device profile library 902 can store device profiles 906 for devices offered by multiple different device vendors, and the IDE system's interface allows these devices to be configured using a common device configuration workflow regardless of device vendor. The graphical device configuration interfaces generated by the IDE system 202 offer a more intuitive configuration workflow relative to more generic table-based device configuration interfaces. In some embodiments, the IDE system 202 can generate the device configuration interfaces using a web-based format, such as hypertext markup language (HTML), allowing the interfaces to be executed on a cloud platform or Internet server and served to any type of device that supports web browsing. This format also allows the resulting device configuration interfaces to support a greater degree of customization relative to simple text-based device configuration profiles.

As discussed above in connection with FIGS. 9-11, users can add new devices to a system project by selectively adding device nodes 1106—corresponding to selected device profiles 906—to the project tree 1006, which represents the project as a hierarchical topology of devices and busses that make up the project. Typically, to add a device to the project in this manner, the user assigns the device to a communication bus to which the device will be connected, and over which the device will communicate with other devices. These busses can include controller chassis backplanes, plant network busses (e.g., ethernet networks, fieldbus networks, etc.), remote or expansion I/O networks, or other such busses.

The project depicted in FIG. 11 includes multiple different busses, including a controller chassis backplane—represented by backplane node 1104—corresponding to the backplane of the controller represented by controller node 1102. As shown in FIG. 11, this backplane node 1102 is defined as a child node of its corresponding controller node 1102.

When the controller node 1102 for a selected controller is added to the project tree 1006, its associated backplane bus—represented by a backplane node 1104—is also added to the project below the controller node 1102. Devices that are designed to connect to the controller's backplane, such as I/O or networking modules represented by device nodes 1106, can then be selectively added to the project tree 1106 under the backplane node 1104, as also shown in FIG. 11. For the IDE system 202 to support the controller type represented by controller node 1102, the controller's backplane must also be defined in the system 202 as a bus definition. This bus definition specifies the characteristics of the backplane, including but not limited to the number of devices or modules that can be added to the bus (which may correspond to the number of slots in the controller's chassis), the types of devices that can be added to the backplane (e.g., devices that correspond to the controller's product family or platform), a device addressing scheme for the backplane (addressing via slot number, addressing via a device address, etc.), or other such bus characteristics.

The example project depicted in FIG. 11 also includes a number of ethernet busses represented by bus nodes 1110a and 1110b. One of these ethernet busses—represented by bus node 1110a—is associated with a modular ethernet adapter installed on the controller's backplane, represented by device node 1106b. Adding device node 1106b to the controller's backplane adds both the device node 1106b for the selected ethernet adapter as a child of the backplane node 1104, as well as the bus node 1110a for an ethernet bus associated with the ethernet adapter. Ethernet-capable devices, such as the device represented by device node 1106c, can then be added to this ethernet bus. Also, since the selected controller has an integrated ethernet adapter, another ethernet bus—represented by bus node 1110b—is also added to the project when the controller node 1102 is added. Ethernet capable devices can then be added to this ethernet bus below its bus node 1110b. Similar to the backplane bus, characteristics of the ethernet bus must be predefined in the IDE system 202 so that system 202 can enforce rules regarding the types and number of devices that can be added to the bus, as well as the addressing scheme used to identify devices connected to the bus (e.g., ethernet IP addressing).

If support for a new type of bus, or a new product platform having its own type of proprietary bus, is to be added to the IDE system 202, one approach may be to request a team of developers to write specialized source code (e.g., C++ code) defining the bus and its characteristics. This may involve writing a new class for the bus in a programming language such as C++, which is then be compiled into source code. This necessitates specialized development by expert programmers, as well as ongoing dialogue between the programmers and industrial control engineers to ensure that the bus and its properties and capabilities are accurately defined for use within a control project.

As an alternative to this approach, one or more embodiments of the IDE system 202 can support the ability to define add-on bus profiles using a configuration file written as an industrial domain-specific language (DSL), which is a scripted, text-based syntax. This approach can allow designers who may not have specialized programming expertise to add support for new buses to the IDE system. As will be described in more detail below, this approach can also be used to create add-on controller profiles for new controllers to be supported by the IDE system 202.

Figure 15:
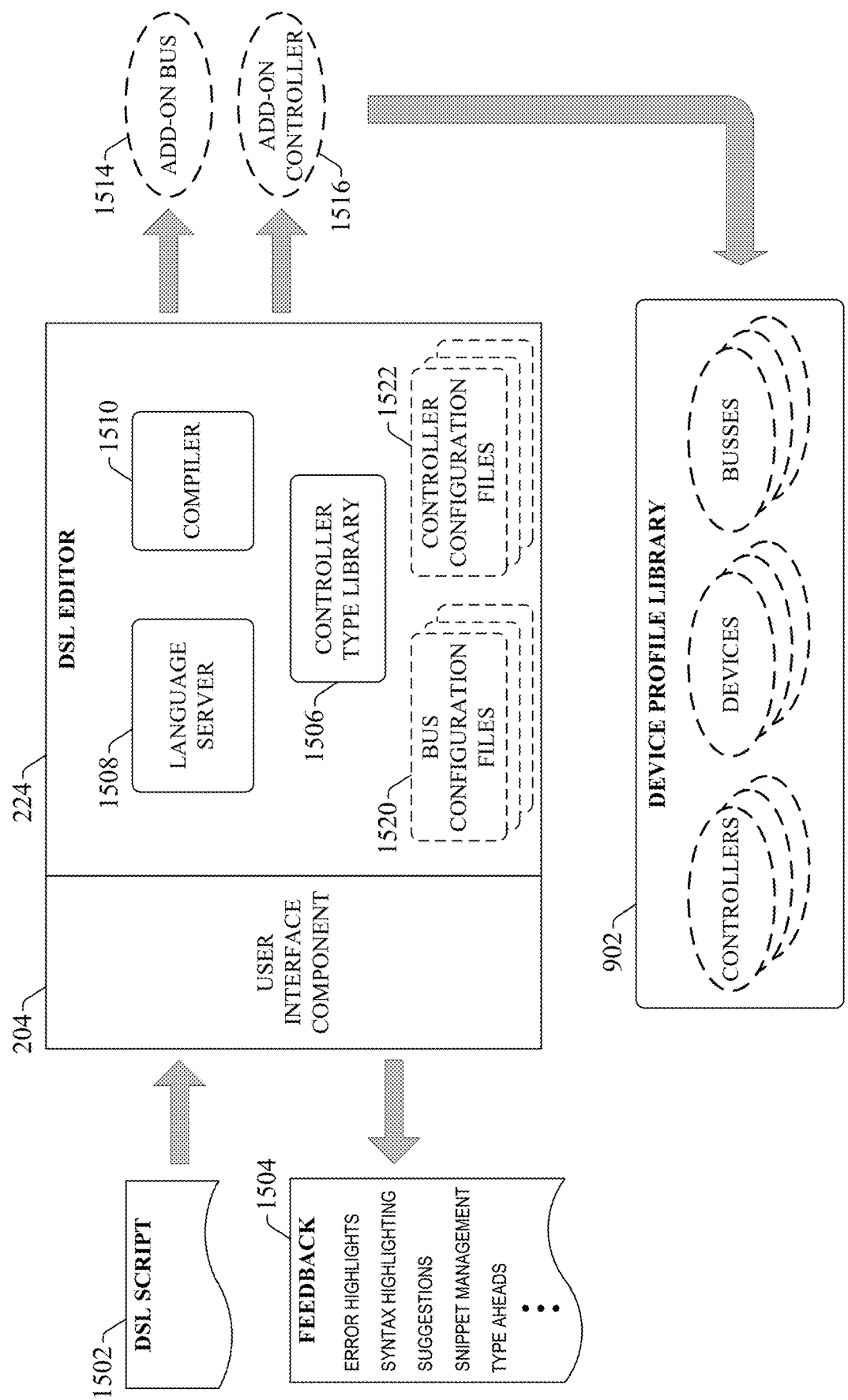
FIG. 15 is a diagram illustrating definition of add-on bus profiles, as well as add-on controller profiles, using a configuration file written as an industrial DSL.

FIG. 15 is a diagram illustrating definition of add-on bus profiles 1514, as well as add-on controller profiles 1516, using a configuration file written as an industrial DSL. In one or more embodiments, the IDE system's user interface component 204 is associated with a DSL editor 224 that renders a DSL programming interface for entry of industrial DSL script 1502. The DSL editor 224 also generates editing feedback 1504 that provides dynamic assistance during DSL scripting. Editing feedback 1504 supported by the DSL editor 224 can include, but is not limited to, error highlighting, syntax highlighting, code snippet management, type-ahead or autocomplete functionality, intelligent programming suggestions, and other such tools. Some or all of these programming services can be provided by a language server 1508 associated with the DSL editor 224. Some types of editing feedback 1504 can be generated based on predefined rules that are specific to add-on busses or controllers. For example, editor 224 can generate notifications during development warning the developer that a number of nodes added to a bus exceeds a maximum node count, or that an estimated bandwidth exceeds a maximum bandwidth.

To simplify the task of defining an add-on bus profile 1514, the IDE system 202 can store one or more pre-formatted bus configuration files 1520 scripted in the industrial DSL format. A bus configuration file 1520 can be written to include a list of common bus properties, whose values can be set by the user (e.g., a developer of the IDE system 202) by editing the appropriate portions of the file 1520 using DSL script 1502. Bus properties defined by the bus configuration file 1520 can include, but are not limited to, an addressing scheme used by the bus (e.g., an ethernet IP addressing scheme, integer-based addressing, etc.), a maximum or minimum number of nodes or devices that can be connected to the bus (which establishes a limit on the number of device profiles 906 that can be connected to the corresponding bus node 1106 or backplane node 1104), types of devices that are permitted to be attached to the bus, an icon to be used for the corresponding bus node in the project tree 1006, or other such bus properties.

DSL editor 224 allows a user to customize any aspects of the new add-on bus by editing the appropriate sections of the bus configuration file 1520. The DSL editor's compiler 1510 can then translate the edited bus configuration file 1520 into an add-on bus profile 1514, which can then be added to the device profile library 902. Once the new add-on bus profile 1514 is compiled and installed, the IDE system 202 recognizes the bus and its user-defined properties, and allows the new bus to be added to projects.

The bus configuration file 1520 for the new add-on bus profile 1514 can also be stored in a library of bus configuration files 1520 and used as a basis for other similar add-on busses. For example, if a new bus is required for a new product family to be supported in the IDE system 202 and the capabilities of the new bus will be similar to those of an existing bus but with expanded, reduced, or different capabilities, a user (e.g., an IDE system developer) can retrieve the edited bus configuration file 1520 for the existing bus, edit the relevant portions of the file 1520 to reflect the capabilities of the new bus, and save the file as a new bus configuration file 1520. This modified file 1520 can then be compiled into a new add-on bus profile 1514 and installed on the IDE system's development platform.

When an add-on bus profile 1514 is added to the project tree 1006 for inclusion in a system project 302 (e.g., in response to addition of a device having a defined downstream bus represented by the profile 1514), the user is then permitted to add devices to the resulting bus node (e.g., a backplane node 1104 or a bus node 1106 as shown in the example of FIG. 11) by selectively associating device profiles 906 with the bus. The IDE system 202 will enforce the user's interactions with the add-on bus profile 1514 in accordance with the bus properties defined in the bus's configuration file 1520. For example, when the bus is selected from the project tree 1006, the user interface component 204 can render a filtered list of available device profiles 906 that includes only the devices or device types corresponding to the compatible device types. This limits the user's ability to add new device profiles 906 to the bus to only those displayed in the filtered list. The IDE system 202 will also enforce limits on the number of devices that can be added to the bus, which are also defined in the bus's configuration file 1520. The IDE system 202 can also display, and allow configuration of, addresses for devices on the bus in accordance with the addressing scheme specified in the bus configuration file 1520.

A similar approach can be used to add new controller profiles 1516 to the IDE system's device profile library 902. To this end, the DSL editor 224 can store one or more pre-formatted controller configuration files 1522 scripted in the industrial DSL format. As with the bus configuration files 1520, a controller configuration file 1522 can be pre-formatted to include DSL script for respective different controller properties and capabilities, which can be edited by the user as needed by modifying the relevant portions of the DSL script. The resulting controller profile 1516 defines a type or class of industrial controller that can be added to a project.

FIG. 16 is a snippet of an example controller configuration file 1522 for defining capabilities of a new controller type to be added to the IDE system's device profile library 902. As can be seen in this example, the controller configuration file 1522 includes lines of DSL script for setting values of respective class-level properties of the controller, including but not limited to a catalog number, a vendor ID, a product type, and a product code. The controller configuration file 1522 includes lines of DSL script for setting values of the controller's capabilities, including but not limited to an amount of memory supported by the controller, whether the controller is a process controller, whether the controller supports redundancy, whether the controller supports safety, a maximum number of ethernet devices that can be installed on the controller's integrated internet port, whether the controller supports exceeding the specified ethernet device limit, a maximum number of event tasks that can be triggered by an input data state change, a maximum number of tasks supported by the controller, a maximum number of I/O connections supported by the controller, or other such capabilities.

FIG. 17 is a snippet of an example controller configuration file 1522 for defining properties of an industrial controller. This portion of the controller configuration file 1522 defines an instance of a controller device corresponding to the controller type defined using the DSL code shown in FIG. 16, and is linked to that controller type. In some embodiments, the controller type information defined by the DSL script shown in FIG. 16 can be stored in a controller type library 1506 maintained by the IDE system 202, such that the defined controller type can be referenced by controller device instances.

The controller device code shown in FIG. 17 can include a section 1702 listing device attributes for the controller, including a catalog number, a vendor ID, a product type, a product code, and major and minor revision numbers. Additionally, the configuration file 1522 provides sections 1704 and 1708 for defining respective communication ports supported by the controller. Each of these sections 1704, 1708 of the configuration file 1522 include lines of script for defining a port identifier, a port address, and whether the port is to be enabled for the add-on controller profile. Example communication ports that can be added using these DSL script portions 1704, 1708 can include ethernet ports, common industrial protocol (CIP) network ports, remote I/O ports, or other types of communication ports. Any class properties of the controller type to which the controller device is linked (as defined using the DSL script shown in FIG. 16) will be inherited by the controller instance.

Other controller properties that can be set by editing appropriate sections of the pre-formatted DSL configuration file 1522 can include, but are not limited to, security settings, alarm settings, major and minor faults, redundancy settings, an icon representation of the controller in the project tree 1006, or other such properties.

The edited controller configuration file 1522 can be compiled by the DSL editor 224 into a new add-on controller profile 1516 and added to the device profile library 902, as shown in FIG. 15. This makes the add-on controller profile 1516 available for selection from the IDE system's device profile library 902 and addition to the project tree 1006. Once an add-on controller profile 1516 is added to a project 302, the IDE system 902 guides the user's interactions with the controller profile 1516 in accordance with the properties of the controller specified in the corresponding controller configuration file 1522. FIG. 18 is an example controller properties window 1802 that can be rendered by the user interface component 204 when the user selects a controller node 1102 corresponding to an add-on controller profile 1506. This properties window 1802 includes tabs representing different categories of controller properties, where selection of a tab causes the window to render properties of the controller corresponding to the selected category, including both read-only properties and configurable properties. Example property categories include memory properties, capacity properties, port configuration information, internet protocol information, security properties, an alarm log, major and minor faults, redundancy properties, and other such properties. In the case of add-on controller profiles 1516, the controller properties that can be viewed and edited via properties window 1802 are based on the controller configuration file 1522.

As with the bus configuration files 1520, controller configuration files 1522 can be stored on the IDE system 202 and subsequently used as the basis for other similar add-on controller profiles.

The use of bus configuration files and controller configuration files 1522, formatted as DSL scripts, to create new add-on buses and controllers for registration in the device profile library 902 can allow users (e.g., IDE system developers) to define and add new busses and controllers for use in control system projects 302 without the need to write new source code for the new profiles or to release updated versions of the IDE system's software. Instead, the DSL configuration files 1520, 1522 can be provided with the IDE system 202, and can be edited and compiled to create new user-defined busses and controllers without the need for a full software update.

Figure 19:
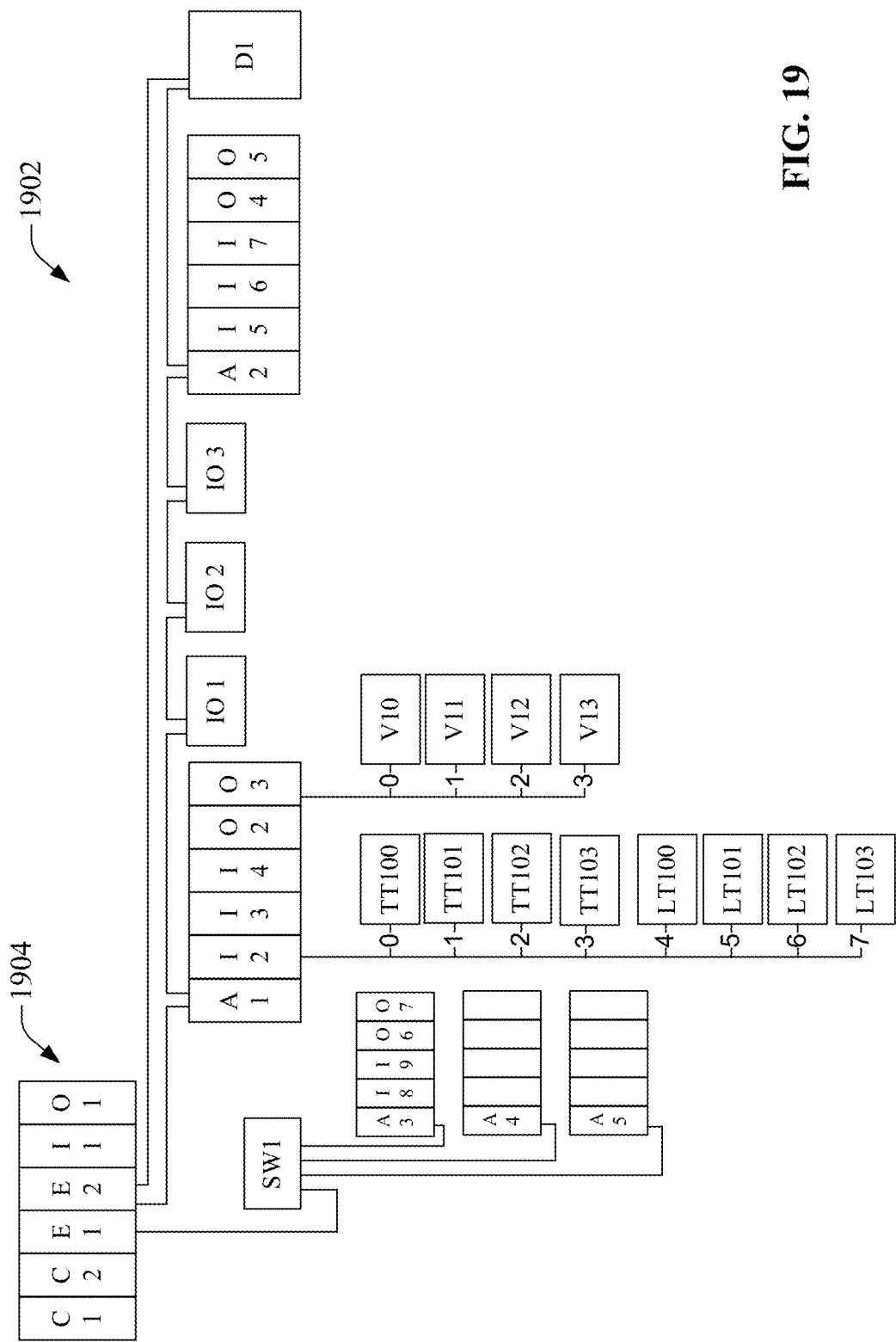
FIG. 19 is a diagram representing a topology of an example industrial control system.

Some embodiments of the IDE system 202 can also support the use of DSL scripting to define entire project topologies, or portions of topologies. FIG. 19 is a diagram representing a topology 1902 of an example industrial control system. In general, the control system topology 1902 is defined in terms of the devices that make up the control system as well as the data connections between those devices. The example topology 1902 depicted in FIG. 19 includes an industrial controller assembly 1904 with two industrial controllers C1 and C2, two ethernet modules E1 and E2, an input module I1, and an output module O1. The ethernet port of the first ethernet module E1 is connected to a switch SW1, which is connected to remote I/O adapters A3-A5 which each have a set of remote I/O modules. The second ethernet module E2 is networked to remote adapters A1 and A2—which each have their own set of I/O modules—as well as various other devices.

When developing a system project 302 in the IDE system, the user typically builds the project tree 1006—by addition, arrangement, and configuration of device profiles 906—to reflect the physical device topology 1902 of the control system for which the project 302 is being developed (see FIGS. 9-11). The project generation component 206 can then generate the system project 302 based in part on this defined topology as well as device configuration settings and control programming assigned to the respective devices by the user.

Figure 20:
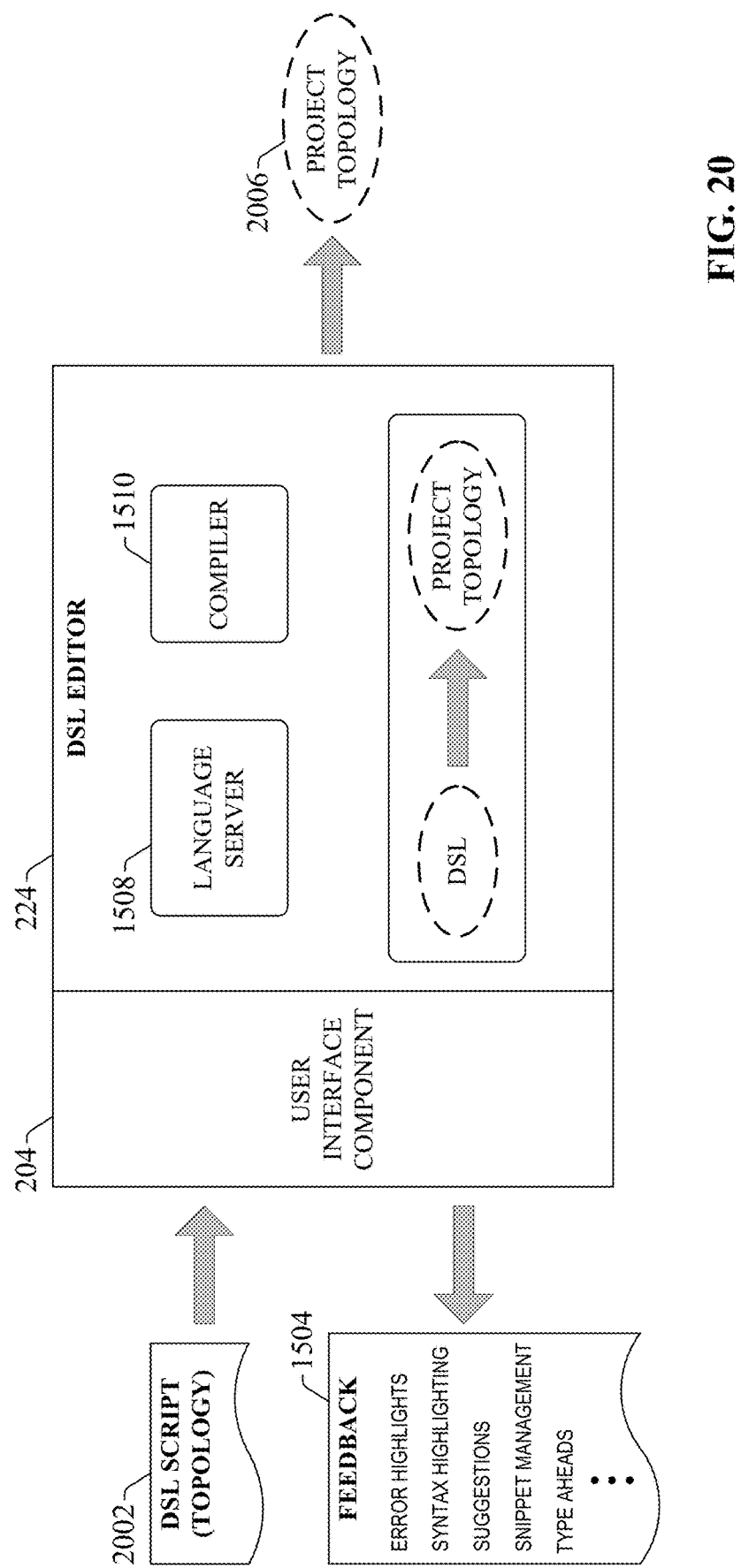
FIG. 20 is a diagram illustrating creation of a project topology definition using an industrial DSL script.

As an alternative to defining or editing the project topology via interaction with the project tree 1006, the IDE system 202 can support an industrial DSL that can be used to define or edit a project topology using DSL script. FIG. 20 is a diagram illustrating creation of a project topology definition 2006 using an industrial DSL script. In this example embodiment, the IDE system 202 supports an industrial DSL language that can be used to describe the devices, as well as the connections between those devices, that make up a system project 302. The DSL editor 224 enforces connectivity rules that ensure that the user is only permitted to define topology connections that are supportable by the connected devices. These connectivity rules are reflected in the dynamic editing feedback 1504—e.g., error highlights, type aheads, syntax highlighting, etc.—displayed by the user interface component 204 during scripting.

The resulting topology script 2002 can be compiled by the DSL editor's compiler 1510 to yield a project topology definition 2006 for a system project 302, which is represented by the project tree 1006 rendered in the explorer panel 1012 of the development interface 1002 (see FIGS. 10 and 11). A project tree 1006 defined using DSL scripting can be used to navigate the devices and busses that make up the system project 302, to invoke configuration windows for selected devices in the tree 1006, or to perform other development functions as described above. Thus, the project topology definition 2006 for a given system project 302 can be edited using either a graphical approach via interaction with the project tree 1006 (e.g., by adding device profiles 1006 to the project tree 1006 at selected locations within the hierarchical topology) or a script-based approach by editing the DSL script for the project topology.

The following examples illustrate possible DSL formats for defining various types of topology segments. It is to be appreciated, however, that other scripting formats for defining control system topologies using DSL script are within the scope of one or more embodiments.

Figure 21:
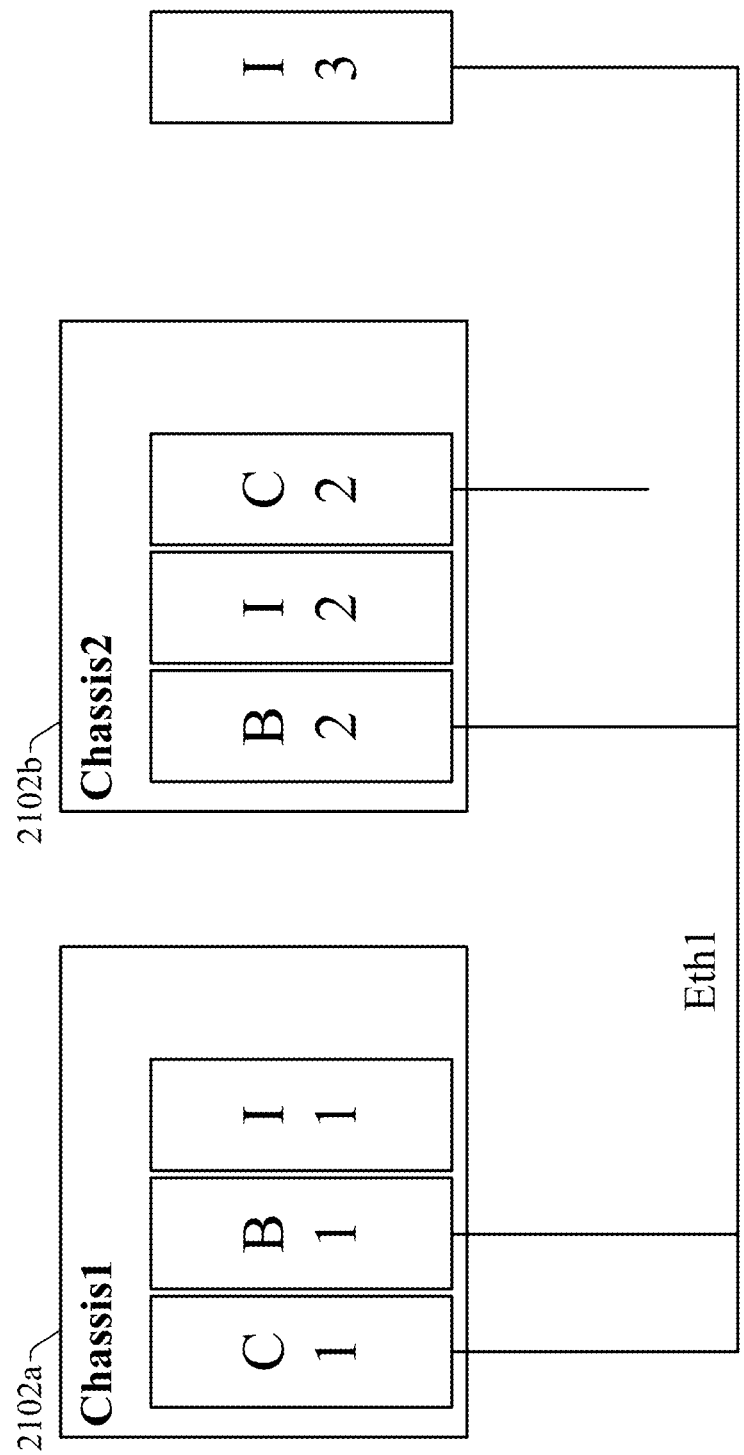
FIG. 21 is a diagram of an example topology segment comprising two controller chassis, each having a control module, an input module, and an ethernet adapter module installed in respective chassis slots.

FIG. 21 is a diagram of an example topology segment comprising two controller chassis 2102a and 2102b, each having a control module C1 and C2, an input module I1 and I2, and ethernet adapter modules (or bridges) B1 and B2 installed in respective chassis slots. Industrial controller C1 and ethernet module B1 of the first controller chassis 2102a, as well as ethernet module B2 of the second controller chassis 2102b, are connected to an ethernet network Eth1. A remote, ethernet-capable input module I3 is also connected to the ethernet network.

Figure 22:
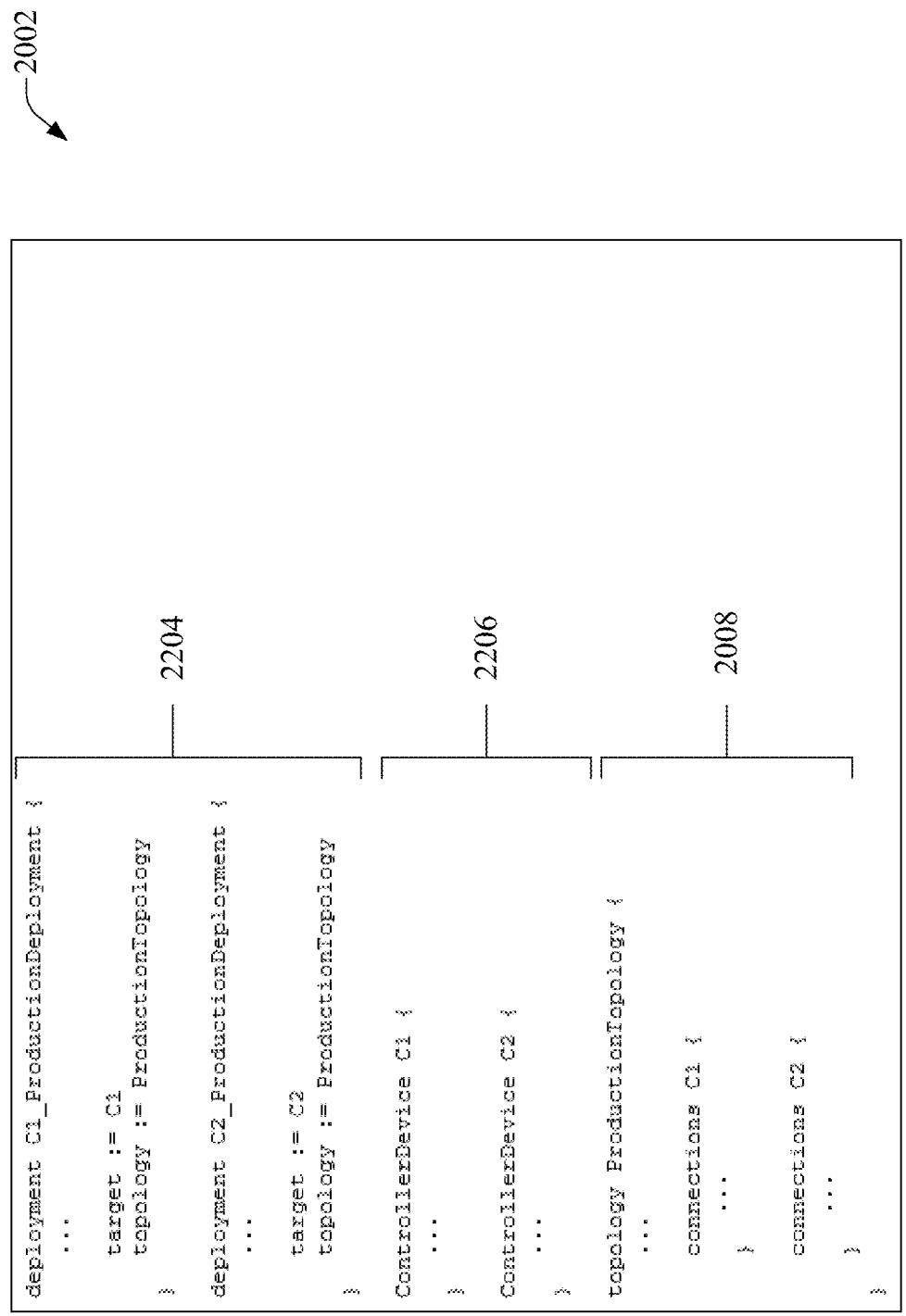
FIG. 22 is a segment of an industrial DSL script illustrating a general syntax for describing a project topology using DSL language.

In general, the topology DSL can define both device (or physical) topologies describing the physical connections between devices and busses, and logical topologies describing logical connection paths between devices. FIG. 22 is a segment of an industrial DSL script 2002 illustrating a general syntax for describing a project topology using DSL language. When an industrial controller is created in the project, a deployment section 2204 of the DSL script 2002 is used to reference the topology (e.g., "ProductionTopology") that will be deployed to the controller. In the example depicted in FIG. 22, which corresponds to the topology segment illustrated in FIG. 21, the two controller modules C1 and C2 are defined in the Deployment section 2204.

Each deployment is delineated by a deployment keyword, followed by a name of the deployment (e.g., "C1 ProductionDeployment"). For each controller, a target parameter identifies the controller (C1 or C2), and a topology parameter identifies the topology ("ProductionTopology") that is to be deployed to that controller. These parameters can be defined using the DSL format target:=[DeviceRef]
topology:=[TopologyRef]

where DeviceRef is the device instance to which the topology will be deployed and TopologyRef is the topology instance that will be deployed to the device instance.

The devices that make up the topology are defined in a Devices section 2206 of the DSL script 2002, and the bus connections between these defined devices—as well as logical paths between the devices—are defined in the Topology section 2208 of the DSL script 2002. Since the DSL script 2002 illustrated in FIG. 22 is only intended to provide an overview of the general organization of the topology script, details of the Devices section 2206 and Topology section 2208 are replaced with ellipses.

Figure 23:
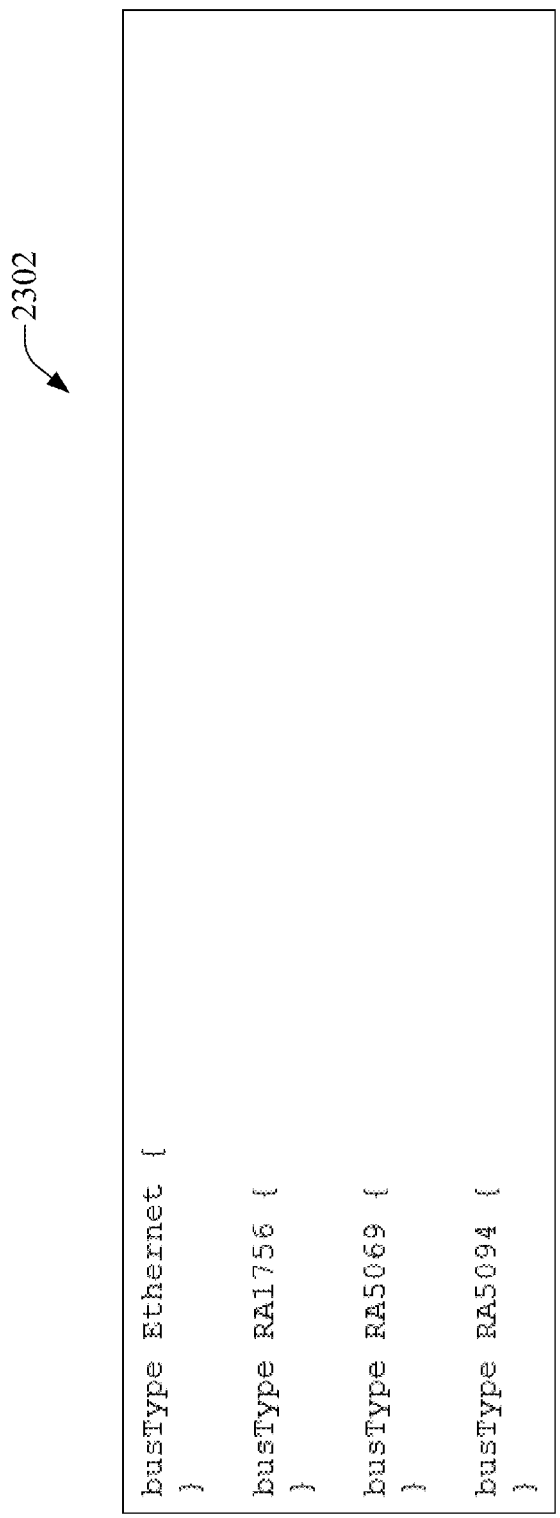
FIG. 23 is an example DSL script segment for declaring bus types.

To allow bus connections between devices to be defined, the types of busses that will be included in the topology (e.g., controller backplanes, ethernet networks, fieldbus networks, remote or expansion I/O busses, etc.) can be defined in the DSL script 2002 (or a separate DSL file). FIG. 23 is an example DSL script segment 2302 for declaring bus types. Each bus type to be created is delineated in the script segment 2302 using the keyword busType followed by the name of the bus type (e.g., Ethernet, RA1756, etc.). The name assigned to the bus type will be referenced by busses in the topology and by device ports, as will be described below. Any parameters associated with the bus type can be entered within brackets following the bus type name.

In the example illustrated in FIG. 23, four bus types are declared—an Ethernet bus type and three types of backplanes (RA1756, RA5069, and RA5094) corresponding to three different platforms. Some bus types, such as the Ethernet bus type, may have a predefined profile registered with the IDE system 202. These predefined profiles can define known properties of their corresponding bus types, such as an addressing scheme, a maximum number of devices that can be added to the bus, types of devices that can be added to the bus, or other such properties.

Figure 24:
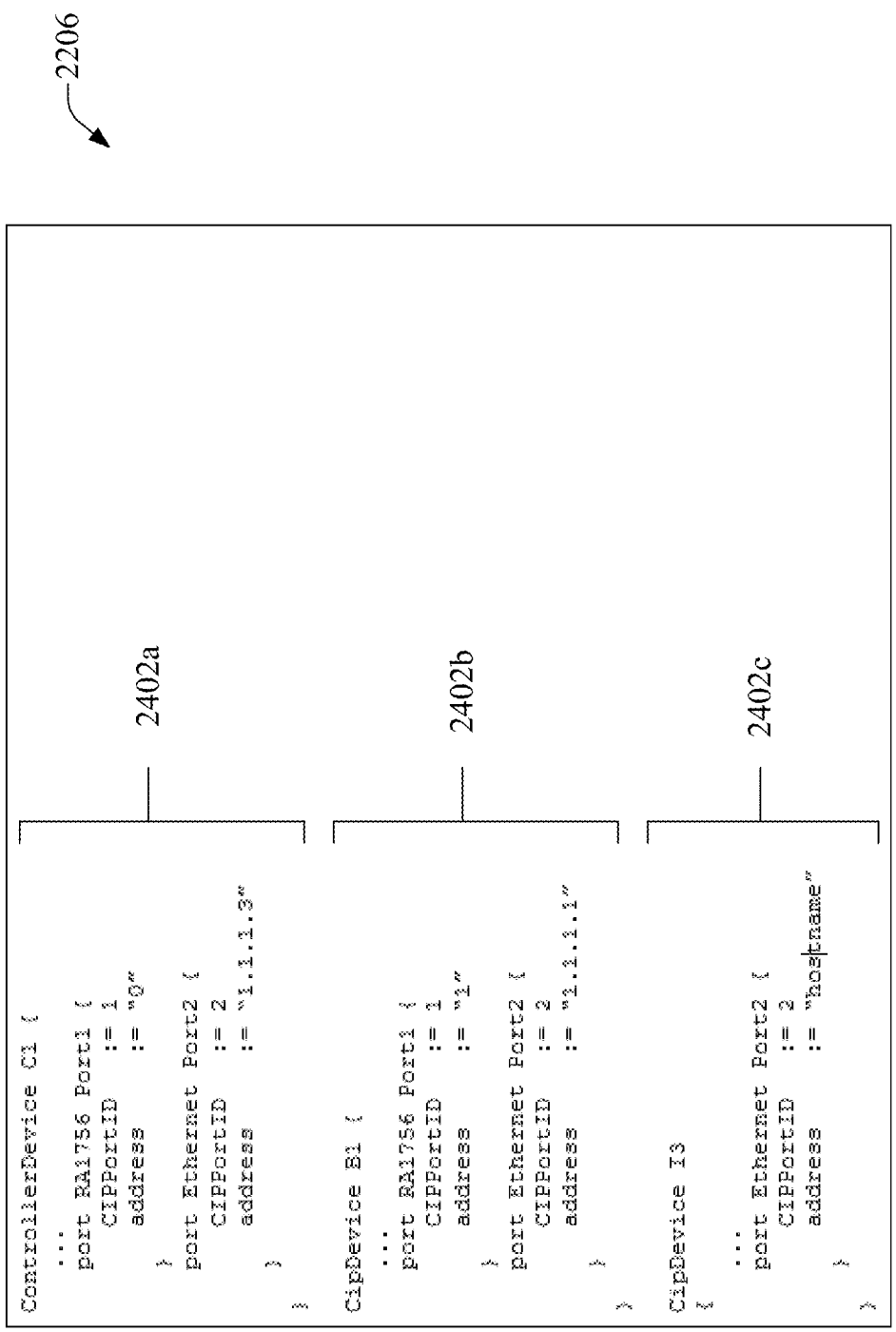
FIG. 24 is an example segment of a Devices section of a DSL script which defines devices included in an example topology.

FIG. 24 is an example segment of a Devices section 2206 of the DSL script 2002 which defines devices included in the example topology segment illustrated in FIG. 21. The Devices section 2206 includes a device entry 2402 for each device in the topology. Each entry 2402 comprises a header that declares the device type (e.g., ControllerDevice, CipDevice, etc.) followed by the name of the device (e.g., C1, B1, I3, etc.). In some cases, the device types declared in the header can have native profiles registered with the IDE system 202. These device type profiles define properties of their corresponding device types that are enforced by the DSL editor 224, including but not limited to numbers of available ports and bus types supported by the respective ports.

Each entry 2402 also includes parameters for each of the device's communication ports. Each port of each device can be defined using the following syntax:

```
port [busType] [PortName] {
    CIPPortID := [CipPortID]
    Address := [Address]
}
``` where busType identifies the bus type that the port can be connected (one of the bus types defined in the DSL script segment 2302 for declaring bus types; see FIG. 23), PortName is a name assigned to the port, CIPPortID is the port number of the port (relative to the parent device), and Address is the device's address assigned to the port. The format of the address specified for the Address parameter will depend on the addressing scheme supported by the specified bus type (e.g., an ethernet IP address, an integer-based address, a text-based identifier, etc.).

In the example depicted in FIG. 24, controller module C1 and ethernet module B1 each include two communication ports—one port for connecting to the backplane of the RA1756 controller chassis and an ethernet port for interfacing with the ethernet network Eth1. Remote ethernet module I3 only has an ethernet port, since that module is not connected to a chassis backplane and therefore does not define a backplane port.

As shown in FIG. 24, elements of the DSL script 2206 can be delineated and organized hierarchically using nested bracketing. For example, for a given device, the ports for the device can be defined within brackets after the device's name, while each port can be delineated within those brackets by sub-brackets.

Figure 25:
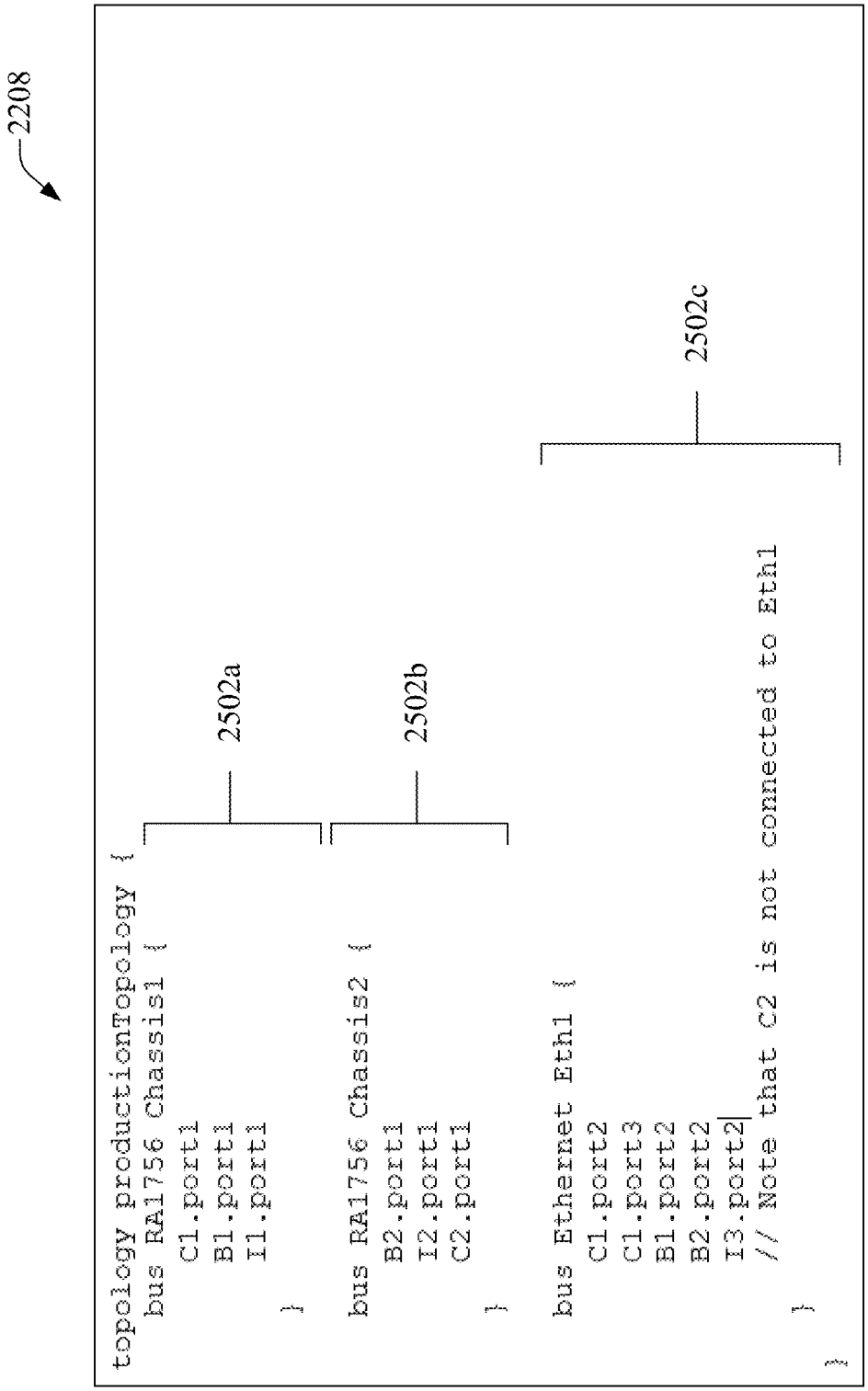
FIG. 25 is an example segment of a Topology section of a DSL script which defines bus connections between the devices.

FIG. 25 is an example segment of a Topology section 2208 of the DSL script 2002 which defines bus connections between the devices defined in the Devices section 2206. A given topology defined in the Topology section 2208 is delineated using the keyword topology followed by a name of the topology (e.g., "productionTopology"). The bus connections are then defined within a pair of outer brackets following the topology name. Each bus connection associated with the topology has its own bus connection entry 2502 having the format:

```
Bus [busType] [BusName] {
    [DeviceRef].[PortRef] {
    }
}
``` where busType identifies the bus type (one of the bus types defined in the DSL script segment 2302 for declaring bus types; see FIG. 23), BusName is the name of the bus, DeviceRef is a name of the device connected to the bus (corresponding to one of the device names defined in the Devices section 2206), and PortRef is the port of the device that is connected to the bus (one of the port names defined in the device entry 2402 for the named device in the Devices section 2206).

The example topology section 2208 illustrated in FIG. 25 defines three busses—the backplane of the first controller chassis Chassis1 (defined by entry 2502a), the backplane of the second controller chassis Chassis2 (defined by entry 2502b), and the ethernet network Eth1 (defined by entry 2502c). Three devices are connected to the Chassis1 backplane—controller module C1, ethernet module B1, and input module I1, each of which is connected to the backplane by its respective port1. Three other devices are connected to the backplane of the Chassis2 backplane—ethernet module B2, input module I2, and controller module C2, each of which are also connected to the backplane by its respective port1.

Five device ports are connected to the ethernet network (Eth1). The controller module C1 is connected to Eth1 by its port2 and port3, ethernet modules B1 and B2 are connected to Eth1 by their respective port2, and the remote input module I3 is connected to Eth1 by its port2. These ports were defined as ethernet ports with valid ethernet addresses or names in their respective entries 2402 in the Devices section 2206, and so are compatible with the ethernet network.

In some embodiments, the DSL editor 224 can assist the user in scripting these portions of the DSL script 2002 by rendering a list of ports available for a device being scripted in the entry 2502; e.g., in response to the user entering the device (e.g., C1, B1, etc.) name followed by a period. The user can then select the port associated with the bus from the list. The DSL editor 224 can determine which ports are available for the device based on the device entries 2402 in the Devices section 2206 of the DSL script 2002, and can determine which ports are compatible based on the busType.

As noted above, the DSL editor 224 can reference a set of defined connectivity rules that restrict the manner in which connections between devices, ports, or busses can be defined in the DSL script 2002. For example, the DSL editor 224 can limit the ports that can be associated with a given bus in entries 2502 to only those ports that are defined in the Devices section 2206 as being compatible with the bus. The DSL editor 224 can also enforce limits on the number of ports that can be assigned to a bus. These rules can be enforced, in part, using design feedback 1504 (see FIG. 20) that alerts the user of a connection or addressing incompatibility. This feedback 1504 can include, for example, highlighting DSL script segments representing incompatible bus connections, or segments representing improper port address formatting.

DSL script in the Topology section 2208 can also define logical paths, or communication paths, between the devices that make up the topology. The following examples illustrate DSL syntax that can be used to describe example logical paths between devices.

Figure 26:
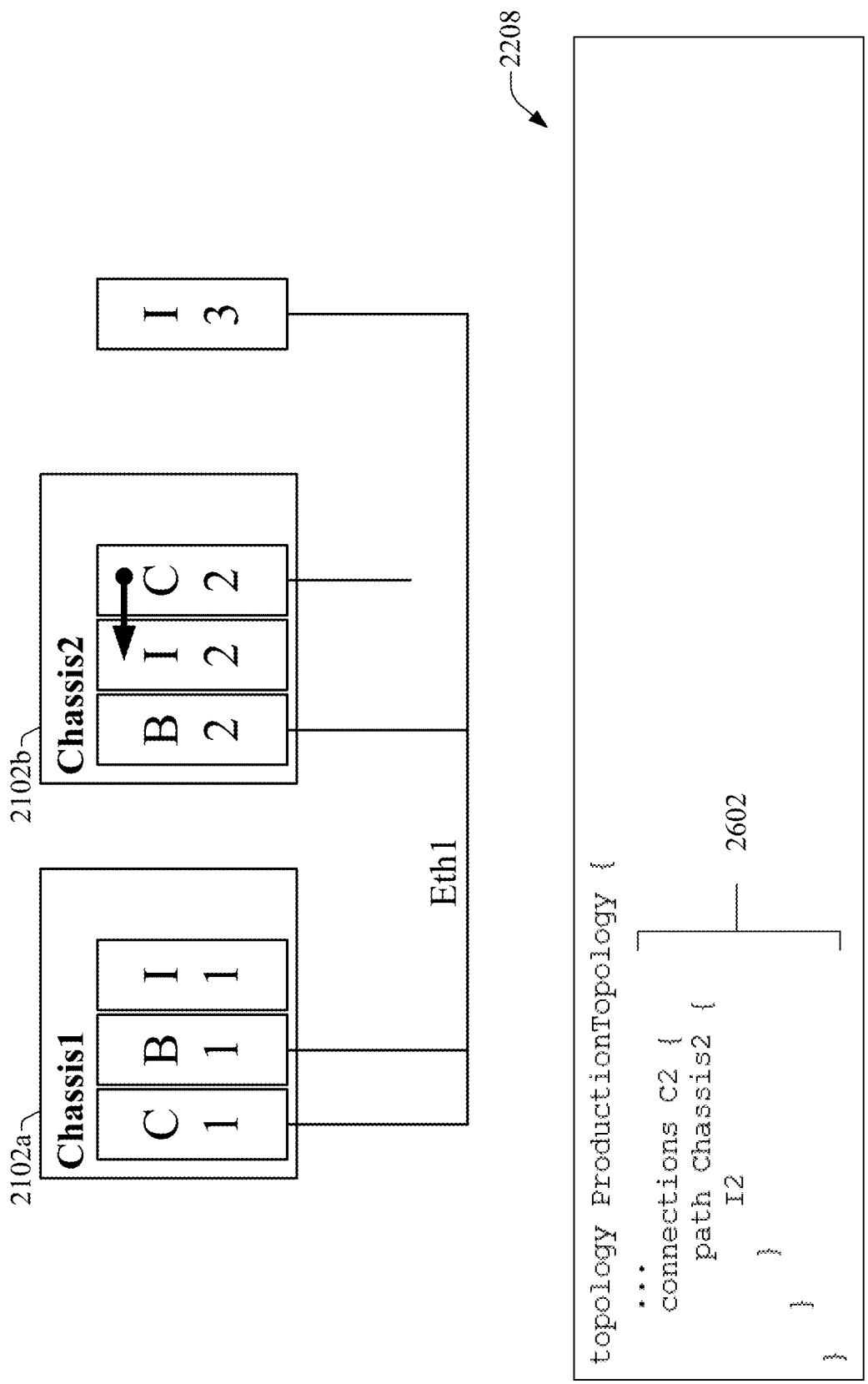
FIG. 26 is an example segment of a Topology section for describing a simple path between two modules installed on the same controller backplane.

FIG. 26 is an example segment of a Topology section 2208 for describing a simple path between two modules installed on the same controller backplane. Each connection can be defined by a Connection entry 2602 in the Topology section 2208 having the following format:

```
connections [OriginatorDeviceRef] {
    path [BusRef] {
        [DeviceRef]
    }
    {
        Path [BusRef]
            [Device Ref]
            . . .
        }
    }
]
``` where Connections is a keyword that delineates a Connections entry 2602, OriginatorDeviceRef is the device name of the originator device of the communication path (one of the device names defined in the Devices section 2206), path is a keyword that delineates a path segment out of the originator device or a previously named target device, BusRef is the name of a bus for the path segment out of the originator device or previously named target device (one of the busses identified as being connected to the originator device or previously named target device in the Devices section 2206), and DeviceRef is the name of a target device for the path segment.

A Connection entry 2602 is delineated by a header comprising the connections keyword followed by the name of the originator device of the connection path (OriginatorDeviceRef). In the illustrated example, the path from controller module C2 to input module I2, both of which reside in the second chassis 2102b (Chassis2), is to be defined. Accordingly, the originator device is identified as "C2." Within brackets following the header, a single path is defined. Since the bus for the path segment between controller C2 and input module I2 is the backplane of the second chassis 2102b—named Chassis2 in bus connection entry 2502 of the Devices section 2208—the path segment is delineated using the path keyword followed by Chassis2 (the value of BusRef in this case). This is followed by the name of the target device I2 within a pair of brackets following the path segment header (the value of DeviceRef for the present path segment). Since this is the only path segment required to connect these two devices, the Connection entry 2602 is closed with end brackets following the target device name.

Figure 27:
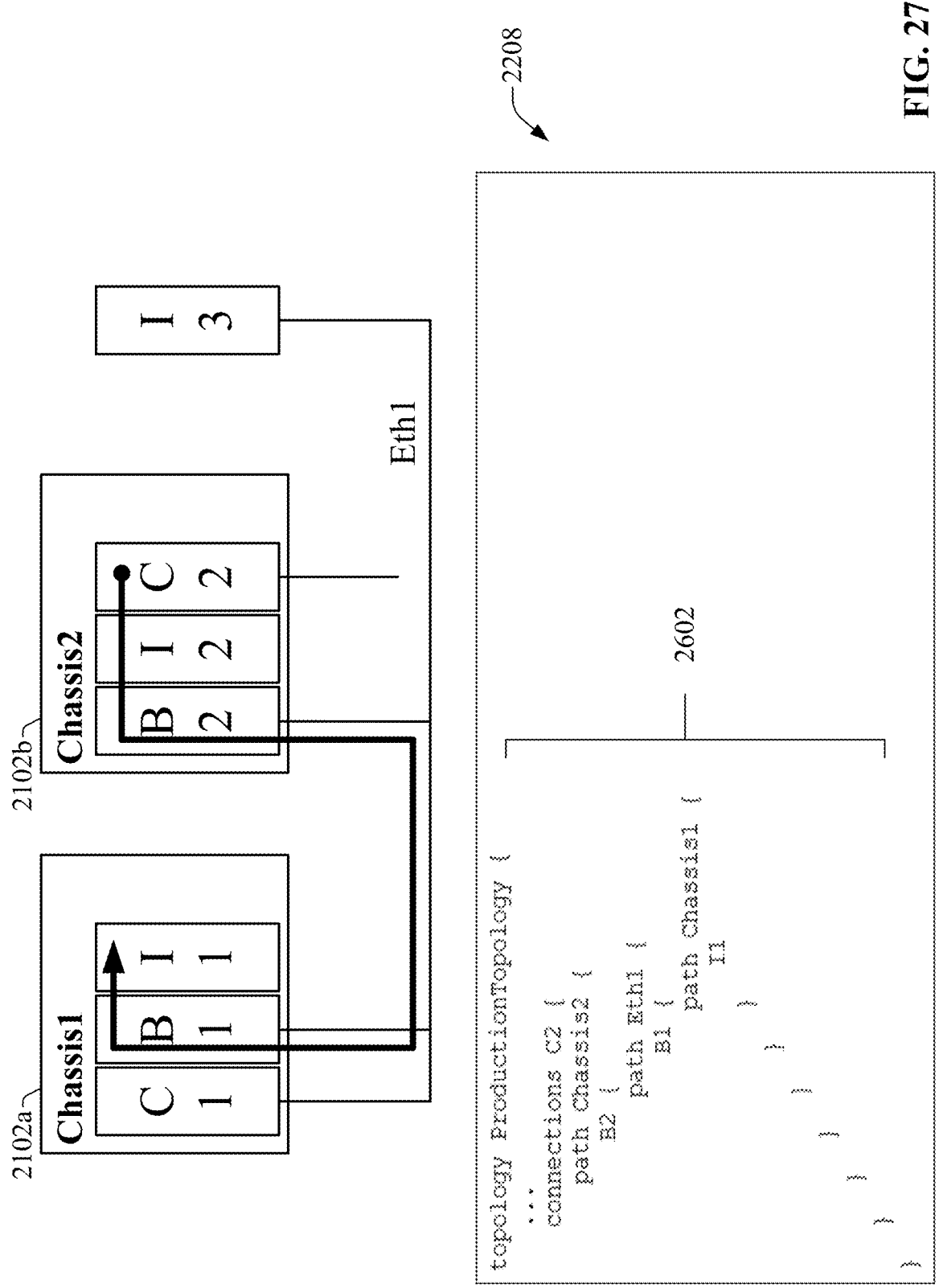
FIG. 27 is another example segment of a Topology section for describing a connection path between two modules that are installed on two different controller chassis, both of which reside on an ethernet network.

FIG. 27 is another example segment of a Topology section 2208 for describing a connection path between two modules that are installed on two different controller chassis, both of which reside on an ethernet network. In this example, a path from controller module C2 in the second controller chassis 2102b to input module I1 in the first controller chassis 2102a is to be defined. This connection path comprises three path segments—from controller module C2 to ethernet module B2 over the backplane of the second chassis 2102b (BusRef=Chassis2), from the ethernet module B2 to the ethernet module B1 of the first chassis over the ethernet network (BusRef=Eth1), and from the ethernet module B1 to the input module I1 over the backplane of the first controller chassis 2102a (BusRef=Chassis1).

The DSL script for this three-segment path is shown in FIG. 27. As can be seen in this example, the definitions for the three path segments are nested within the DSL script, such that each intermediate path segment is defined in the Connection entry 2602 within brackets following the name of the preceding intermediate target device. It is to be appreciated that this syntax is only intended to be exemplary, and that other DSL syntaxes for describing the path from a first device to a second device of the topology is within the scope of one or more embodiments.

Figure 28:
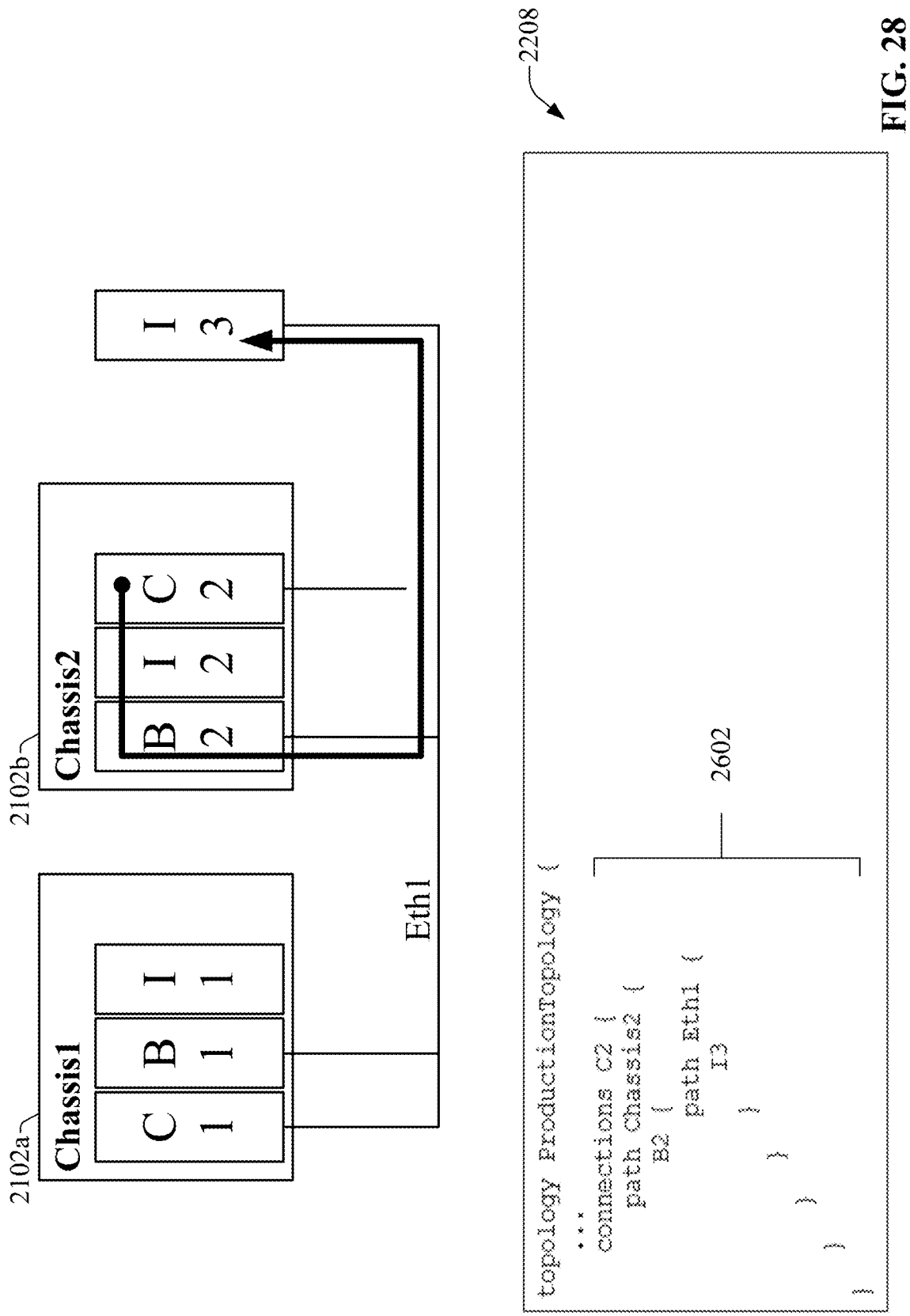
FIG. 28 is another example segment of a Topology section for describing a connection path from a controller module to a remote networked device via an ethernet bridge.

FIG. 28 is another example segment of a Topology section 2208 for describing a connection path from a controller module to a remote networked device via an ethernet bridge. In this example, the path from the controller module C2 of the second chassis 2102b to the remote input module I3 is to be defined. This connection path comprises two path segments—from controller module C2 of the second chassis 2102b to the ethernet module (or bridge) B2 over the backplane of the second chassis 2102b (BusRef=Chassis2), and from the ethernet module B2 to the input module I3 over the ethernet bus (BusRef=Eth1). The DSL script for this two-segment path is shown in FIG. 28.

Figure 29:
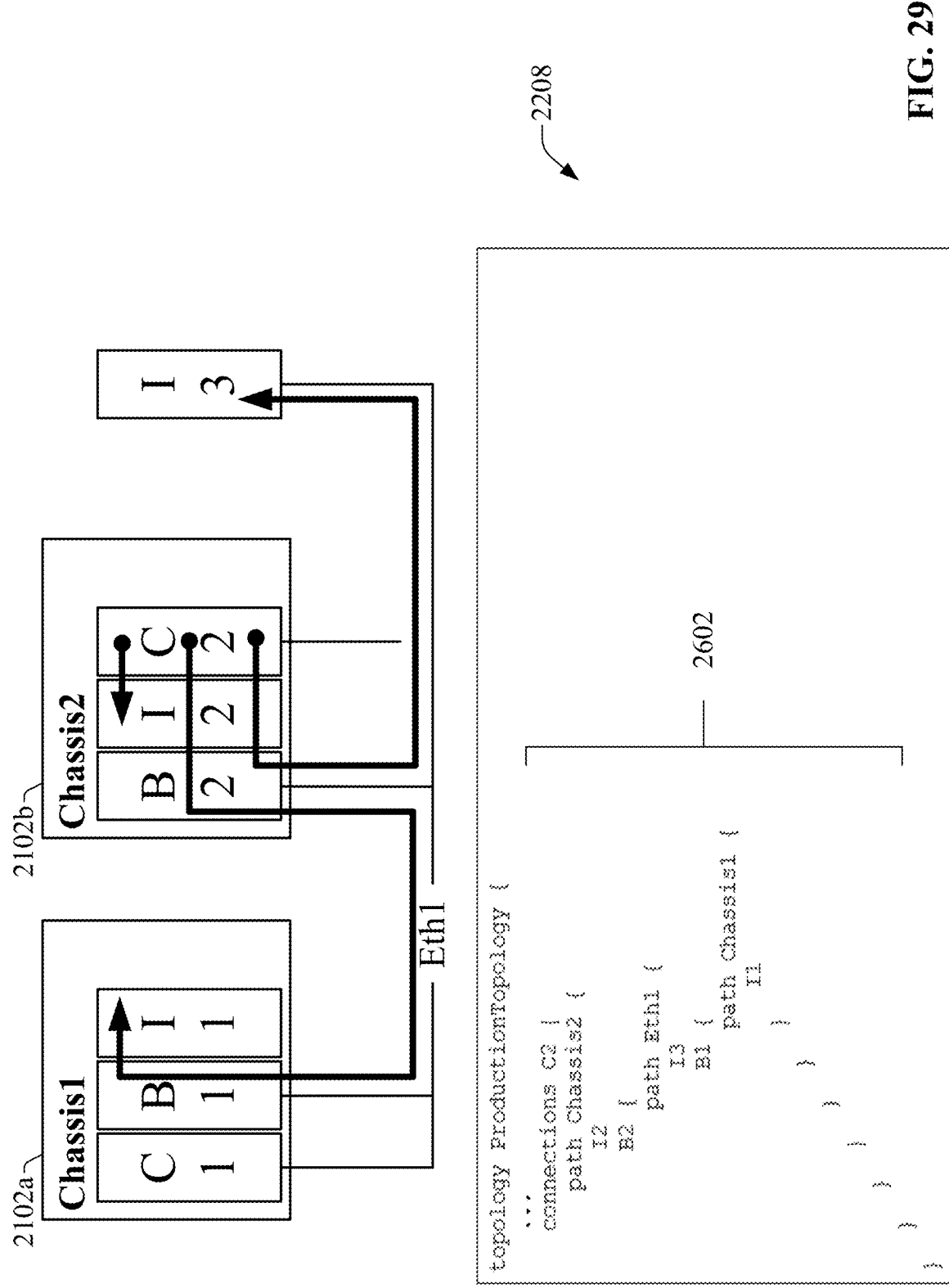
FIG. 29 is an example segment of a topology section for defining paths from an originator device to multiple target devices.

If an originator device is connected to multiple target devices, a single Connection entry 2602 for the originator device can define all the paths from the originator device to the respective target devices. FIG. 29 is an example segment of a topology section 2208 for defining paths from an originator device to multiple target devices. In this example, the originator device is the controller module C2 of the second controller chassis 2102b. Connection paths are to be defined from the controller module to the input module I2 in the same controller chassis 2102b, to the input module I1 of the first controller chassis 2102a, and to the remote input module I3.

As shown in FIG. 29, the Connection entry 2602 for the controller module C2 defines path segments in a nested manner. After the header for the Connection entry 2602, the path segments nearest to the originator device C2—specifically, the path segments across bus Chassis2, which is the backplane of the second chassis 2102b—are defined first. The Chassis2 path segments include a path to input module I2 and a path to the ethernet module B2 (this latter path segment will be used for two of the three paths being defined, but only needs to be defined once in the DSL script). Since the path to input module I2 ends with that module, no additional path is defined after that target device name. However, ethernet module B2 is not the final target device for the remaining two connection paths, but rather is an intermediate device for those paths. Accordingly, following the target device name B2, another path segment is defined for the next bus in the path; namely, the ethernet bus Eth1.

The Eth1 path segments include a path to the ethernet-capable input device I3 and to the ethernet module B1 of the first controller chassis 2102a. Accordingly, the names of both of these devices are included in the Eth1 path definition. Since input module I3 is the final target device for its path, no additional path definitions are scripted after the I3 device name. However, since the ethernet module B1 is not the final device in its path, another path definition for the next bus in the path—Chassis1, the backplane of the first controller 2102a—is scripted after the device name B1. Since this bus only includes one segment of one of the three connection paths, only the final target device for that path—input module I1—is included in this path segment definition.

Figure 30:
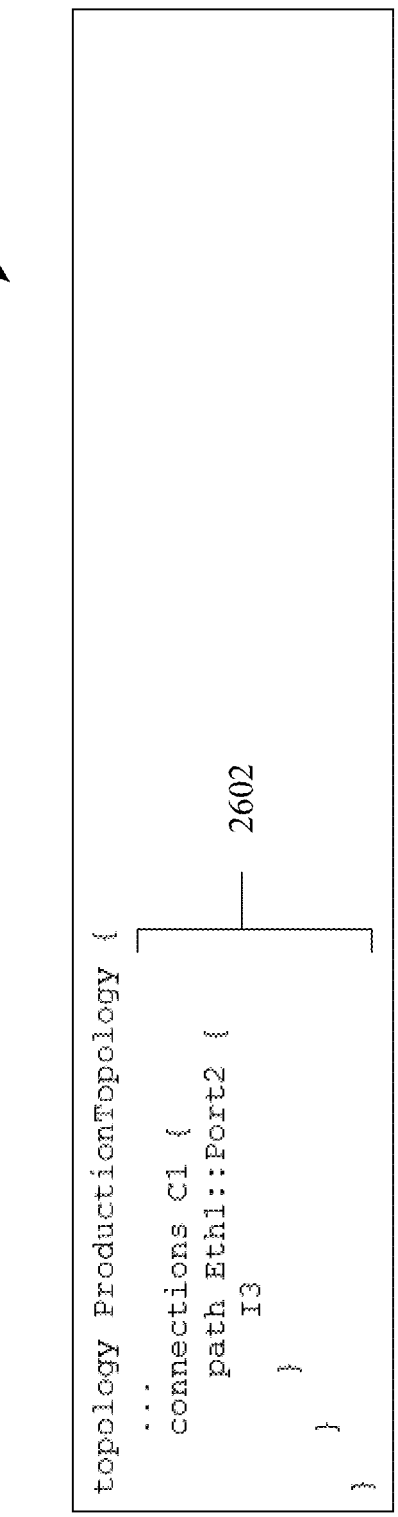
FIG. 30 is another example segment of a topology section in which the path segment definition specifies both a bus and a port number.

If a device is connected to a bus via two separate ports, as in the case of an industrial controller module with two ethernet ports that can be connected to the same ethernet bus and assigned two different IP addresses, the DSL path segment definition can be formatted to specify which of the two ports are to be used for the path. FIG. 30 is another example segment of a topology section 2208 in which the path segment definition specifies both a bus and a port number. In this example, Connections entry 2602 defines a connection from the controller module C1 of the first controller chassis 2102a to the remote input module I3 via the ethernet network Eth1. In this scenario, the controller module C1 has two ethernet ports (both of which would be defined in the device entry 2402a for the C1) which are both connected to the ethernet network Eth1 and assigned different IP addresses. Accordingly, the BusRef for this connection path specifies both the bus Eth1 and the port name Port2 for the path, formatted as

[bus name]::[port name].

The DSL syntax described above in connection with FIGS. 21-30 can be used to define a full industrial control system topology, including defining the devices that make up control system, the busses to which these devices are connected, and the communication paths between the devices via the busses. The resulting DSL script 2002 can be stored as one or more files with the system project 302. When the system project 302 is opened within the IDE system's development environment, the project generation component 206 translates the topology DSL script 2002 into its analogous project topology definition 2006. The topology definition 2006 is represented visually by the project tree 1006 rendered in the explorer panel 1012 of the IDE system's development interface 1002 (see FIGS. 10 and 11). Once created, the IDE system 202 allows the system topology to be edited—e.g., to add or remove devices or busses, or to edit communication paths—by either modifying and reloading the topology DSL script 2002 or via interaction with the project tree 1006. Substantially any type of control system topology can be defined using the DSL script, including but not limited to star topologies.

In some embodiments, the IDE system 202 can also generate estimated project telemetry or documentation based on analysis of the defined topology. This can include, for example, calculating communication bandwidths for respective busses; calculating power requirements for a chassis, network, or devices on a network; generated bills of materials; estimating quantities and types of materials required to build the control system (e.g., an amount of wire, numbers of connectors, etc.); or other such metrics or documents.

Figure 31:
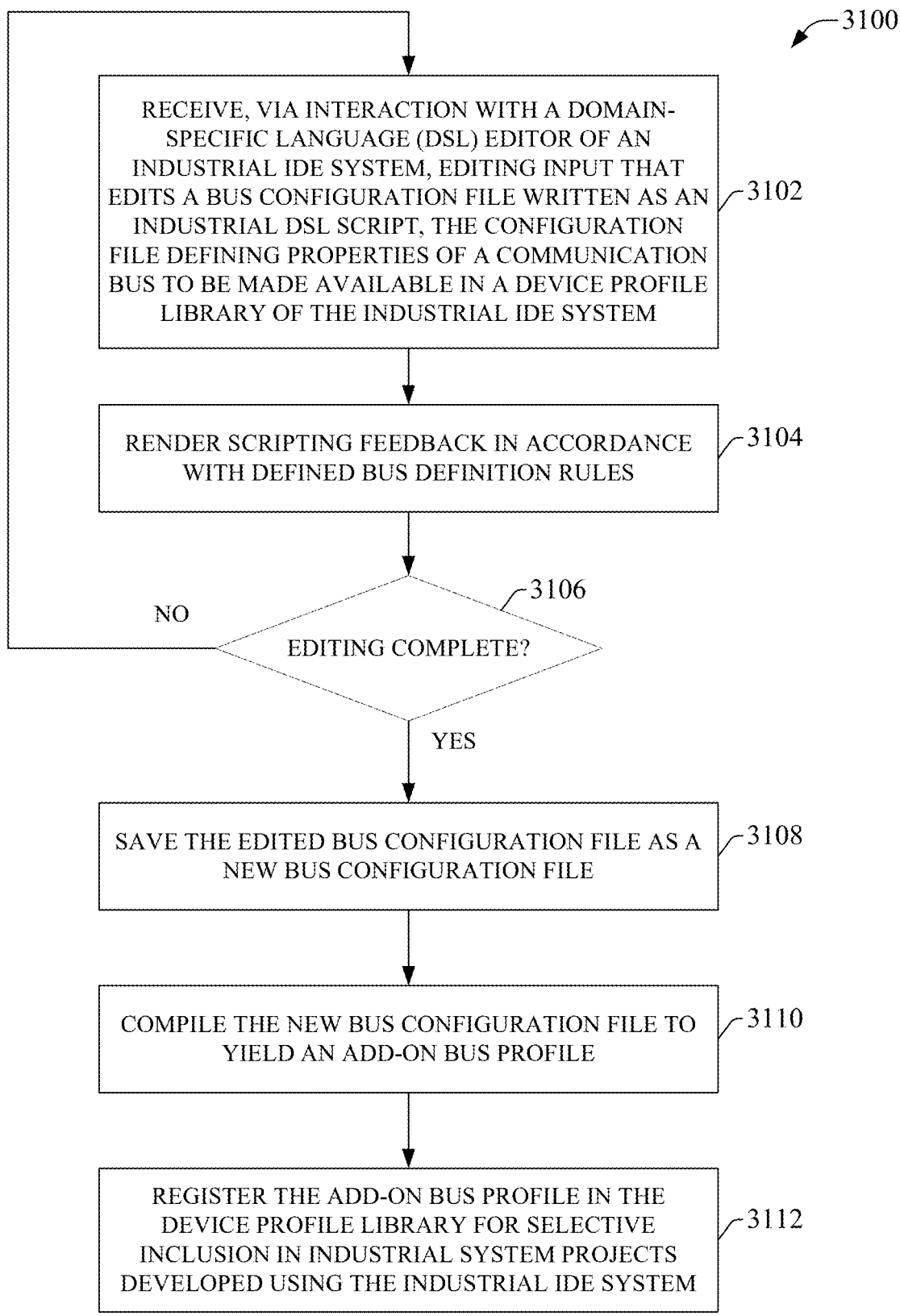
FIG. 31 is a flowchart of an example methodology for defining an add-on bus profile for use within an industrial IDE system.
Figure 32:
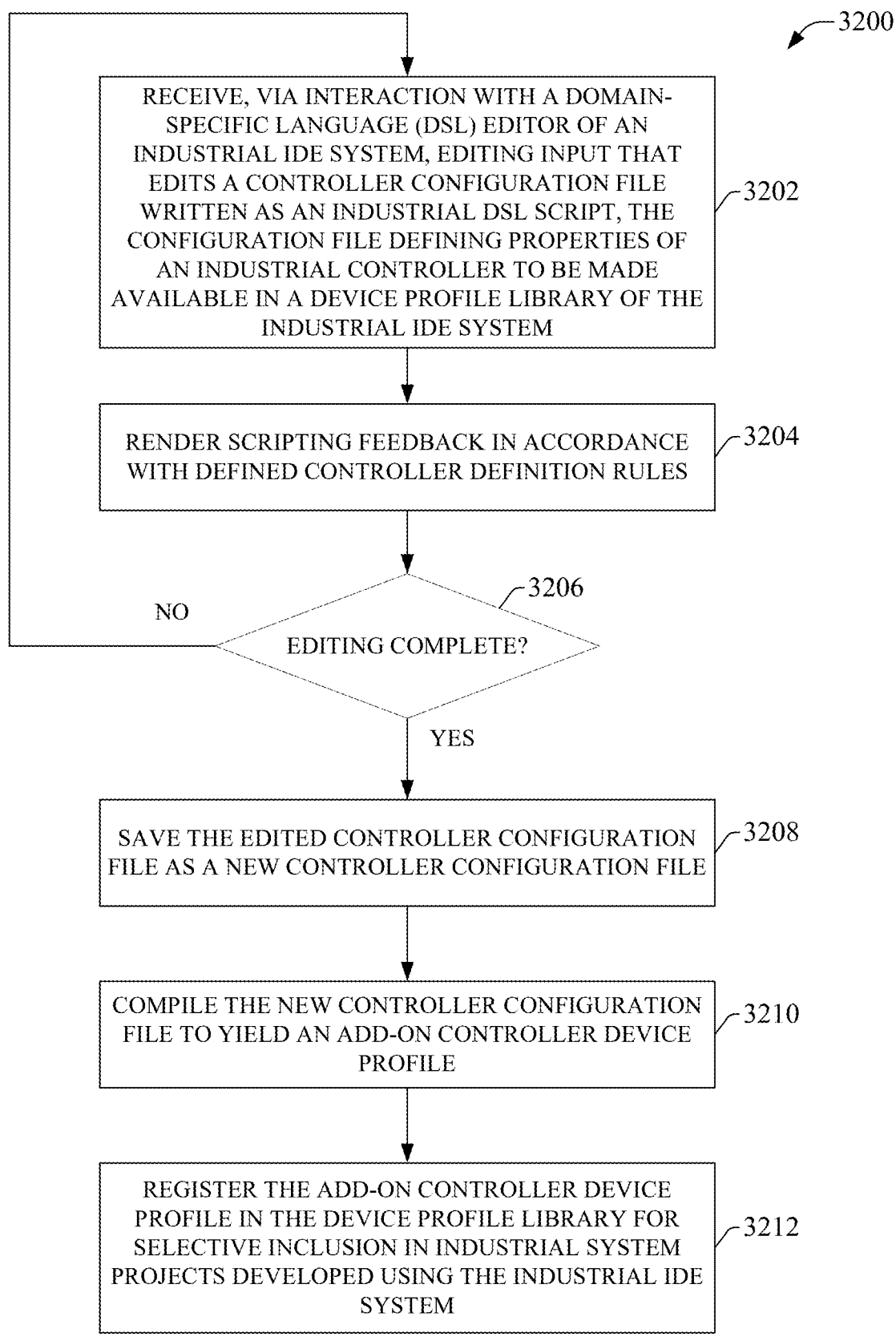
FIG. 32 is a flowchart of an example methodology for defining an add-on bus controller profile for use within an industrial IDE system.
Figure 33:
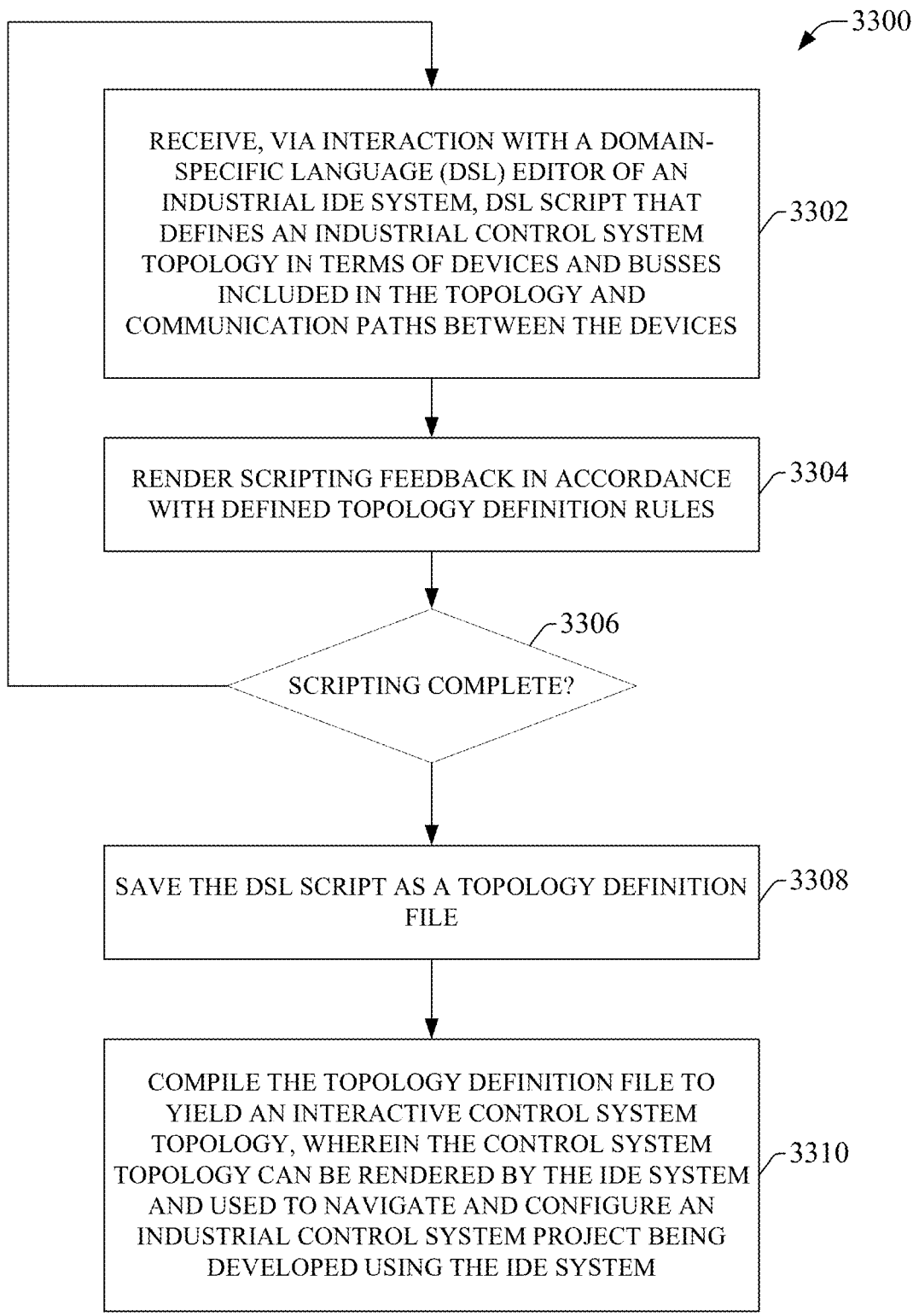
FIG. 33 defining a control system topology using DSL script as part of an industrial control project being developed using an industrial IDE system.

FIGS. 31-33 illustrate example methodologies in accordance with one or more embodiments of the subject application. While, for purposes of simplicity of explanation, the methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 31 illustrates an example methodology 3100 for defining an add-on bus profile for use within an industrial IDE system. Initially, at 2602, editing input is received via interaction with a DSL editor of an industrial IDE system. The editing input, submitted as DSL scripting, edits a bus configuration file written as an industrial DSL script. The bus configuration file defines properties of a communication bus to be made available in a device profile library of the industrial IDE system, and the editing input can set values of these properties to reflect the specifications of a physical communication bus. These properties can include, but are not limited to, an addressing scheme used by the bus (e.g., an ethernet IP addressing scheme, integer-based addressing, etc.), a maximum or minimum number of nodes or devices that can be connected to the bus, types of devices that are permitted to be attached to the bus, an icon to be used for the corresponding bus node in the IDE system's user interface, or other such bus properties. Busses that can be defined by the configuration file can include, for example, industrial controller backplanes, plant networks (e.g., ethernet networks, fieldbus networks, common industrial protocol networks, etc.), or other types of busses.

At 3104, scripting feedback is rendered by the DSL editor in accordance with defined bus definition rules. These rules can ensure that the configuration file for the bus does not violate known constraints regarding supportable device types, limits on the numbers of devices that can be added to the bus, or other such constraints. The editing feedback can also provide guidance to the user to ensure that correct DSL syntax is used. The feedback can be rendered in any suitable format, including but not limited to error highlighting, syntax highlighting, intelligent type-ahead or autocomplete functionality, scripting suggestions, or other such feedback.

At 3106, a determination is made as to whether editing of the bus configuration file is complete. If editing is not complete (NO at step 3106), the methodology returns to step 3102 and editing of the DSL configuration file continues. Alternatively, if editing is complete (YES at step 3106), the methodology proceeds to step 3108, where the edited bus configuration file is saved as a new bus configuration file. At 3110, the new bus configuration file is compiled to yield an add-on bus profile. At 3112, the add-on bus profile is registered in the device profile library of the IDE system for selective inclusion in industrial system projects developed using the IDE system.

FIG. 32 illustrates an example methodology 3200 for defining an add-on bus controller profile for use within an industrial IDE system. Initially, at 3202, editing input is receive via interaction with a DSL editor of an industrial IDE system. The editing input, submitted as DSL scripting, edits a controller configuration file written as an industrial DSL script. The controller configuration file defines properties or capabilities of an industrial controller to be made available in a device profile library of the industrial IDE system, and the editing input can set values of these capabilities to reflect the specifications of a physical industrial controller. Controller properties and capabilities that can be defined in the DSL configuration file can include, but are not limited to, a catalog number, a vendor ID, a product type, a product code, an amount of memory supported by the controller, whether the controller is a process controller, whether the controller supports redundancy, whether the controller supports safety, a maximum number of ethernet devices that can be installed on the controller's integrated internet port, whether the controller supports exceeding the specified ethernet device limit, a maximum number of event tasks that can be triggered by an input data state change, a maximum number of tasks supported by the controller, a maximum number of I/O connections supported by the controller, or other such capabilities.

At 3204, scripting feedback is rendered by the DSL editor in accordance with defined controller definition rules. These rules can ensure that the configuration file for the controller does not violate known constraints on controller capabilities, as well as to ensure that correct DSL syntax is used to define the controller properties. The feedback can be rendered in any suitable format, including but not limited to error highlighting, syntax highlighting, intelligent type-ahead or autocomplete functionality, scripting suggestions, or other such feedback.

At 3206, a determination is made as to whether editing of the controller configuration file is complete. If editing is not complete (NO at step 3206), the methodology returns to step 3202 and editing of the DSL configuration file continues. Alternatively, if editing is complete (YES at step 3206), the methodology proceeds to step 3208, where the edited controller configuration file is saved as a new controller configuration file. At 3210, the new controller configuration file is compiled to yield an add-on controller device profile that can be added to industrial system projects. At 3212, the add-on controller device profile is registered in the device profile library for selective inclusion in industrial system projects developed using the IDE system.

FIG. 33 illustrates an example methodology 3300 for defining a control system topology using DSL script as part of an industrial control project being developed using an industrial IDE system. Initially, at 3302, DSL script that defines an industrial control system is received via interaction with a DSL editor of an industrial IDE system. The DSL script defines the topology in terms of devices and busses included in the topology and communication paths (or logical paths) between the devices. The DSL scripting language can allow the user to define device types and bus types, and to define devices and communication busses within the topology as instances of their respective types. For respective devices, the user can also define such properties as the device's network address, the number of communication ports supported by the device and the busses supported by those ports, port addresses, and other such properties. Using DSL scripting, the user can also specify, for each bus defined in the topology, device ports that are connected to that bus. DSL script can also define communication paths between devices via the buses.

At 3304, scripting feedback is rendered by the DSL editor in accordance with defined topology definition rules. These rules can ensure that the DSL script does not define invalid topology connections or configurations. For example, the topology definition rules can prevent assignment of devices to a defined bus in excess of the bus's defined maximum device capacity, assignment of a device port to an incompatible bus type, invalid device or port addresses that do not conform to the correct addressing scheme, or other such inconsistencies. The scripting feedback can also ensure that correct DSL syntax is used to define the various elements of the topology. The feedback can be rendered using any suitable format, including but not limited to error highlighting, syntax highlighting, intelligent type-ahead or autocomplete functionality, scripting suggestions, or other such feedback.

At 3306, a determination is made as to whether scripting of the project topology definition is complete. If scripting is not complete (NO at step 3306), the methodology returns to step 3302 and scripting of the topology definition continues. Alternatively, if scripting is complete (YES at step 3306), the methodology proceeds to step 3308, where the DSL script is saved as a topology definition file. At 3310, the topology definition file is compiled to yield an interactive control system topology. This control system topology can be associated with a control system project being developed in the IDE system and represents the topology of a physical control system to be configured and programed by the control system project. The topology can be rendered by the IDE system and used to navigate and configured aspects of the control system project being developed.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 34:
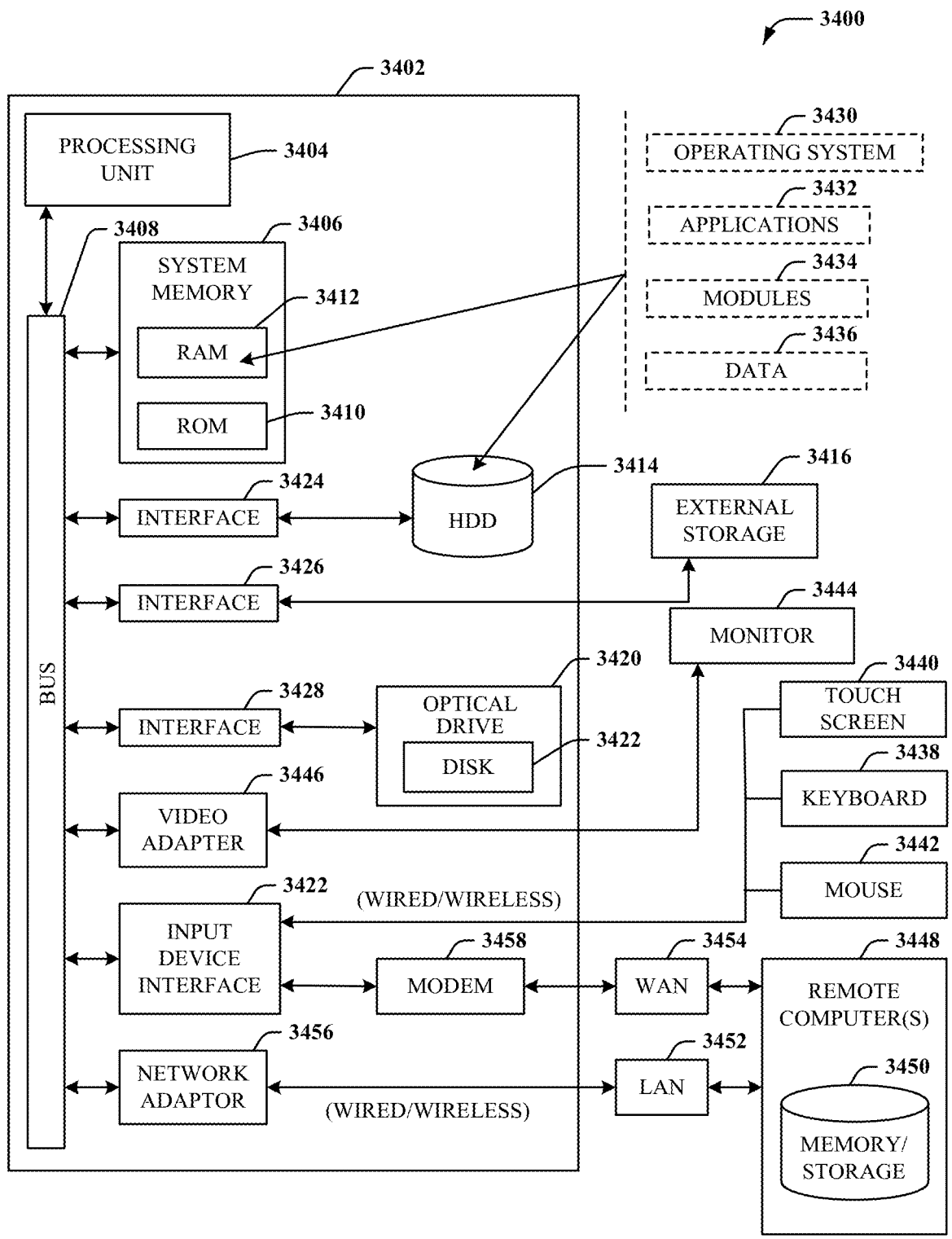
FIG. 34 is an example computing environment.
Figure 35:
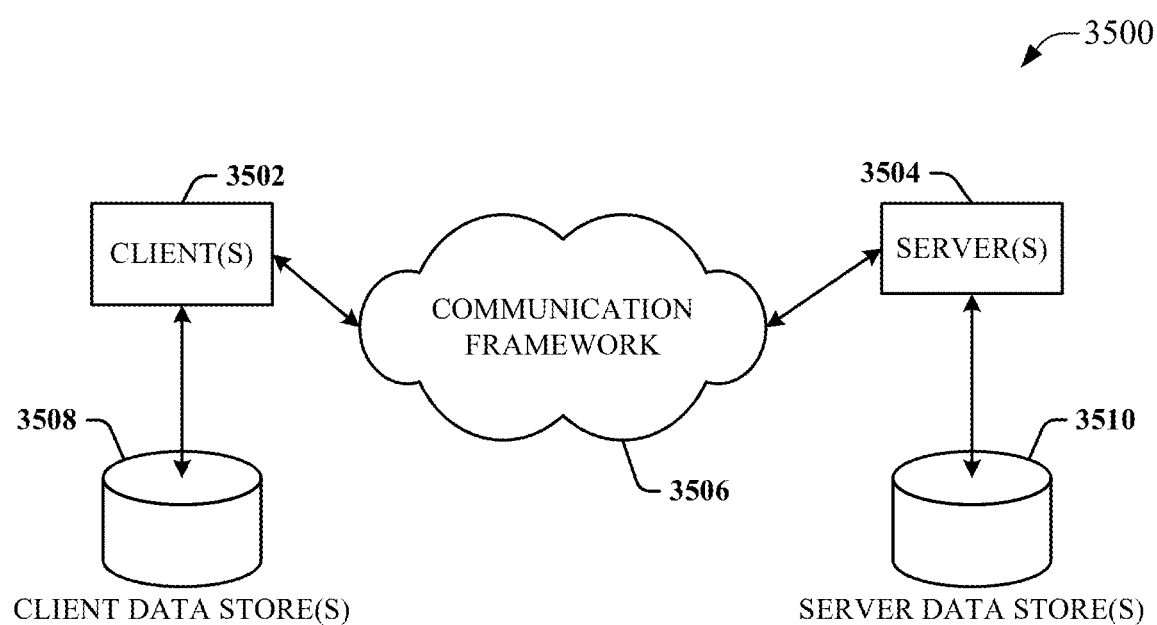
FIG. 35 is an example networking environment.

In order to provide a context for the various aspects of the disclosed subject matter, FIGS. 34 and 35 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 34, the example environment 3400 for implementing various embodiments of the aspects described herein includes a computer 3402, the computer 3402 including a processing unit 3404, a system memory 3406 and a system bus 3408. The system bus 3408 couples system components including, but not limited to, the system memory 3406 to the processing unit 3404. The processing unit 3404 can be any of various commercially available processors. Dual microprocessors and other multi-processor architectures can also be employed as the processing unit 3404.

The system bus 3408 can be any of several types of bus structure that can further interconnect to a memory bus (with or without a memory controller), a peripheral bus, and a local bus using any of a variety of commercially available bus architectures. The system memory 3406 includes ROM 3410 and RAM 3412. A basic input/output system (BIOS) can be stored in a non-volatile memory such as ROM, erasable programmable read only memory (EPROM), EEPROM, which BIOS contains the basic routines that help to transfer information between elements within the computer 3402, such as during startup. The RAM 3412 can also include a high-speed RAM such as static RAM for caching data.

The computer 3402 further includes an internal hard disk drive (HDD) 3414 (e.g., EIDE, SATA), one or more external storage devices 3416 (e.g., a magnetic floppy disk drive (FDD) 3416, a memory stick or flash drive reader, a memory card reader, etc.) and an optical disk drive 3420 (e.g., which can read or write from a CD-ROM disc, a DVD, a BD, etc.). While the internal HDD 3414 is illustrated as located within the computer 3402, the internal HDD 3414 can also be configured for external use in a suitable chassis (not shown). Additionally, while not shown in environment 3400, a solid state drive (SSD) could be used in addition to, or in place of, an HDD 3414. The HDD 3414, external storage device(s) 3416 and optical disk drive 3420 can be connected to the system bus 3408 by an HDD interface 3424, an external storage interface 3426 and an optical drive interface 3428, respectively. The interface 3424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 3402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 3412, including an operating system 3430, one or more application programs 3432, other program modules 3434 and program data 3436. All or portions of the operating system, applications, modules, and/or data can also be cached in the RAM 3412. The systems and methods described herein can be implemented utilizing various commercially available operating systems or combinations of operating systems.

Computer 3402 can optionally comprise emulation technologies. For example, a hypervisor (not shown) or other intermediary can emulate a hardware environment for operating system 3430, and the emulated hardware can optionally be different from the hardware illustrated in FIG. 34. In such an embodiment, operating system 3430 can comprise one virtual machine (VM) of multiple VMs hosted at computer 3402. Furthermore, operating system 3430 can provide runtime environments, such as the Java runtime environment or the .NET framework, for application programs 3432. Runtime environments are consistent execution environments that allow application programs 3432 to run on any operating system that includes the runtime environment. Similarly, operating system 3430 can support containers, and application programs 3432 can be in the form of containers, which are lightweight, standalone, executable packages of software that include, e.g., code, runtime, system tools, system libraries and settings for an application.

Further, computer 3402 can be enable with a security module, such as a trusted processing module (TPM). For instance with a TPM, boot components hash next in time boot components, and wait for a match of results to secured values, before loading a next boot component. This process can take place at any layer in the code execution stack of computer 3402, e.g., applied at the application execution level or at the operating system (OS) kernel level, thereby enabling security at any level of code execution.

A user can enter commands and information into the computer 3402 through one or more wired/wireless input devices, e.g., a keyboard 3438, a touch screen 3440, and a pointing device, such as a mouse 3442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 3404 through an input device interface 3444 that can be coupled to the system bus 3408, but can be connected by other interfaces, such as a parallel port, an IEEE 1394 serial port, a game port, a USB port, an IR interface, a BLUETOOTH® interface, etc.

A monitor 3444 or other type of display device can be also connected to the system bus 3408 via an interface, such as a video adapter 3446. In addition to the monitor 3444, a computer typically includes other peripheral output devices (not shown), such as speakers, printers, etc.

The computer 3402 can operate in a networked environment using logical connections via wired and/or wireless communications to one or more remote computers, such as a remote computer(s) 3448. The remote computer(s) 3448 can be a workstation, a server computer, a router, a personal computer, portable computer, microprocessor-based entertainment appliance, a peer device or other common network node, and typically includes many or all of the elements described relative to the computer 3402, although, for purposes of brevity, only a memory/storage device 3450 is illustrated. The logical connections depicted include wired/wireless connectivity to a local area network (LAN) 3452 and/or larger networks, e.g., a wide area network (WAN) 3454. Such LAN and WAN networking environments are commonplace in offices and companies, and facilitate enterprise-wide computer networks, such as intranets, all of which can connect to a global communications network, e.g., the Internet.

When used in a LAN networking environment, the computer 3402 can be connected to the local network 3452 through a wired and/or wireless communication network interface or adapter 3456. The adapter 3456 can facilitate wired or wireless communication to the LAN 3452, which can also include a wireless access point (AP) disposed thereon for communicating with the adapter 3456 in a wireless mode.

When used in a WAN networking environment, the computer 3402 can include a modem 3458 or can be connected to a communications server on the WAN 3454 via other means for establishing communications over the WAN 3454, such as by way of the Internet. The modem 3458, which can be internal or external and a wired or wireless device, can be connected to the system bus 3408 via the input device interface 3422. In a networked environment, program modules depicted relative to the computer 3402 or portions thereof, can be stored in the remote memory/storage device 3450. It will be appreciated that the network connections shown are example and other means of establishing a communications link between the computers can be used.

When used in either a LAN or WAN networking environment, the computer 3402 can access cloud storage systems or other network-based storage systems in addition to, or in place of, external storage devices 3416 as described above. Generally, a connection between the computer 3402 and a cloud storage system can be established over a LAN 3452 or WAN 3454 e.g., by the adapter 3456 or modem 3458, respectively. Upon connecting the computer 3402 to an associated cloud storage system, the external storage interface 3426 can, with the aid of the adapter 3456 and/or modem 3458, manage storage provided by the cloud storage system as it would other types of external storage. For instance, the external storage interface 3426 can be configured to provide access to cloud storage sources as if those sources were physically connected to the computer 3402.

The computer 3402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 35 is a schematic block diagram of a sample computing environment 3500 with which the disclosed subject matter can interact. The sample computing environment 3500 includes one or more client(s) 3502. The client(s) 3502 can be hardware and/or software (e.g., threads, processes, computing devices). The sample computing environment 3500 also includes one or more server(s) 3504. The server(s) 3504 can also be hardware and/or software (e.g., threads, processes, computing devices). The servers 3504 can house threads to perform transformations by employing one or more embodiments as described herein, for example. One possible communication between a client 3502 and servers 3504 can be in the form of a data packet adapted to be transmitted between two or more computer processes. The sample computing environment 3500 includes a communication framework 3506 that can be employed to facilitate communications between the client(s) 3502 and the server(s) 2804. The client(s) 3502 are operably connected to one or more client data store(s) 3508 that can be employed to store information local to the client(s) 3502. Similarly, the server(s) 3504 are operably connected to one or more server data store(s) 3510 that can be employed to store information local to the servers 3504.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for developing industrial control projects, comprising:
 a memory that stores executable components; and
 a processor, operatively coupled to the memory, that executes the executable components, the executable components comprising:
  a user interface component configured to render integrated development environment (IDE) interfaces and to receive, via interaction with the IDE interfaces, industrial design input that defines aspects of an industrial automation control project;
  a project generation component configured to generate system project data based on the industrial design input, the system project data comprising at least one of an executable industrial control program or device configuration data; and
  a domain-specific language (DSL) editor configured to receive, via interaction with a DSL editing interface, a controller DSL script that defines properties of an industrial controller type, wherein the controller DSL script defines a format of a controller properties window that is rendered by the user interface component and is used to configure industrial controllers of the industrial controller type,
  compile the controller DSL script to yield an add-on controller profile, and
  add the add-on controller profile to a library of device profiles available for inclusion in the industrial automation project, wherein
the industrial design input comprises at least a selection of the add-on controller profile for inclusion in the industrial automation project,
the selection of the add-on controller profile adds a controller node to the industrial automation project representing an industrial controller of the industrial controller type,
the user interface component is further configured to, in response to selection of the controller node, render the controller properties window based on the controller DSL script, and
a subset of the industrial design input is received via interaction with the controller properties window.

2. The system of claim 1, wherein the properties of the industrial controller type defined by the controller DSL script comprise at least one of a catalog number, a vendor identifier, a device type, a product code, an amount of memory supported by the industrial controller type, whether the industrial controller type is a process controller, whether the industrial controller type supports redundancy, whether the industrial controller type supports safety, a maximum number of network nodes that be targeted for communication by the industrial controller type, a maximum number of event tasks that can be triggered by an input data state change, a maximum number of tasks supported by the industrial controller type, or a maximum number of I/O connections supported by the industrial controller type.

3. The system of claim 1, wherein the DSL editor receives the controller DSL script via editing of a controller configuration file comprising preformatted DSL script for specifying values of the properties of the industrial controller type.

4. The system of claim 1, wherein
the DSL editor is configured to render, on the DSL editing interface, scripting feedback based on application of bus definition rules to the controller DSL script, and
the scripting feedback comprises at least one of error highlighting, syntax highlighting, type-ahead recommendations, or scripting suggestions.

5. The system of claim 4, wherein the bus definition rules define at least one of a maximum number of nodes or a maximum bandwidth.

6. The system of claim 1, wherein
the industrial design input comprises at least selection of a communication bus profile from a library of communication bus profiles for inclusion in the industrial automation control project, and
the DSL editor is further configured to
receive, via interaction with a DSL editing interface, a bus DSL script that defines properties of a communication bus type,
compile the bus DSL script to yield an add-on bus profile, and
add the add-on bus profile to the library.

7. The system of claim 6, wherein the properties of the communication bus defined by the bus DSL script comprise at least one of an addressing scheme used by the communication bus, a maximum number of nodes or devices supported by the communication bus, a protocol supported by the communication bus, or an icon representation of the bus.

8. The system of claim 6, wherein the DSL editor receives the bus DSL script via editing of a bus configuration file comprising a preformatted DSL script for specifying values of the properties of the communication bus.

9. The system of claim 6, wherein the communication bus is at least one of an industrial controller backplane, a remote I/O network, or a plant network.

10. A method, comprising:
rendering, by an integrated development environment (IDE) system comprising a processor, a domain-specific language (DSL) editing interface;
receiving, by the IDE system via interaction with the DSL editing interface, a controller DSL script that defines properties of an industrial controller type, wherein the controller DSL script defines a format of a controller properties window that is used to configure industrial controllers of the industrial controller type;
compiling, by the IDE system, the controller DSL script to yield an add-on controller profile;
registering, by the IDE system, the add-on controller profile in a library of device profiles available for selective inclusion in industrial automation projects; and
receiving, by the IDE system via interaction with an IDE interface, design input that defines aspects of an industrial automation project, wherein the receiving of the design input comprises:
receiving a selection of the add-on controller profile for inclusion in the industrial automation project;
in response to the receiving of the selection, adding, to the industrial automation project, a controller node representing an industrial controller of the industrial controller type;
in response to selection of the controller node, rendering an instance of the controller properties window based on the controller DSL script; and
receiving a subset of the design input via interaction with the controller properties window.

11. The method of claim 10, wherein the properties of the industrial controller type defined by the controller DSL script comprise at least one of a catalog number, a vendor identifier, a device type, a product code, an amount of memory supported by the industrial controller type, whether the industrial controller type is a process controller, whether the industrial controller type supports redundancy, whether the industrial controller type supports safety, a maximum number of network nodes that can be targeted for communication by the industrial controller type, a maximum number of event tasks that can be triggered by an input data state change, a maximum number of tasks supported by the industrial controller type, or a maximum number of I/O connections supported by the industrial controller type.

12. The method of claim 10, further comprising rendering, by the IDE system, a controller configuration file comprising preformatted DSL script for specifying values of the properties of the industrial controller type,
wherein the receiving of the controller DSL script comprises receiving edits to the controller configuration file.

13. The method of claim 10, further comprising rendering, by the IDE system on the DSL editing interface, scripting feedback based on application of bus definition rules to the controller DSL script,
wherein the scripting feedback comprises at least one of error highlighting, syntax highlighting, type-ahead recommendations, or scripting suggestions.

14. The method of claim 10, further comprising:
receiving, by the system via interaction with the DSL editing interface, a bus DSL script that defines properties of a communication bus type;

compiling, by the system, the bus DSL script to yield an add-on bus profile; and registering, by the system, the add-on bus profile in the library of device profiles.

15. The method of claim 14, wherein the properties of the communication bus defined by the bus DSL script comprise at least one of an addressing scheme used by the communication bus, a maximum number of nodes or devices supported by the communication bus, a protocol supported by the bus, or an icon representation of the bus.

16. The method of claim 14, further comprising rendering, by the IDE system, a bus configuration file comprising a preformatted DSL script for specifying values of the properties of the communication bus, wherein the receiving of the bus DSL script comprises receiving edits to the bus configuration file.

17. The method of claim 14, wherein the communication bus is at least one of an industrial controller backplane, a remote I/O network, or a plant network.

18. A non-transitory computer-readable medium having stored thereon instructions that, in response to execution, cause an integrated development environment (IDE) system comprising a processor to perform operations, the operations comprising:

rendering a domain-specific language (DSL) editing interface;

receiving, via interaction with the DSL editing interface, a controller DSL script that defines properties of an industrial controller type, wherein the controller DSL script defines a format of a controller properties window that is used to configure industrial controllers of the industrial controller type;

compiling the controller DSL script to yield an add-on controller profile;

registering the add-on controller profile in a library of device profiles that are available for selective inclusion in industrial control projects; and receiving, via interaction with an IDE interface, design input that defines aspects of an industrial control project, wherein the receiving of the design input comprises:

receiving a selection of the add-on controller profile for inclusion in the industrial automation project;

in response to the receiving of the selection, adding, to the industrial automation project, a controller node representing an industrial controller of the industrial controller type;

in response to selection of the controller node, rendering an instance of the controller properties window based on the controller DSL script; and receiving a subset of the industrial design input via interaction with the controller properties window.

19. The non-transitory computer-readable medium of claim 18, wherein the properties of the industrial controller type defined by the controller DSL script comprise at least one of a catalog number, a vendor identifier, a device type, a product code, an amount of memory supported by the industrial controller type, whether the industrial controller type is a process controller, whether the industrial controller type supports redundancy, whether the industrial controller type supports safety, a maximum number of network nodes that can be targeted for communication by the industrial controller type, a maximum number of event tasks that can be triggered by an input data state change, a maximum number of tasks supported by the industrial controller type, or a maximum number of I/O connections supported by the industrial controller type.

20. The system of claim 1, wherein the controller DSL script defines controller properties that are displayed by the controller properties window and that are editable via interaction with the controller properties window, and the subset of the industrial design input comprises values of one or more of the controller properties that are set via the interaction with the controller properties window.

* * * * *